(12) United States Patent
Cupersmith et al.

(10) Patent No.: US 11,532,205 B2
(45) Date of Patent: Dec. 20, 2022

(54) GAMING SERVICE AUTOMATION SYSTEM WITH GRAPHICAL USER INTERFACE

(71) Applicant: Aristocrat Technologies, Inc., Las Vegas, NV (US)

(72) Inventors: Michelle Cupersmith, Las Vegas, NV (US); Victor Blanco, Austin, TX (US); Donovan Meyer, Austin, TX (US); Frank Rodriguez, Las Vegas, NV (US); Rajendrasinh Jadeja, Las Vegas, NV (US); Steven Santisi, Las Vegas, NV (US); Eric Taylor, Carson City, NV (US)

(73) Assignee: Aristocrat Technologies, Inc., Las Vegas, NV (US)

( * ) Notice: Subject to any disclaimer, the term of this patent is extended or adjusted under 35 U.S.C. 154(b) by 0 days.

(21) Appl. No.: 17/212,780

(22) Filed: Mar. 25, 2021

(65) Prior Publication Data

US 2021/0302957 A1  Sep. 30, 2021

Related U.S. Application Data

(60) Provisional application No. 63/092,964, filed on Oct. 16, 2020, provisional application No. 63/000,912, filed on Mar. 27, 2020.

(51) Int. Cl.
*G06F 3/04817* (2022.01)
*H04N 7/15* (2006.01)
(Continued)

(52) U.S. Cl.
CPC .......... *G07F 17/323* (2013.01); *B25J 9/1664* (2013.01); *B25J 9/1676* (2013.01); *B25J 9/1697* (2013.01);
(Continued)

(58) Field of Classification Search
CPC ...... B25J 9/1689; B25J 9/0003; B25J 11/008; B25J 19/04; G06F 3/04817; H04N 7/15
See application file for complete search history.

(56) References Cited

U.S. PATENT DOCUMENTS 7,222,000 B2 * 5/2007 Wang .................... B25J 9/1689
 318/568.11
9,649,766 B2 * 5/2017 Stubbs .................. B25J 9/1676
(Continued)

FOREIGN PATENT DOCUMENTS

CN 101548300 A * 9/2009 .......... G07F 17/323

*Primary Examiner* — Daniel Rodriguez
*Assistant Examiner* — Gabriel Mercado
(74) *Attorney, Agent, or Firm* — Armstrong Teasdale LLP

(57) ABSTRACT

A robot management system (RMS) includes a plurality of service robots deployed within an operations venue that includes a plurality of gaming devices, an operator terminal presenting a graphical user interface (GUI) to an operator, and a robot management system server (RMS server) configured in networked communication with the plurality of service robots. The RMS server is configured to: identify location data for the service robots; create an interactive overlay map of the operations venue that includes a static map of the operations venue, overlay data showing the location data of the plurality of service robots over the static map, and an interactive icon for each service robot of the plurality of service robots; display, via the GUI, the overlay map; receive a first input indicating a selection of a first interactive icon associated with a first service robot; and display current status information associated with the first service robot.

20 Claims, 30 Drawing Sheets

(51) Int. Cl.

| | | |
|---|---|---|
| *G07F 17/32* | (2006.01) | |
| *G06N 20/00* | (2019.01) | |
| *B25J 11/00* | (2006.01) | |
| *B25J 13/00* | (2006.01) | |
| *B25J 19/02* | (2006.01) | |
| *G06K 7/14* | (2006.01) | |
| *G06Q 10/00* | (2012.01) | |
| *G05D 1/00* | (2006.01) | |
| *B25J 9/16* | (2006.01) | |
| *G06Q 20/32* | (2012.01) | |
| *G06Q 20/36* | (2012.01) | |
| *G06Q 20/40* | (2012.01) | |
| *G07F 17/42* | (2006.01) | |
| *H04W 4/33* | (2018.01) | |
| *H04W 4/02* | (2018.01) | |
| *G06V 20/10* | (2022.01) | |
| *G06V 40/16* | (2022.01) | |
| *G07C 9/32* | (2020.01) | |
| *G07C 9/38* | (2020.01) | |
| *G07C 9/00* | (2020.01) | |
| *G05D 1/02* | (2020.01) | |

(52) U.S. Cl.
CPC .......... *B25J 11/0005* (2013.01); *B25J 11/008* (2013.01); *B25J 11/0035* (2013.01); *B25J 13/006* (2013.01); *B25J 19/023* (2013.01); *G05D 1/0016* (2013.01); *G05D 1/0027* (2013.01); *G05D 1/0044* (2013.01); *G05D 1/0061* (2013.01); *G05D 1/0094* (2013.01); *G05D 1/0212* (2013.01); *G05D 1/0231* (2013.01); *G06F 3/04817* (2013.01); *G06K 7/1417* (2013.01); *G06N 20/00* (2019.01); *G06Q 10/20* (2013.01); *G06Q 20/327* (2013.01); *G06Q 20/3674* (2013.01); *G06Q 20/40145* (2013.01); *G06V 20/10* (2022.01); *G06V 40/172* (2022.01); *G07C 9/00571* (2013.01); *G07C 9/32* (2020.01); *G07C 9/38* (2020.01); *G07F 17/3206* (2013.01); *G07F 17/3209* (2013.01); *G07F 17/3216* (2013.01); *G07F 17/3223* (2013.01); *G07F 17/3241* (2013.01); *G07F 17/3253* (2013.01); *G07F 17/3255* (2013.01); *G07F 17/42* (2013.01); *H04N 7/15* (2013.01); *H04W 4/025* (2013.01); *H04W 4/33* (2018.02); *G05B 2219/31076* (2013.01); *G05B 2219/31078* (2013.01); *G07F 17/3227* (2013.01)

(56) References Cited

U.S. PATENT DOCUMENTS

| | | | |
|---|---|---|---|
| 2007/0192910 A1* | 8/2007 | Vu | B25J 19/06 |
| | | | 700/245 |
| 2007/0198129 A1* | 8/2007 | Koselka | G05D 1/0251 |
| | | | 700/245 |
| 2010/0145512 A1* | 6/2010 | Flessas | G06F 1/1601 |
| | | | 700/245 |
| 2015/0158182 A1* | 6/2015 | Farlow | B25J 11/009 |
| | | | 901/1 |
| 2015/0190927 A1* | 7/2015 | Sutherland | B25J 11/009 |
| | | | 700/259 |
| 2019/0375102 A1* | 12/2019 | Wang | G05D 1/024 |
| 2019/0377349 A1* | 12/2019 | van der Merwe | G05D 1/0257 |
| 2020/0290210 A1* | 9/2020 | Ha | B25J 11/0045 |
| 2021/0018912 A1* | 1/2021 | Dymesich | G05D 1/0225 |
| 2021/0046650 A1* | 2/2021 | Deyle | G05D 1/0274 |

* cited by examiner

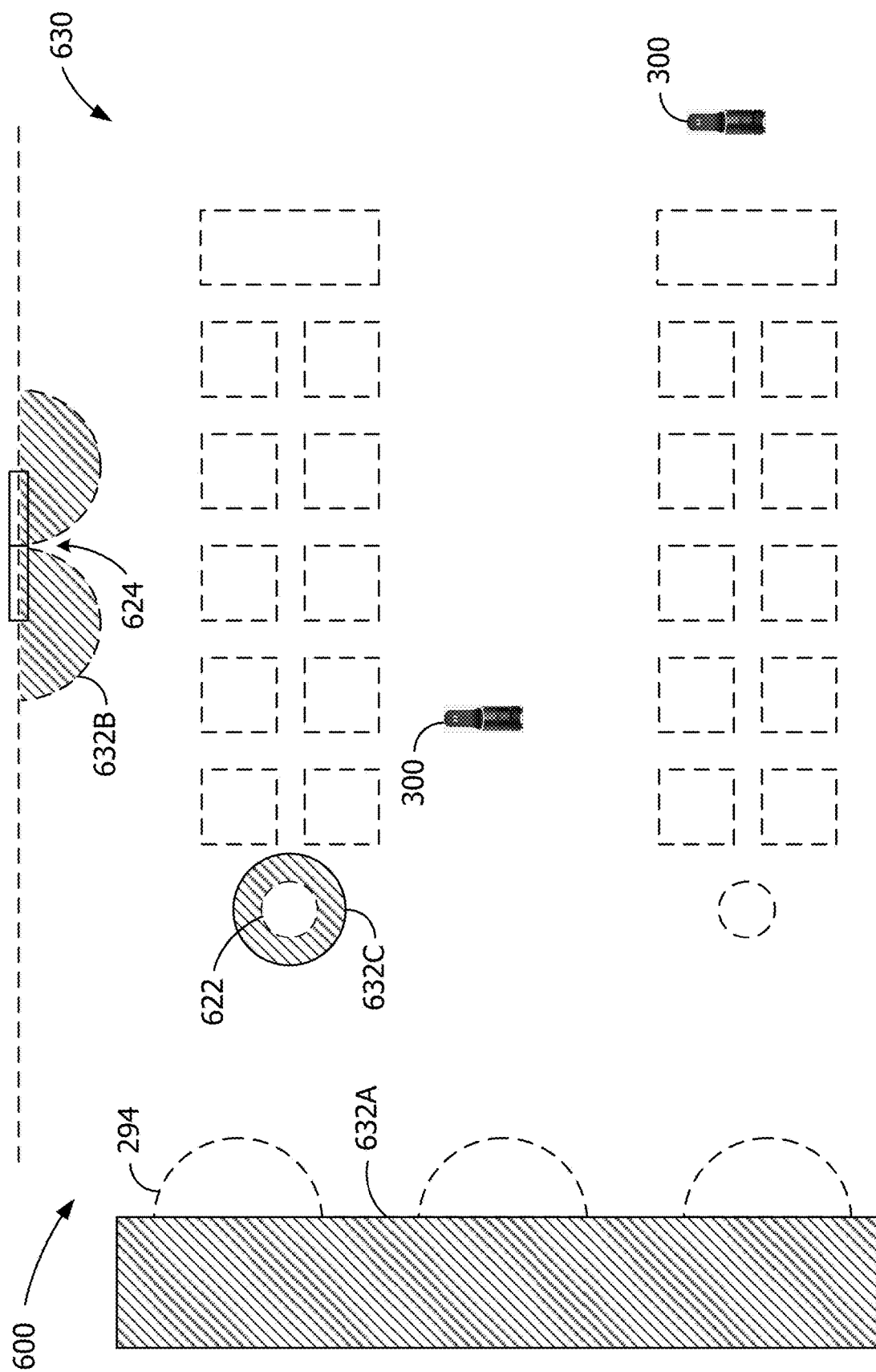

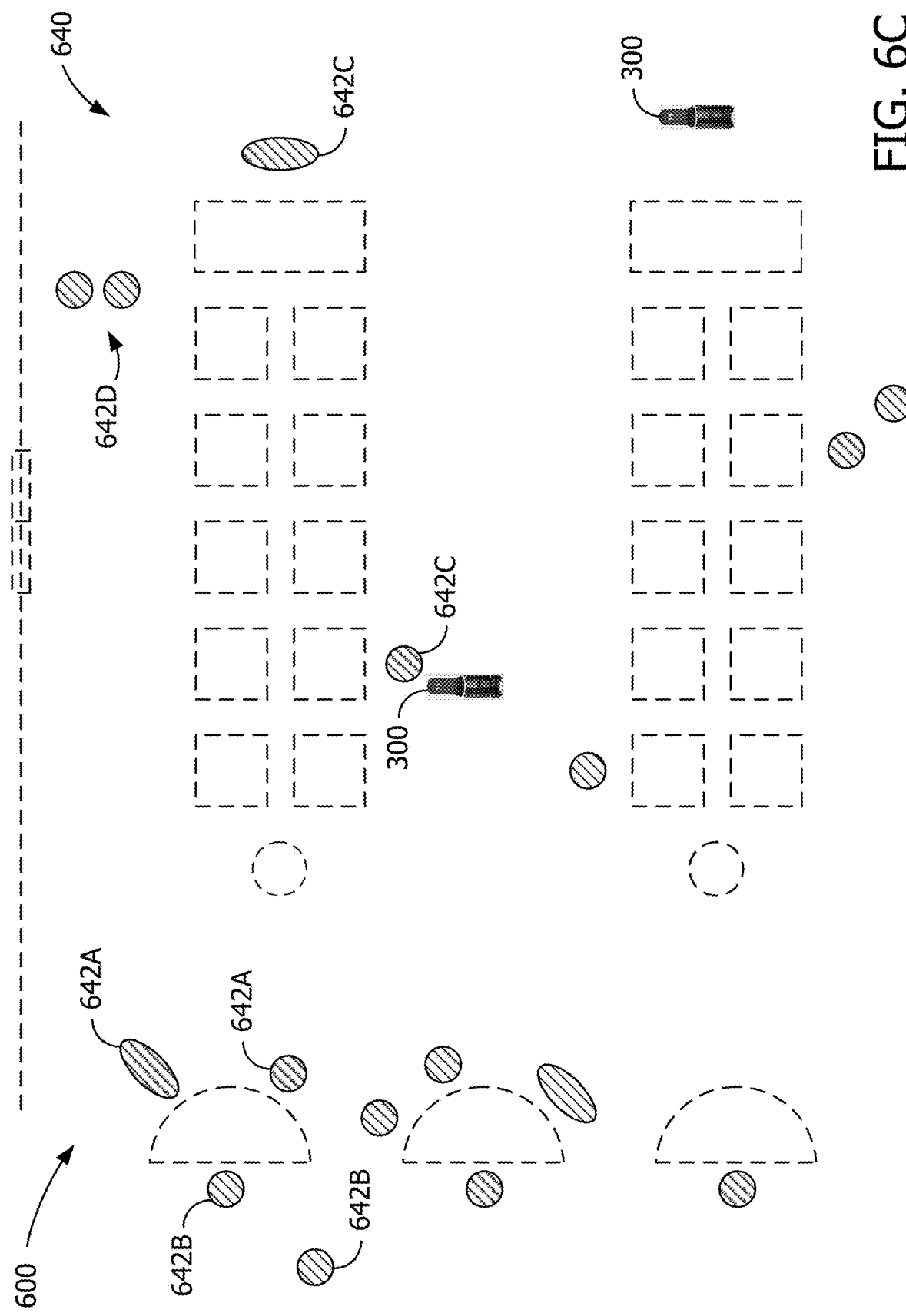

GAMING SERVICE AUTOMATION SYSTEM WITH GRAPHICAL USER INTERFACE

CROSS-REFERENCE TO RELATED APPLICATIONS

This application claims the benefit of priority to U.S. Provisional Patent Application No. 63/092,964, filed 16 Oct. 2020, entitled "ROBOTIC SERVICE SYSTEMS AND METHODS," and to U.S. Provisional Patent Application No. 63/000,912, filed 27 Mar. 2020, entitled "ROBOTIC SERVICE SYSTEMS AND METHODS," the entire contents and disclosures of which are hereby incorporated by reference in their entireties.

This application is related to U.S. patent application Ser. No. 17/212,744, entitled "GAMING SERVICE AUTOMATION MACHINE WITH KIOSK SERVICES," filed on Mar. 25, 2021, U.S. patent application Ser. No. 17/212,902, entitled "GAMING SERVICE AUTOMATION MACHINE WITH DELIVERY SERVICES" filed on Mar. 25, 2021, U.S. patent application Ser. No. 17/212,853, entitled "GAMING SERVICE AUTOMATION MACHINE WITH CELEBRATION SERVICES," filed on Mar. 25, 2021, U.S. patent application Ser. No. 17/212,762, entitled "GAMING SERVICE AUTOMATION MACHINE WITH DIGITAL WALLET SERVICES" filed on Mar. 25, 2021, U.S. patent application Ser. No. 17/212,801, entitled "GAMING SERVICE AUTOMATION MACHINE WITH PHOTOGRAPHY SERVICES" filed on Mar. 25, 2021, U.S. patent application Ser. No. 17/212,617, entitled "GAMING SERVICE AUTOMATION MACHINE WITH DROP BOX SERVICES" filed on Mar. 25, 2021, and U.S. patent application Ser. No. 17/212,658, entitled "GAMING SERVICE AUTOMATION MACHINE WITH DATA COLLECTION AND DIAGNOSTICS SERVICES," filed on Mar. 25, 2021, each of which is incorporated herein by reference in its entirety.

TECHNICAL FIELD

The field of disclosure relates generally to robotics, and more particularly to systems and methods for providing and managing service robots.

BACKGROUND

Robotic technology has evolved and progressed through the past half-century, gradually transitioning from the genre of science fiction into the field of practical science. The field of robotics combines many branches of science, particularly mechanical engineering, electrical engineering, and computer science to construct robotic devices ("robots") that can perform actions, typically in lieu of a human. Service robots are one category of robotic technology in which the robot is tailored to perform operations in a personal or professional setting, typically performing jobs that are repetitive, low-skilled, or simple enough to not require human intervention. The emergence of new technologies and improvements to existing technologies provides opportunities for new types of service robots in various venues.

BRIEF DESCRIPTION

In one aspect, a robot management system (RMS) is provided. The RMS includes a plurality of service robots deployed within an operations venue that includes a plurality of gaming devices. The RMS also includes an operator terminal presenting a graphical user interface (GUI) to an operator. The RMS further includes a robot management system server (RMS server) configured in networked communication with the plurality of service robots. The RMS server includes at least one processor and at least one memory device storing instructions. When executed by the at least one processor, the instructions cause the at least one processor to: identify location data for the plurality of service robots; create an interactive overlay map of the operations venue, the interactive overlay map includes at least a static map of the operations venue that includes the plurality of gaming devices at static, predefined locations, the interactive overlay map further includes overlay data showing the location data of the plurality of service robots over the static map, the interactive overlay map further includes an interactive icon for each service robot of the plurality of service robots; cause to be displayed, via the GUI, the overlay map; receive a first input indicating a selection of a first interactive icon associated with a first service robot; and display current status information associated with the first service robot.

In another aspect, a method of managing a plurality of service robots deployed within an operations venue that includes a plurality of gaming devices is provided. The method includes identifying location data for the plurality of service robots. The method also includes creating an interactive overlay map of an operations venue. The interactive overlay map includes at least a static map of the operations venue that includes the plurality of gaming devices at static, predefined locations. The interactive overlay map further includes overlay data showing the location data of the plurality of service robots over the static map. The interactive overlay map further includes an interactive icon for each service robot of the plurality of service robots. The method further includes causing the interactive overlay map to be displayed to an operator via a graphical user interface (GUI) on an operator terminal. The method also includes receiving a first input indicating a selection of a first interactive icon associated with a first service robot. The method further includes displaying current status information associated with the first service robot.

In yet another aspect, a non-transitory computer-readable medium including instructions is provided. When executed by a processor, the instructions cause the processor to: identify location data for a plurality of service robots deployed within an operations venue; create an interactive overlay map of the operations venue, the interactive overlay map includes at least a static map of the operations venue that includes the plurality of gaming devices at static, predefined locations, the interactive overlay map further includes overlay data showing the location data of the plurality of service robots over the static map, the interactive overlay map further includes an interactive icon for each service robot of the plurality of service robots; cause the interactive overlay map to be displayed to an operator via a graphical user interface (GUI) on an operator terminal; receive a first input indicating a selection of a first interactive icon associated with a first service robot; and display current status information associated with the first service robot.

BRIEF DESCRIPTION OF THE DRAWINGS

An example embodiment of the subject matter disclosed will now be described with reference to the accompanying drawings.

FIG. 6B illustrates an exclusion zone overlay that can be used to pre-define areas where the robots are not allowed to move.

FIG. 6C illustrates a heat map overlay that can be used to identify heat signatures of patrons at various locations within the operations venue.

DETAILED DESCRIPTION

Figure 1:
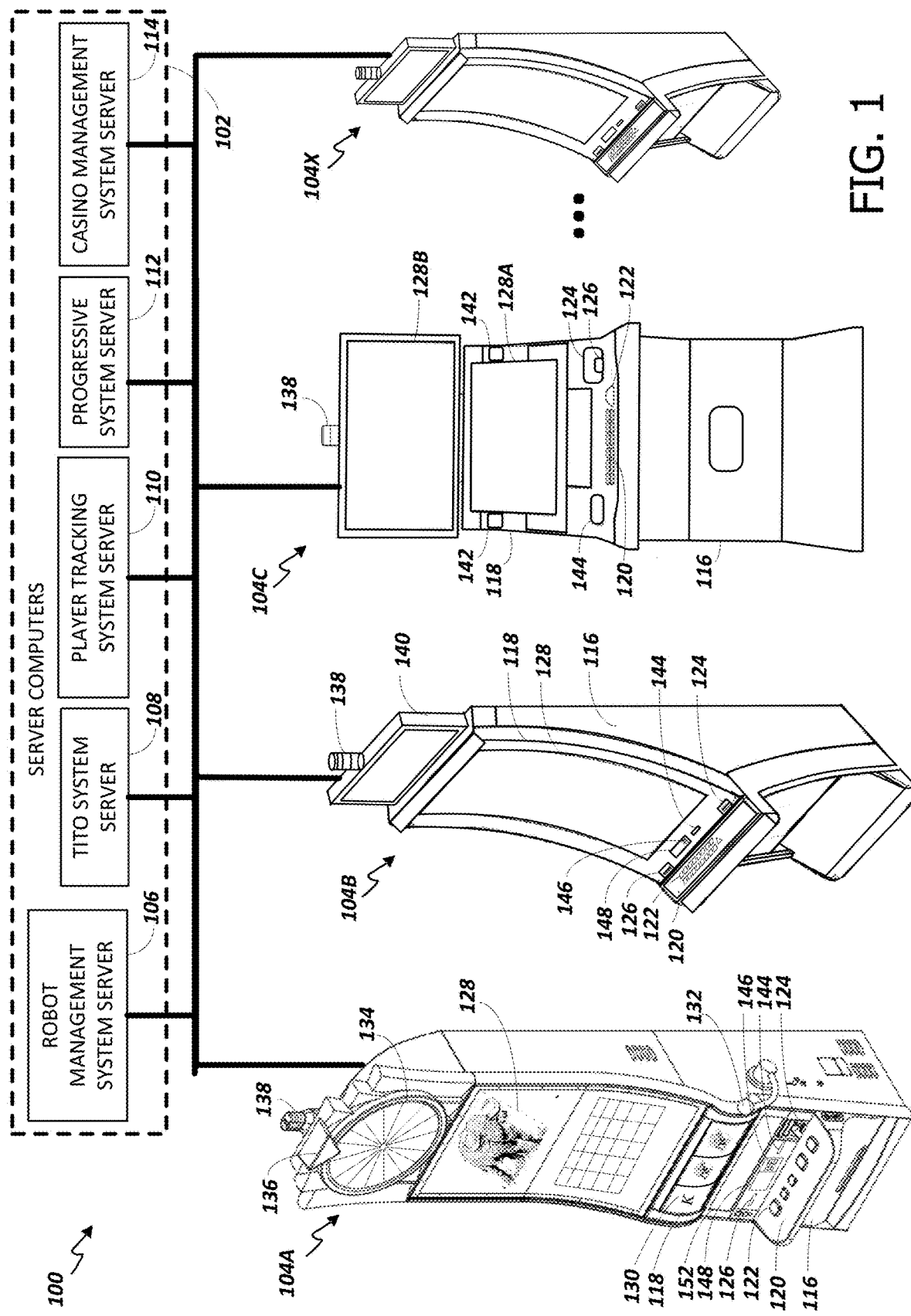
FIG. 1 is a diagram of exemplary EGMs networked with various gaming-related servers.

The present disclosure describes robotic service systems and methods, including various robotic devices ("robots") configured for use in various service capacities. In example embodiments, a robot management system server is configured to manage a fleet of service robots that are deployed within a casino property, also referred to herein as an "operations venue" or just "venue" (e.g., gaming floor, hotel, lobbies, or such). The robot management system includes a robot management system server that wirelessly connects with each of the service robots and provides centralized task scheduling and assignment. Each service robot is configured to receive and execute delegated tasks, and may execute various operations autonomously or semi-autonomously during completion of such tasks. As a part of task execution, the service robots may move about through the operations venue, relying upon static maps of the venue in conjunction with dynamic data captured by on-board sensors for position determination and pathing, as well as on-board sensors for object detection and avoidance.

In various embodiments, the fleet of service robots may include robots configured to perform host services for players (e.g., accepting food and drink orders, delivering such orders, reservation bookings, provide hotel check-in/check-out services), provide kiosk functionality (e.g., player registration, printing player cards, providing account balances and loyalty account access, provide local maps), act as machine attendants (e.g., performing "hand-pays" after large wins, providing and filing tax documents), perform as service technicians (e.g., visual inspection of machines, lights, and signage, cleanliness inspection of public areas), contribute to venue security (e.g., acting as repositionable camera feeds, perform facial recognition, patrolling restricted areas), provide entertainment (e.g., play songs, display videos or memes, tell jokes, perform animated movements or dances), act as mobile advertising (e.g., displaying video or audio ads or discounts for shows or merchandise, providing registration services or sales), act as a VIP ("very important person") host (e.g., greeting VIP, prioritized services, escort to destinations of interest, summon valet).

The service robots are configured with various hardware components that enable their intended operations, also referred to herein as the "service role" of the robot. For example, the robots may include hardware and sensors that enable movement of the robot and navigation throughout the venue (e.g., position determination, obstacle avoidance), such as drivetrain, motion sensors, digital cameras, depth cameras, impact sensors, positioning sensors, and such. The robots may include wireless communication devices that enable networked communication between the robot and other robots, gaming devices, kiosks, or the robot management system server or other venue support servers. Some service robots may include touchscreen displays for allowing digital video output and providing a touch interface for user interaction, as well as microphones and speakers for enabling audio interactions with users (e.g., players). Some service robots may include digital cameras, microphones, card readers, or biometric scanners for performing player authentication (e.g., facial recognition, voice recognition, retinal scan, fingerprinting, card scanning of player loyalty cards, payment cards, or government ID cards, or the like) or other image processing functions (e.g., still or full motion video, object recognition, image analysis). Some service robots may include printing devices, such as ticket printers (e.g., for printing TITO tickets, receipts, show tickets, or the like) or card printers (e.g., for printing player loyalty cards, hotel room cards), as well as sensors to detect whether or when printed tickets or cards have been removed. The service robots also include central processing components that include one or more central processing units ("CPUs"), volatile and non-volatile memory, and a rechargeable power supply system configured to provide power for components of the robot.

Some service robots include a base unit with a chassis and a cover shell that houses a set of components particular to the intended role of the robot. In some embodiments, the service robots may comprise both a base unit having a subset of components that enable fundamental operations (e.g., power, processing, networking, movement, and various sensors that enable such operations) as well as a topper or "head" unit having additional components tailored to a particular service role. For example, a kiosk head may include a touchscreen display device, speakers, and microphones for enabling user interaction with the robot. A delivery head may include one or more open surfaces or secure compartments for storing food, drinks, or other deliverable items, as well as motors to control access doors and various biometric sensors or cameras to provide user authentication. Various service roles and head units are described herein. As such, robots may be configured with a base and a particular interchangeable head to provide a particular service role.

FIG. 1 illustrates several different models of electronic gaming machines ("EGMs") which may be networked to various gaming related servers at a venue such as a casino floor or other gaming establishment. Shown is a system 100 in a gaming environment including one or more server computers 102 (e.g., slot servers of a casino) that are in communication, via a communications network, with one or more gaming devices 104A-104X (EGMs, slots, video poker, bingo machines, etc.) that can implement one or more aspects of the present disclosure. The gaming devices 104A-104X may alternatively be portable and/or remote gaming devices such as, but not limited to, a smart phone, a tablet, a laptop, or a game console, although such devices may require specialized software and/or hardware to comply with regulatory requirements regarding devices used for wagering or games of chance in which monetary awards are provided.

Communication between the gaming devices 104A-104X and the server computers 102, and among the gaming devices 104A-104X, may be direct or indirect, such as over the Internet through a website maintained by a computer on a remote server or over an online data network including commercial online service providers, Internet service providers, private networks, and the like. In other embodiments, the gaming devices 104A-104X may communicate with one another and/or the server computers 102 over RF, cable TV, satellite links and the like.

In some embodiments, server computers 102 may not be necessary and/or preferred. For example, in one or more embodiments, a stand-alone gaming device such as gaming device 104A, gaming device 104B or any of the other gaming devices 104C-104X can implement one or more aspects of the present disclosure. However, it is typical to find multiple EGMs connected to networks implemented with one or more of the different server computers 102 described herein.

The server computers 102 may include a central determination gaming system server (not separately shown), a robot management system server 106, a ticket-in-ticket-out (TITO) system server 108, a player tracking system server 110, a progressive system server 112, and/or a casino management system server 114. Gaming devices 104A-104X may include features to enable operation of any or all servers for use by the player and/or operator (e.g., the casino, resort, gaming establishment, tavern, pub, etc.). For example, game outcomes may be generated on a central determination gaming system server and then transmitted over the network to any of a group of remote terminals or remote gaming devices 104A-104X that utilize the game outcomes and display the results to the players.

Gaming device 104A is often of a cabinet construction which may be aligned in rows or banks of similar devices for placement and operation on a casino floor. The gaming device 104A often includes a main door 154 which provides access to the interior of the cabinet. Gaming device 104A typically includes a button area or button deck 120 accessible by a player that is configured with input switches or buttons 122, an access channel for a bill validator 124, and/or an access channel for a ticket-out printer 126.

In FIG. 1, gaming device 104A is shown as a Relm XL™ model gaming device manufactured by Aristocrat® Technologies, Inc. As shown, gaming device 104A is a reel machine having a gaming display area 118 comprising a number (typically 3 or 5) of mechanical reels 130 with various symbols displayed on them. The reels 130 are independently spun and stopped to show a set of symbols within the gaming display area 118 which may be used to determine an outcome to the game.

In many configurations, the gaming machine 104A may have a main display 128 (e.g., video display monitor) mounted to, or above, the gaming display area 118. The main display 128 can be a high-resolution LCD, plasma, LED, or OLED panel which may be flat or curved as shown, a cathode ray tube, or other conventional electronically controlled video monitor.

In some embodiments, the bill validator 124 may also function as a "ticket-in" reader that allows the player to use a casino issued credit ticket (e.g., a voucher) to load credits onto the gaming device 104A (e.g., in a cashless ticket ("TITO") system). In such cashless embodiments, the gaming device 104A may also include a "ticket-out" printer 126 for outputting a credit ticket when a "cash out" button is pressed. Cashless TITO systems are used to generate and track unique bar-codes or other indicators printed on tickets to allow players to avoid the use of bills and coins by loading credits using a ticket reader and cashing out credits using a ticket-out printer 126 on the gaming device 104A. The gaming machine 104A can have hardware meters for purposes including ensuring regulatory compliance and monitoring the player credit balance. In addition, there can be additional meters that record the total amount of money wagered on the gaming machine, total amount of money deposited, total amount of money withdrawn, total amount of winnings on gaming device 104A. In some embodiments, the cashless ticket system may integrate with the table ticketing system to facilitate allowing players to exchange tickets for chips or chips for tickets at table games.

In some embodiments, a player tracking card reader 144, a transceiver for wireless communication with a player's smartphone, a keypad 146, and/or an illuminated display 148 for reading, receiving, entering, and/or displaying player tracking information is provided in EGM 104A. In such embodiments, a game controller within the gaming device 104A can communicate with the player tracking system server 110 to send and receive player tracking information.

Gaming device 104A may also include a bonus topper wheel 134. When bonus play is triggered (e.g., by a player achieving a particular outcome or set of outcomes in the primary game), bonus topper wheel 134 is operative to spin and stop with indicator arrow 136 indicating the outcome of the bonus game. Bonus topper wheel 134 is typically used to play a bonus game, but it could also be incorporated into play of the base or primary game.

A candle 138 may be mounted on the top of gaming device 104A and may be activated by a player (e.g., using a switch or one of buttons 122) to indicate to operations staff that gaming device 104A has experienced a malfunction or the player requires service. The candle 138 is also often used to indicate a jackpot has been won and to alert staff that a hand payout of an award may be needed.

There may also be one or more information panels 152 which may be a back-lit, silkscreened glass panel with lettering to indicate general game information including, for example, a game denomination (e.g., $0.25 or $1), pay lines, pay tables, and/or various game related graphics. In some embodiments, the information panel(s) 152 may be implemented as an additional video display.

Gaming devices 104A have traditionally also included a handle 132 typically mounted to the side of main cabinet 116 which may be used to initiate game play.

Many or all the above described components can be controlled by circuitry (e.g., a gaming controller) housed inside the main cabinet 116 of the gaming device 104A, the details of which are shown in FIG. 2.

Note that not all gaming devices suitable for implementing embodiments of the present disclosure necessarily include top wheels, top boxes, information panels, cashless ticket systems, and/or player tracking systems. Further, some suitable gaming devices have only a single game display that includes only a mechanical set of reels and/or a video display, while others are designed for bar counters or table tops and have displays that face upwards.

An alternative example gaming device 104B illustrated in FIG. 1 is the Arc™ model gaming device manufactured by Aristocrat® Technologies, Inc. Note that where possible, reference numerals identifying similar features of the gaming device 104A embodiment are also identified in the gaming device 104B embodiment using the same reference numbers. Gaming device 104B does not include physical reels and instead shows game play functions on main display 128. An optional topper screen 140 may be used as a secondary game display for bonus play, to show game features or attraction activities while a game is not in play, or any other information or media desired by the game designer or operator. In some embodiments, topper screen 140 may also or alternatively be used to display progressive jackpot prizes available to a player during play of gaming device 104B.

Example gaming device 104B includes a main cabinet 116 including a main door 154 which opens to provide access to the interior of the gaming device 104B. The main or service door 154 is typically used by service personnel to refill the ticket-out printer 126 and collect bills and tickets inserted into the bill validator 124. The main or service door 154 may also be accessed to reset the machine, verify and/or upgrade the software, and for general maintenance operations.

Another example gaming device 104C shown is the Helix™ model gaming device manufactured by Aristocrat® Technologies, Inc. Gaming device 104C includes a main display 128A that is in a landscape orientation. Although not illustrated by the front view provided, the landscape display 128A may have a curvature radius from top to bottom, or alternatively from side to side. In some embodiments, display 128A is a flat panel display. Main display 128A is typically used for primary game play while secondary display 128B is typically used for bonus game play, to show game features or attraction activities while the game is not in play or any other information or media desired by the game designer or operator. In some embodiments, example gaming device 104C may also include speakers 142 to output various audio such as game sound, background music, etc.

Many different types of games, including mechanical slot games, video slot games, video poker, video black jack, video pachinko, keno, bingo, and lottery, may be provided with or implemented within the depicted gaming devices 104A-104C and other similar gaming devices. Each gaming device may also be operable to provide many different games. Games may be differentiated according to themes, sounds, graphics, type of game (e.g., slot game vs. card game vs. game with aspects of skill), denomination, number of paylines, maximum jackpot, progressive or non-progressive, bonus games, and may be deployed for operation in Class 2 or Class 3, etc.

Figure 2A:
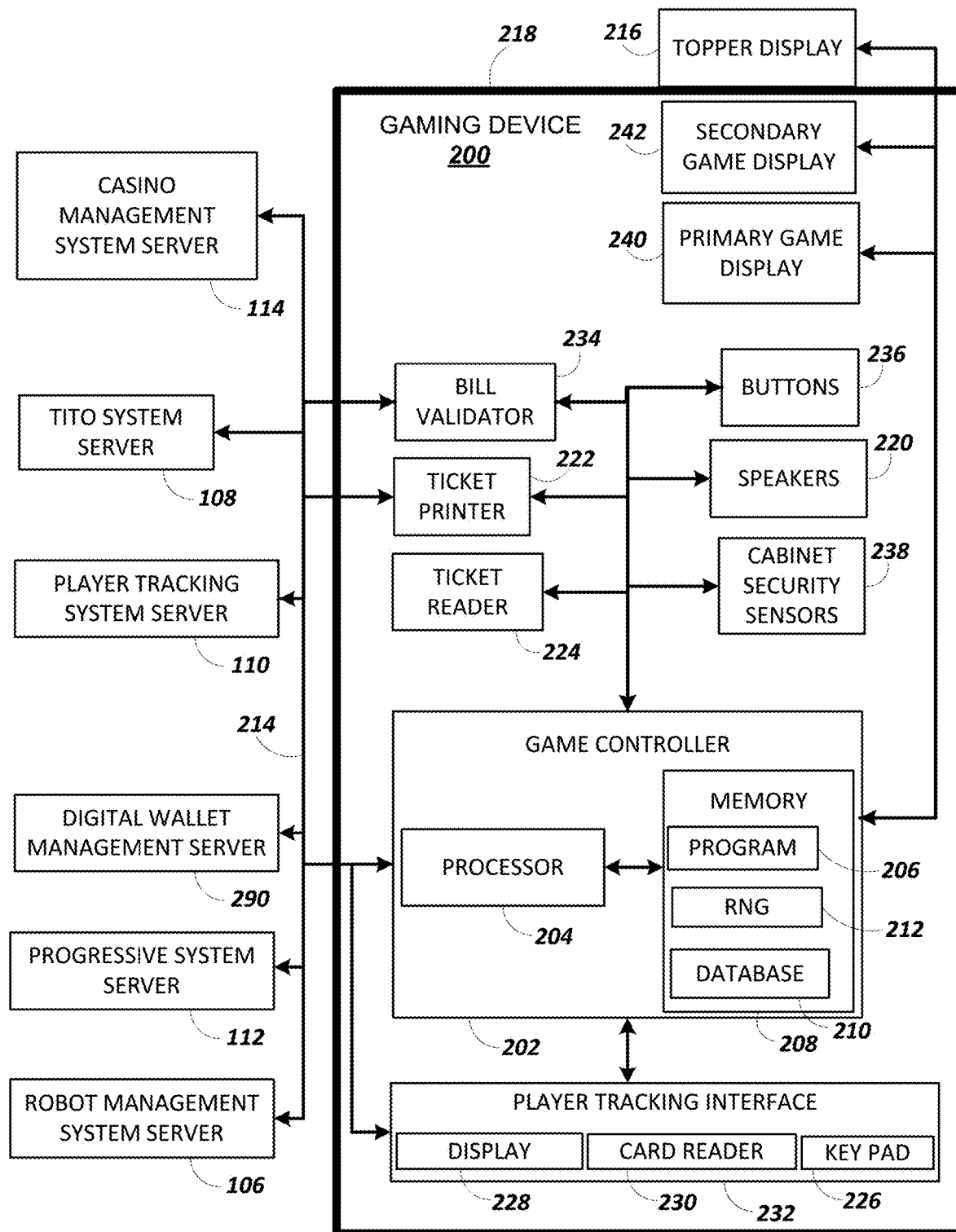
FIG. 2A is a block diagram depicting exemplary internal electronic components of a gaming device connected to various external systems.

FIG. 2A is a block diagram depicting exemplary internal electronic components of a gaming device (or "EGM") 200 connected to various external systems. All or parts of the example gaming device 200 shown could be used to implement any one of the example gaming devices 104A-X depicted in FIG. 1. The games available for play on the gaming device 200 are controlled by a game controller 202 that includes one or more processors 204 and a game that may be stored as game software or a program 206 in a memory 208 coupled to the processor 204. The memory 208 may include one or more mass storage devices or media that are housed within gaming device 200. Within the mass storage devices and/or memory 208, one or more databases 210 may be provided for use by the program 206. A random number generator (RNG) 212 that can be implemented in hardware and/or software is typically used to generate random numbers that are used in the operation of game play to ensure that game play outcomes are random and meet regulations for a game of chance.

Alternatively, a game instance (i.e. a play or round of the game) may be generated on a remote gaming device such as the central determination gaming system server. The game instance is communicated to gaming device 200 via the network 214 and then displayed on gaming device 200. Gaming device 200 may execute game software, such as but not limited to video streaming software that allows the game to be displayed on gaming device 200. When a game is stored on gaming device 200, it may be loaded from a memory 208 (e.g., from a read only memory (ROM)) or from the central determination gaming system server to memory 208. The memory 208 may include RAM, ROM or another form of storage media that stores instructions for execution by the processor 204.

The gaming device 200 may include a topper display 216 or another form of a top box (e.g., a topper wheel, a topper screen, etc.) which sits above cabinet 218. The cabinet 218 or topper display 216 may also house a number of other components which may be used to add features to a game being played on gaming device 200, including speakers 220, a ticket printer 222 which prints bar-coded tickets or other media or mechanisms for storing or indicating a player's credit value, a ticket reader (or ticket scanner) 224 which reads bar-coded tickets or other media or mechanisms for storing or indicating a player's credit value, and a player tracking interface 232. The player tracking interface 232 may include a keypad 226 for entering information, a player tracking display 228 for displaying information (e.g., an illuminated or video display), a card reader 230 for receiving data and/or communicating information to and from media or a device such as a smart phone enabling player tracking. Ticket printer 222 may be used to print tickets for a TITO system server 108. The gaming device 200 may further include a bill validator 234, player-input buttons 236 for player input, cabinet security sensors 238 to detect unauthorized opening of the cabinet 218, a primary game display 240, and a secondary game display 242, each coupled to and operable under the control of game controller 202.

Gaming device 200 may be connected over network 214 to player tracking system server 110. Player tracking system server 110 may be, for example, an OASIS® system manufactured by Aristocrat® Technologies, Inc. Player tracking system server 110 is used to track play (e.g. amount wagered, games played, time of play and/or other quantitative or qualitative measures) for individual players so that an operator may reward players in a loyalty program. The player may use the player tracking interface 232 to access his/her account information, activate free play, and/or request various information. Player tracking or loyalty programs seek to reward players for their play and help build brand loyalty to the gaming establishment. The rewards typically correspond to the player's level of patronage (e.g., to the player's playing frequency and/or total amount of game plays at a given casino). Player tracking rewards may be complimentary and/or discounted meals, lodging, entertainment and/or additional play. Player tracking information may be combined with other information that is now readily obtainable by a casino management system.

Gaming devices, such as gaming devices 104A-104X, 200, are highly regulated to ensure fairness and, in many cases, gaming devices 104A-104X, 200 are operable to award monetary awards (e.g., typically dispensed in the form of a redeemable voucher). Therefore, to satisfy security and regulatory requirements in a gaming environment, hardware and software architectures are implemented in gaming devices 104A-104X, 200 that differ significantly from those of general-purpose computers. Adapting general purpose computers to function as gaming devices 200 is not simple or straightforward because of: 1) the regulatory requirements for gaming devices 200, 2) the harsh environment in which gaming devices 200 operate, 3) security requirements, 4) fault tolerance requirements, and 5) the requirement for additional special purpose componentry enabling functionality of an EGM. These differences require substantial engineering effort with respect to game design implementation, hardware components and software.

When a player wishes to play the gaming device 200, he/she can insert cash or a ticket voucher through a coin acceptor (not shown) or bill validator 234 to establish a credit balance on the gaming machine. The credit balance is used by the player to place wagers on instances of the game and to receive credit awards based on the outcome of winning instances. The credit balance is decreased by the amount of each wager and increased upon a win. The player can add additional credits to the balance at any time. The player may also optionally insert a loyalty club card into the card reader 230. During the game, the player views the game outcome on one or more of the primary game display 240 and secondary game display 242. Other game and prize information may also be displayed.

For each game instance, a player may make selections, which may affect play of the game. For example, the player may vary the total amount wagered by selecting the amount bet per line and the number of lines played. In many games, the player is asked to initiate or select options during course of game play (such as spinning a wheel to begin a bonus round or select various items during a feature game). The player may make these selections using the player-input buttons 236, the primary game display 240 which may be a touch screen, or using some other device which enables a player to input information into the gaming device 200.

During certain game events, the gaming device 200 may display visual and auditory effects that can be perceived by the player. These effects add to the excitement of a game, which makes a player more likely to enjoy the playing experience. Auditory effects include various sounds that are projected by the speakers 220. Visual effects include flashing lights, strobing lights or other patterns displayed from lights on the gaming device 200 or from lights behind the information panel 152 (FIG. 1).

When the player is done, he/she cashes out the credit balance (typically by pressing a "cash out" button to receive a ticket from the ticket printer 222). The ticket may be redeemed for cash money or inserted into another machine to establish a credit balance for further play. In some embodiments, tickets may be redeemed for chips at table games as described below.

While an example gaming device 200 has been described in regard to FIG. 2A, certain aspects of the present disclosure may be implemented by gaming devices that lack one or more of the above-described components. For example, not all gaming devices suitable for implementing aspects of the present disclosure necessarily include top boxes, information panels, cashless ticket systems, and/or player tracking systems. Further, some suitable gaming devices may include a single game display having mechanical reels or a video display. Moreover, other embodiments may be designed for bar tables and have displays that face upwards.

Many different types of wagering games, including mechanical slot games, video slot games, video poker, video blackjack, video pachinko, keno, bingo, and lottery, may be provided by the gaming device 200. In particular, the gaming device 200 may be operable to provide many different instances of games of chance. The instances may be differentiated according to themes, sounds, graphics, type of game (e.g., slot game vs. card game vs. game with aspects of skill), denomination, number of paylines, maximum jackpot, progressive or non-progressive, bonus games, class 2 or class 3, etc.

The gaming device 200 may allow a player to select a game of chance, skill, or combination thereof, to play from a plurality of instances available on the gaming device 200. For example, the gaming device 200 may provide a menu with a list of the instances of games that are available for play on the gaming device 200 and a player may be able to select, from the list, a game that they wish to play.

Figure 2B:
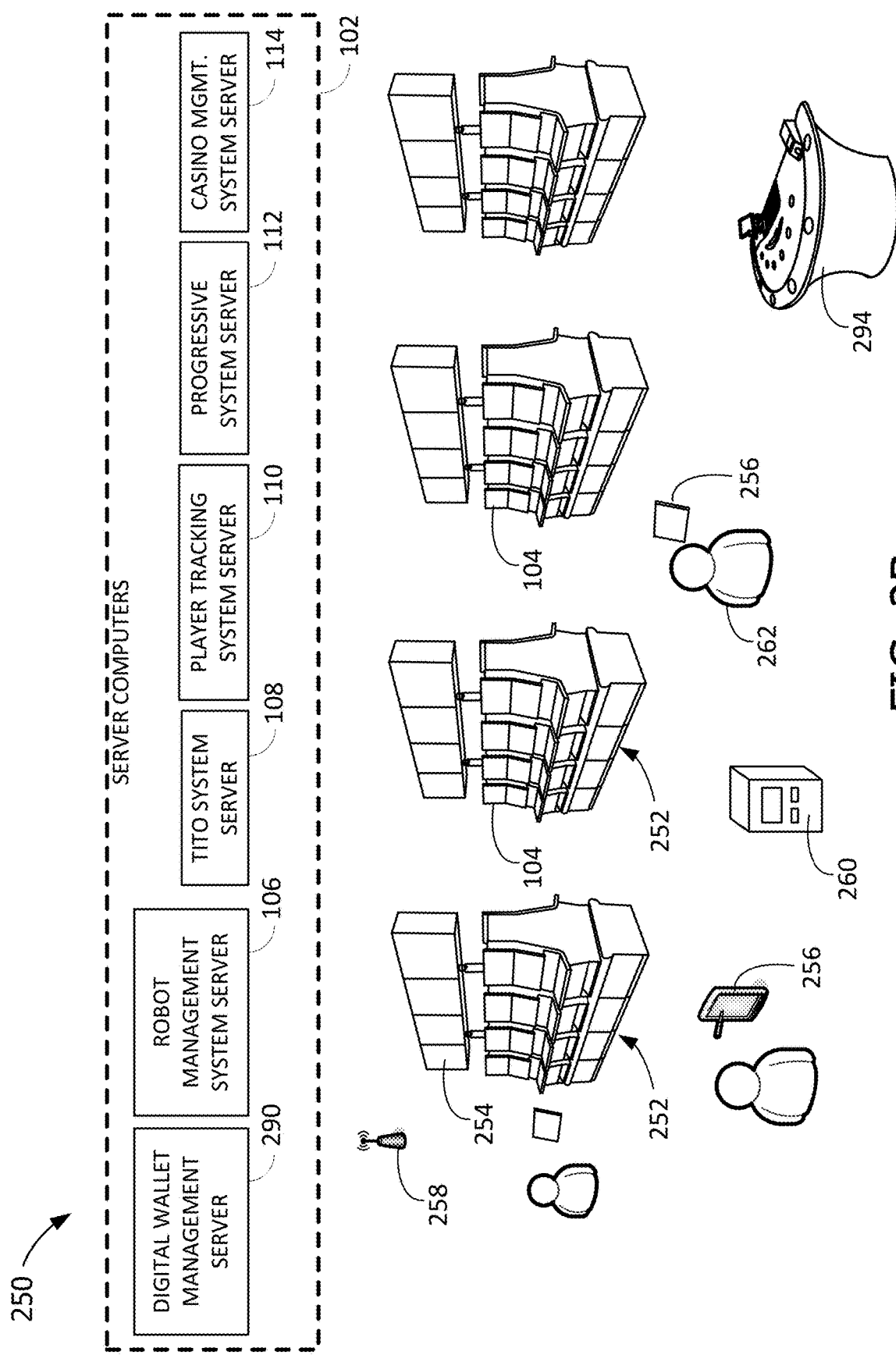
FIG. 2B illustrates an example gaming environment in which the gaming device shown in FIGS. 1 and 2A may appear.

FIG. 2B illustrates an example gaming environment 250 in which the gaming devices 104, 200 shown in FIGS. 1 and 2A may appear. In the example embodiment, the gaming environment 250 is a physical venue of a casino that includes banks 252 of gaming devices 104. In this example, each bank 252 of gaming devices 104 includes a corresponding gaming signage system 254. In this example, the gaming environment 250 includes a gaming table (e.g., a "smart table") 294 that is configured for table gaming. The gaming environment 250 also includes mobile gaming devices 256 which, in various embodiments, may present wagering games or social games. The mobile gaming devices 256 may, for example, include tablet devices, cellular phones, smart phones, or other handheld computing devices. In this example, the mobile gaming devices 256 are configured for communication with one or more other devices in the gaming environment 250, including but not limited to one or more of the gaming devices 104, one or more smart tables 294, one or more kiosk(s) 260, and one or more of the server computers 102, via wireless access points 258. In some implementations, the mobile gaming devices 256 may be configured for communication with one or more other devices in the gaming environment 250, including but not limited to one or more of the gaming devices 104, one or more smart tables 294, one or more kiosk(s) 260, via wireless communications (e.g., near-field communication (NFC), Bluetooth, Wi-Fi, or such, via one of the "beacons" described herein).

According to some examples, the mobile gaming devices 256 may be configured for stand-alone determination of game outcomes. However, in some alternative implementations the mobile gaming devices 256 may be configured to receive game outcomes from another device, such as a central determination gaming system server (not separately shown), one of the gaming devices 104, etc.

Some mobile gaming devices 256 may be configured to accept monetary credits from a credit or debit card, via a wireless interface (e.g., via a wireless payment app), via tickets, via a patron casino account, etc. However, some mobile gaming devices 256 may not be configured to accept monetary credits via a credit or debit card. Some mobile gaming devices 256 may include a ticket reader and/or a ticket printer whereas some mobile gaming devices 256 may not, depending on the particular implementation.

In some embodiments, the gaming environment 250 may include one or more kiosks 260 that are configured to facilitate monetary transactions involving the mobile gaming devices 256, which may include cash out and/or cash in transactions. The kiosk(s) 260 may be configured for wired and/or wireless communication with the mobile gaming devices 256. The kiosk(s) 260 may be configured to accept monetary credits from casino patrons 262 or to dispense monetary credits to casino patrons 262 via cash, a credit or debit card, via a wireless interface (e.g., via a wireless payment app), via tickets, digital wallet, or such. According to some examples, the kiosk(s) 260 may be configured to accept monetary credits from a casino patron and to provide a corresponding amount of monetary credits to a mobile gaming device 256 for wagering purposes (e.g., via a wireless link such as an NFC link). In some such examples, when a casino patron 262 is ready to cash out, the casino patron 262 may select a cash out option provided by the mobile gaming device 256, which may include a real button or a virtual button (e.g., a button provided via a graphical user interface) in some instances. In some such examples, the mobile gaming device 256 may send a "cash out" signal to the kiosk 260 via a wireless link in response to receiving a "cash out" indication from a casino patron. The kiosk 260 may provide monetary credits to the patron 262 corresponding to the "cash out" signal, which may be in the form of cash, a credit ticket, a credit transmitted to a financial account corresponding to the casino patron, a digital wallet account, or such.

In some implementations, a cash-in process and/or a cash-out process may be facilitated by the TITO system server 108. For example, the TITO system server 108 may control, or at least authorize, ticket-in and ticket-out transactions that involve a mobile gaming device 256 and/or a kiosk 260.

Some mobile gaming devices 256 may be configured for receiving and/or transmitting player loyalty information. For example, some mobile gaming devices 256 may be configured for wireless communication with the player tracking system server 110. Some mobile gaming devices 256 may be configured for receiving and/or transmitting player loyalty information via wireless communication with a patron's player loyalty card, a patron's smartphone, etc.

According to some implementations, a mobile gaming device 256 may be configured to provide safeguards that prevent the mobile gaming device 256 from being used by an unauthorized person. For example, some mobile gaming devices 256 may include one or more biometric sensors and may be configured to receive input via the biometric sensor(s) to verify the identity of an authorized patron. Some mobile gaming devices 256 may be configured to function only within a predetermined or configurable area, such as within a casino gaming area (e.g., based on GPS and geofencing).

In example embodiments, the robot management system server 106 manages a fleet of service robots (not shown here) within the venue. The robot management system server 106 is configured to assign tasks to the service robots for support of the players, the gaming operators, or other third parties. In some embodiments, the service robots may autonomously or semi-autonomously instigate tasks to be performed by itself or by other service robots (e.g., via requests sent through the robot management system server 106 or via robot-to-robot communications). The service robots are configured to perform various types of tasks, and may be assigned and configured for particular service roles as described in further detail below.

Figure 2C:
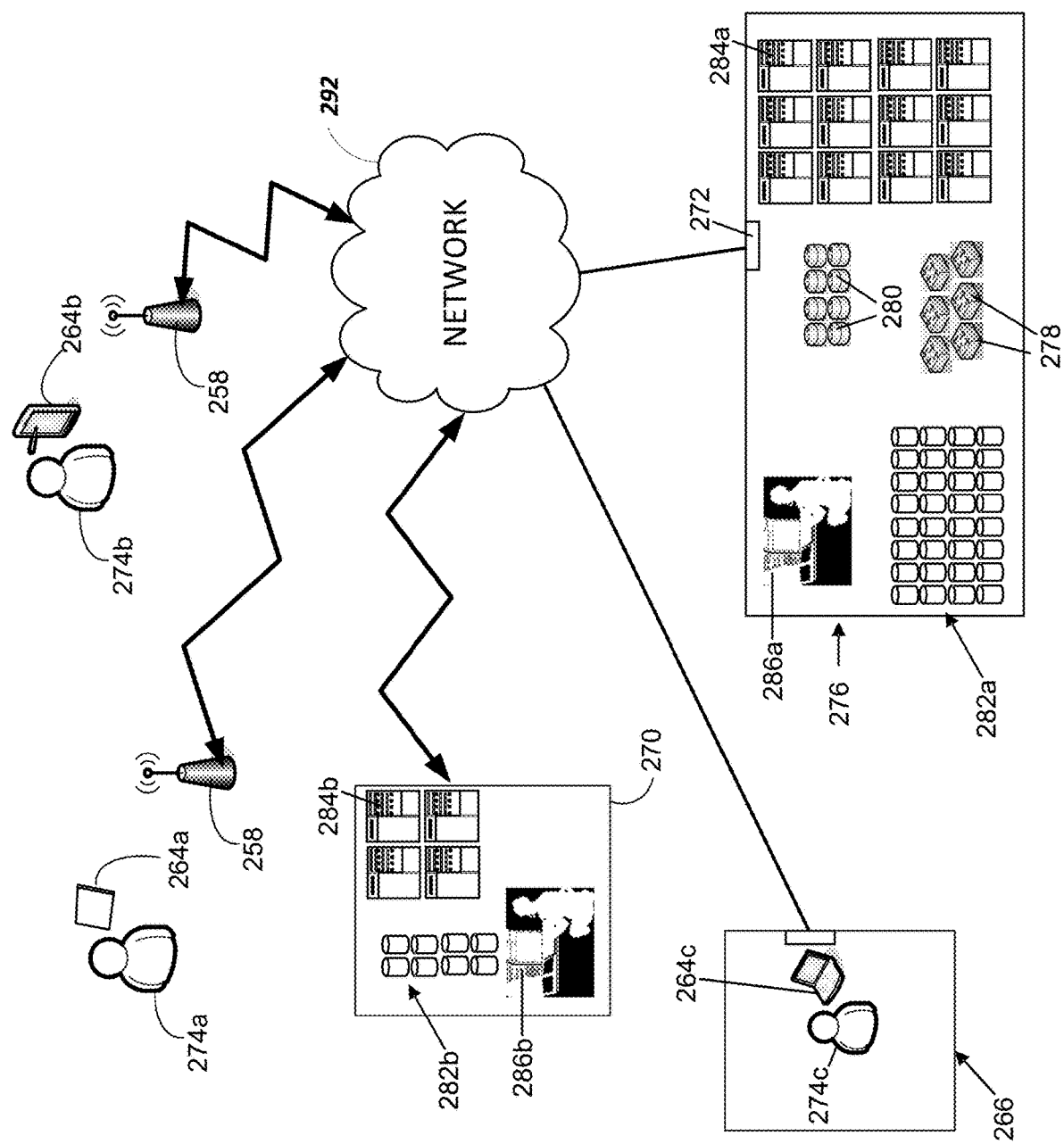
FIG. 2C is a diagram that shows examples of components of a system for providing online gaming according to some aspects of the present disclosure.

FIG. 2C is a diagram that shows examples of components of a system for providing online gaming according to some aspects of the present disclosure. As with other figures presented in this disclosure, the numbers, types and arrangements of gaming devices shown in FIG. 2C are merely shown by way of example. In the example embodiment, various gaming devices, including but not limited to end user devices (EUDs) 264a, 264b and 264c are capable of communication via one or more networks 292. The networks 292 may, for example, include one or more cellular telephone networks, the Internet, Wi-Fi networks, satellite networks, or such. In this example, the EUDs 264a and 264b are mobile devices. For example, the EUD 264a may be a tablet device and the EUD 264b may be a smart phone. The EUD 264c is a laptop computer that is located within a residence 266 at the time depicted in FIG. 2C. Accordingly, in this example the hardware of EUDs 264 is not specifically configured for online gaming, although each EUD 264 is configured with software for online gaming. For example, each EUD 264 may be configured with a web browser, installed gaming applications, player apps, or such. Other implementations may include other types of EUD 264, some of which may be specifically configured for online gaming.

In this example, a gaming data center 276 includes various devices that are configured to provide online wagering games or social games via the networks 292. The gaming data center 276 is capable of communication with the networks 292 via the gateway 272. In this example, switches 278 and routers 280 are configured to provide network connectivity for devices of the gaming data center 276, including storage devices 282a, servers 284a and one or more workstations 286a. The servers 284a may, for example, be configured to provide access to a library of games for online game play or for download and installation by remote devices (e.g., EUDs 264). In some examples, code for executing at least some of the games may initially be stored on one or more of the storage devices 282a. The code may be subsequently loaded onto a server 284a after selection by a player via an EUD 264 and communication of that selection from the EUD 264 via the networks 292. The server 284a onto which code for the selected game has been loaded may provide the game according to selections made by a player and indicated via the player's EUD 264. In other examples, code for executing at least some of the games may initially be stored on one or more of the servers 284a. Although only one gaming data center 276 is shown in FIG. 2C, some implementations may include multiple gaming data centers 276.

In this example, a financial institution data center 270 is also configured for communication via the networks 292. Here, the financial institution data center 270 includes servers 284b, storage devices 282b, and one or more workstations 286b. According to this example, the financial institution data center 270 is configured to maintain financial accounts, such as checking accounts, savings accounts, loan accounts, payment card accounts, rewards accounts, loyalty accounts, player accounts, digital wallet accounts, or such. In some implementations one or more of the authorized users 274a-274c may maintain at least one financial account with the financial institution that is serviced via the financial institution data center 270.

According to some implementations, the gaming data center 276 may be configured to provide online wagering games in which money may be won or lost, or various social games, some of which may use virtual currencies. According to some such implementations, one or more of the servers 284a may be configured to monitor player credit balances, which may be expressed in game credits, in real or virtual currency units, or in any other appropriate manner. In some implementations, the server(s) 284a may be configured to obtain financial credits from and/or provide financial credits to one or more financial institutions, according to a player's "cash in" selections, wagering game results and a player's "cash out" instructions. According to some such implementations, the server(s) 284a may be configured to electronically credit or debit the account of a player that is maintained by a financial institution, e.g., an account that is maintained via the financial institution data center 270. The server(s) 284a may, in some examples, be configured to maintain an audit record of such transactions.

In some embodiments, the gaming data center 276 may be configured to provide online wagering games for which credits may not be exchanged for cash or the equivalent. In some such examples, players may purchase game credits for online game play, but may not "cash out" for monetary credit after a gaming session. Moreover, although the financial institution data center 270 and the gaming data center 276 include their own servers and storage devices in this example, in some examples the financial institution data center 270 and/or the gaming data center 276 may use offsite "cloud-based" servers and/or storage devices. In some alternative examples, the financial institution data center 270 and/or the gaming data center 276 may rely entirely on cloud-based servers.

One or more types of devices in the gaming data center 276 (or elsewhere) may be capable of executing middleware, e.g., for data management and/or device communication. Authentication information, player tracking information, etc., including but not limited to information obtained by EUDs 264 and/or other information regarding authorized users of EUDs 264 (including but not limited to the authorized users 274a-274c), may be stored on storage devices 282 and/or servers 284. Other game-related information and/or software, such as information and/or software relating to leaderboards, players currently playing a game, game themes, game-related promotions, game competitions, etc., also may be stored on storage devices 282 and/or servers 284. In some implementations, some such game-related software may be available as "apps" and may be downloadable (e.g., from the gaming data center 276) by authorized users.

In some examples, authorized users and/or entities (such as representatives of gaming regulatory authorities) may obtain gaming-related information via the gaming data center 276. One or more other devices (such EUDs 264 or devices of the gaming data center 276) may act as intermediaries for such data feeds. Such devices may, for example, be capable of applying data filtering algorithms, executing data summary and/or analysis software, etc. In some implementations, data filtering, summary and/or analysis software may be available as "apps" and downloadable by authorized users.

In some embodiments, the financial institution data center 270 may be configured for communication with one or more devices in the gaming environment 250. As noted above, the mobile gaming devices 256 may or may not be specialized gaming devices, depending on the particular implementation. In some examples, the mobile gaming devices 256 may be end user devices (EUDs 264), such as tablet devices, cellular phones, smart phones and/or other handheld devices. For example, referring again to FIG. 2B, a digital wallet management server 290 may include some of the server computers 102. (As used herein, the terms "mobile wallet" and "digital wallet" will be used synonymously.) The digital wallet management server 290 may be configured for communication with one or more financial institution data centers, such as data centers configured for implementing bank accounts (e.g., checking accounts), credit card accounts, debit card accounts, digital wallets, and such.

The digital wallet management server 290 may be configured to provide functionality related to digital wallets, including but not limited to the establishment of digital wallet accounts and implementing financial transactions made via digital wallets. The digital wallet management server 290 may communicate with, for example, the mobile gaming devices 256 (such as smartphones of users associated with digital wallets), with the gaming devices 104, with the smart table 294, with kiosks 260, or with other devices or entities, such as devices associated with merchants or service providers, for the purposes of completing various financial transactions involving digital wallets. These financial transactions may include, but are not limited to, financial transactions relating to wager gaming, such as providing credits for wager gaming on an EGM, providing credits for table gaming, facilitating cash out transactions relating to wager gaming on gaming devices 104 or at smart tables 294, establishing lines of credit or markers, or paying back debts such as markers. In some embodiments, a digital wallet may be used for purposes other than wager gaming (e.g., at a casino restaurant, a casino bar, a casino entertainment venue and/or a casino retail store, for reward collection and redemption). In some implementations a digital wallet may be used for transactions outside the casino context. For example, the digital wallet may be used during online gaming (e.g., to purchase apps, virtual currency, or other in-game purchases), for making in-store or online purchases (e.g., purchases of goods or services related to a casino but available online), or such. One or more devices of the digital wallet management server 290 may be configured to provide security (e.g., encryption, authentication, authorization) for communications involving transactions made via a digital wallet.

In some embodiments, the gaming environment 250 may include one or more kiosks 260. According to some implementations, the kiosk(s) 260 may be part of the digital wallet management server 290 even though in FIG. 2B the kiosk(s) 260 and the digital wallet management server 290 are shown separately. The kiosk(s) 260 may be configured for communication with other devices of the digital wallet management server 290 (e.g., with one or more servers of the digital wallet management server 290), for example, to allow digital wallet-based transactions at the kiosk 260 (e.g., purchasing credits from a digital wallet account to cash or to a TITO ticket, redeeming a TITO ticket to a digital wallet account, redeeming a reward stored in a digital wallet).

In some embodiments, the kiosk(s) 260 may be configured to facilitate monetary transactions involving a digital wallet (e.g., monetary transactions involving digital wallet software being executed by one or more of the mobile gaming devices 256). Such transactions may include, but are not limited to, cash out and/or cash in transactions. The kiosk(s) 260 may be configured for wired and/or wireless communication with the mobile gaming devices 256. The kiosk(s) 260 may be configured to accept monetary credits from casino patrons 262 and/or to dispense monetary credits to casino patrons 262 via cash, a credit or debit card, via a wireless interface (e.g., via a wireless payment app), via tickets, etc. Accordingly, in some such examples, the kiosk(s) 260 may be configured for communication with one or more financial institution data centers.

In some embodiments, the kiosk(s) 260 may be configured to accept monetary credits from a casino patron and to provide a corresponding amount of monetary credits to a mobile gaming device 256 for wagering purposes (e.g., via a wireless link such as a near-field communications link). According to some implementations, a digital wallet app running on one of the mobile gaming devices 256 (e.g., on a patron's cell phone) may be configured for wireless communication with gaming devices 104, smart tables 294, or such (e.g., to provide digital wallet-based, cashless "cash-out" and/or "cash-in" transactions at location). In some such examples, when a casino patron 262 is ready to cash out, the casino patron 262 may select a cash out option provided by a mobile gaming device 256, which may include a real button or a virtual button (e.g., a button provided via a graphical user interface) in some instances. In some such examples, the mobile gaming device 256 may send a "cash out" signal to a kiosk 260 via a wireless link in response to receiving a "cash out" indication from a casino patron. The kiosk 260 may provide monetary credits to the patron 262 corresponding to the "cash out" signal, which may be in the form of cash, a credit ticket, a credit transmitted to a financial account corresponding to the casino patron, etc.

In some implementations, the kiosk 260 may be configured to authorize and/or initiate a download of digital wallet software to a patron's mobile device. In some examples, a server of the digital wallet management server 290 may be configured for storing and updating digital wallet software, and for downloading digital wallet software to a patron's mobile device.

In some embodiments, the digital wallet management server 290 may be configured for communication with one or more devices that are configured to implement a player loyalty program, such as the player tracking system server 110. In some embodiments, a member of a casino player loyalty program may input at least some of the member's casino player loyalty program information during the process of creating a digital wallet account. According to some such implementations, the kiosk 260 may be configured as an interface for creating digital wallet accounts. In some examples, during a process of creating a digital wallet account a person may provide casino player loyalty program information to the kiosk 260 by inserting or swiping a player loyalty program card. Alternatively, or additionally, the kiosk 260 may be configured to accept manually-input information that may include, but may not be limited to, casino player loyalty program information.

In some examples, at least some of the mobile gaming devices 256 may be configured for implementing digital wallet transactions with a gaming device 104 or a smart table 294 via Bluetooth or NFC. According to some implementations, the gaming device 104 or smart table 294 may be configured to provide a Bluetooth low-energy (LE) beacon for establishing wireless communication with at least some of the mobile gaming devices 256. In some implementations, the mobile gaming device 256 may implement digital wallet transactions (such as cash in or cash out transactions) with the gaming device 104 or smart table 294 directly, via NFC or Bluetooth. In other implementations, the gaming device 104 or smart table 294 may be able to transmit communications to a mobile gaming device via NFC or the Bluetooth (LE) beacon, but the mobile gaming device may be required to provide input to the gaming device 104 or smart table 294 indirectly (e.g., via one or more devices of a player loyalty system or of a digital wallet management system).

Some embodiments provide alternative methods of establishing a "cardless" connection between a mobile gaming device and an EGM 104 or a smart table 294. In some such implementations, a player tracking interface of the gaming device 104 or smart table 294 may be configured to establish a wireless connection and a cardless player tracking session with a mobile gaming device. For example, the gaming device 104 may be configured to establish a wireless connection and a cardless player tracking session with a mobile gaming device via the player tracking interface 232 that is described above with reference to FIG. 2A. A smart table 294 may be configured to establish a wireless connection and a cardless player tracking session with a mobile gaming device.

In some examples, a player tracking interface of the gaming device 104 or smart table 294 may be configured for wireless communication with a mobile gaming device (e.g., via Bluetooth or NFC). In some such examples, the player tracking interface may include a user interface (e.g., a GUI or a physical button) with which a player can interact in order to obtain a passcode from the player tracking interface. The passcode may, for example, be an RNG code. The passcode may be provided to the player via a display of the player tracking interface. The player may be required to input the code (e.g., via the mobile gaming device) in order to pair the mobile gaming device with the player tracking interface and enable digital wallet transactions with the EGM or the smart table. According to some such implementations, a "cardless" player loyalty session may also be established when the mobile gaming device is paired with the player tracking interface.

Accordingly, in some embodiments, the digital wallet management server 290 may be configured to implement aspects of a casino player loyalty program related to digital wallets and to allow for cardless connection to gaming devices 104, smart tables 294, or kiosks 260. For example, the digital wallet management server 290 may be configured for establishing a rules engine for digital wallets, implementing the rules engine for digital wallets, etc. The rules engine may be configured, at least in part, according to criteria relating to a casino player loyalty program.

Figure 3A:
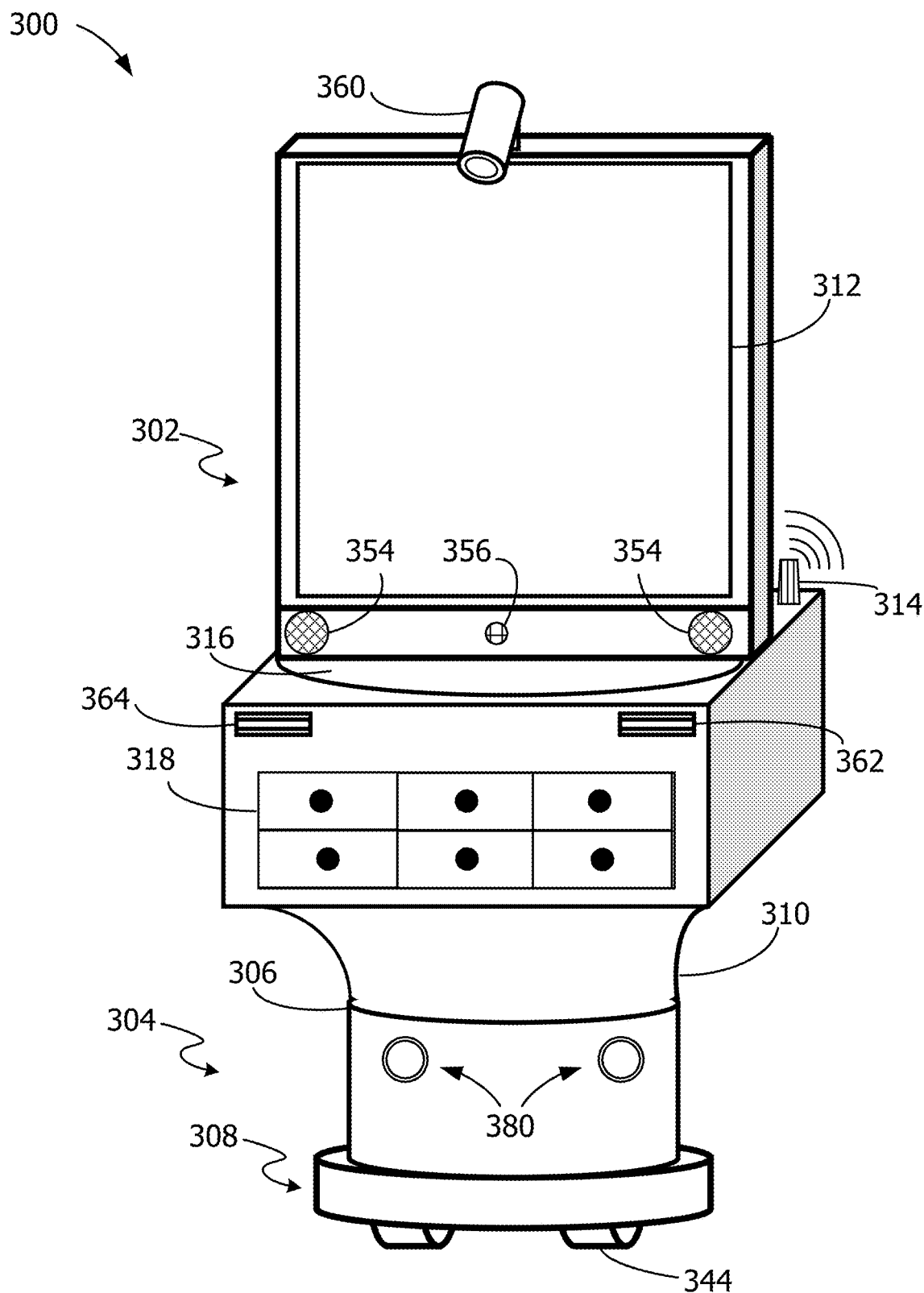
FIG. 3A depicts an example service robot that is managed by the robot management system server.
Figure 3B:
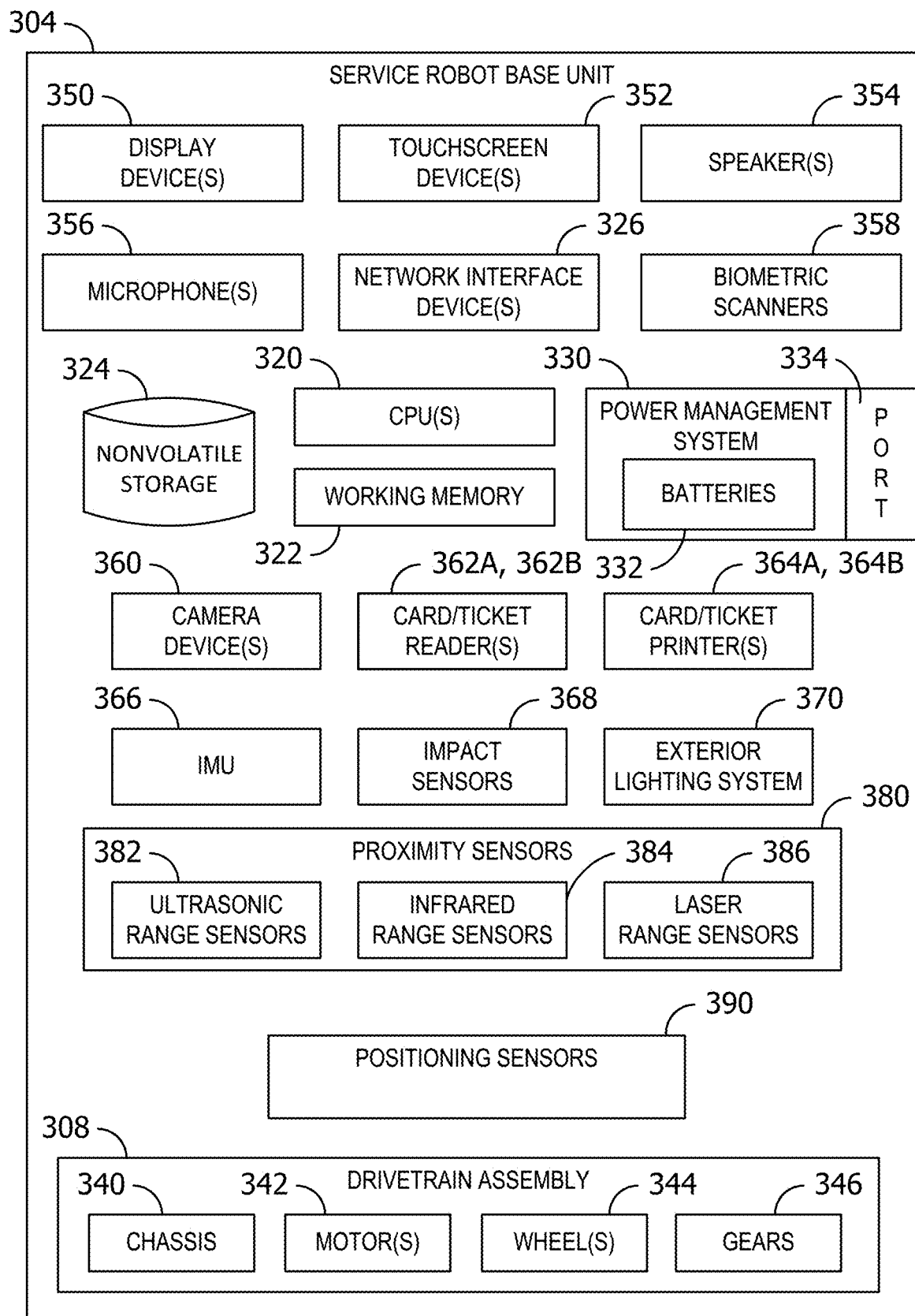
FIG. 3B illustrates various hardware components of the service robot.
Figure 3C:
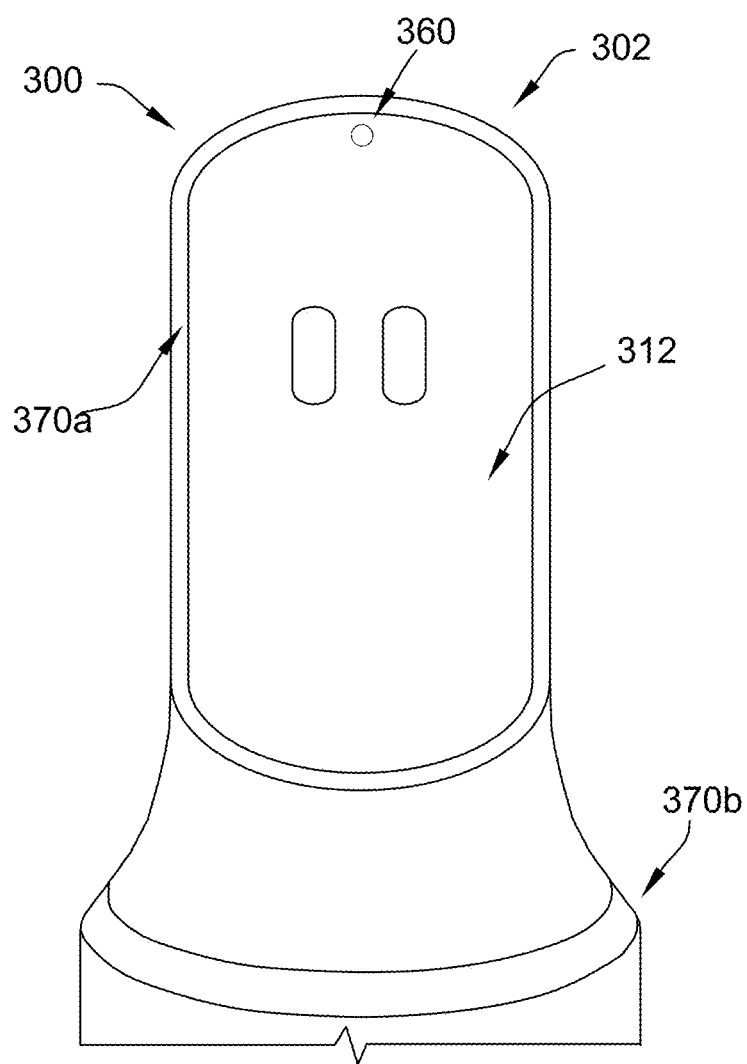
FIG. 3C illustrates various components of the service robot according to an implementation.

FIGS. 3A, 3B and 3C illustrate components of a service robot 300 according to an example embodiment. FIG. 3A depicts an example service robot 300 that is managed by the robot management system ("RMS") server 106. In the example embodiment, the service robot 300 includes a robot head (or "head unit") 302, a robot base (or "base unit") 304, and a body module 310. The base unit includes a drivetrain assembly 308 with wheels 344 that enables robot mobility. The base unit 304 also includes a chassis (not separately shown) that houses various hardware components enclosed by a cover shell that secures the interior of the base unit 304 and its components. Robot navigation may be supported by an array of proximity sensors 380 (e.g., range sensors, camera devices, thermal cameras) which the robot uses to detect and avoid nearby obstacles while moving (e.g., walls, gaming devices, patrons, or the like). The head unit 302, in the example embodiment, includes a touchscreen display 312 that allows digital video output and touchscreen input. In some embodiments, the display 312 is mounted to a rotatable platform 316 (e.g., turntable) that allows the robot 300 to rotate the display 312 relative to the body module 310. In some embodiments, the head unit 302 may also include one or more speakers 354 or microphones 356 for audio output or input, respectively. The head unit 302 also includes a camera device 360 configured to capture digital images or video near the robot 300, which may be used for navigation functions, human detection, patron recognition, or other various use cases described herein. The body module 310, in this example, includes a bill/ticket/card reader 362 and a ticket/card printer 364, which may be similar to the bill validator 234, ticket reader 224, and ticket printer 222 shown in FIG. 2A. The body module 310 also includes multiple secured containers 318 within which the robot 300 may store items for delivery to patrons. In some embodiments, the body module 310 may include open storage containers (not separately shown).

In the example embodiment, the head unit 302 is mechanically and removably coupled to the body module 310 at a coupling joint 306 (e.g., fixedly coupled or rotatably coupled). In some embodiments, the head unit 302 may be electrically coupled to the body module 310 at coupling joint 306 (e.g., for power or data transfer between units 302, 304). For example, the coupling joint 306 may include power connectivity between the base unit 304 and the head unit 302, allowing a power supply (not separately shown in FIG. 3A) contained within the base unit 304 to provide power for powered components of the head unit 302. In some embodiments, the coupling joint 306 includes wired data connectivity between the base unit 304 and the head unit 302 (e.g., allowing data bus connectivity between processing components of the base unit 304 (e.g., CPU) and sensors or other devices of the head unit 302 (e.g., camera device input data, graphical display output data, or the like). In some embodiments, the head unit 302 may transmit data to or from the base unit 304 via wireless connectivity (e.g., NFC, Bluetooth, or the like). In some embodiments, the head unit 302 may include wireless communications device(s) 314 that allow the head unit 302 to independently communicate with other networked devices, systems, or servers (e.g., not through the base unit 304). In some embodiments, the head unit 302 may include a robotic arm (not shown) that can be configured to interact with the environment through extension, retraction, and positioning of the arm and a terminal organ (or "end effectuator") at a working end of the arm. Such an arm may be configured to, for example, press buttons on a gaming device 104 during maintenance operations, pick up trash for deposit into a trash receptacle (e.g., into typical trash receptacles at known locations within the operations venue, or into an on-board trash receptacle on the robot 300).

FIG. 3B illustrates various hardware components of the service robot 300. In the example embodiment, the components are illustrated as being contained within the service robot base unit 304. However, it should be understood that these components could appear, additionally or alternatively, in the head unit 302 or body module 310. In this example, the service robot 300 includes one or more CPUs 320 that use working memory 322 (e.g., random access memory or the like) and non-volatile storage 324 (e.g., solid state drive, disk drive, or the like) to execute an operating system and various software systems for controlling operation of the robot 300 and the various components. The CPUs 320 may be connected to any or all of the components in the robot 300 (e.g., via internal data busses, networks, or wireless channels, not shown) such as to allow control and communication with the components as described herein. In some embodiments, CPUs 320 may include one or more dedicated processing CPUs such as, for example, one or more graphics processing units (GPUs), each of which may include additional dedicated memory. Aspects of software configuration and operation are described in greater detail below with respect to FIG. 4. Further, while not separately depicted here, the base unit 304 and the head unit 302 may each include a chassis structure configured to house any or all of the components shown here, some of which may be arranged in a particular configuration such as to facilitate their functionality (e.g., exterior positioning such as to establish field of use for the particular device).

The service robot 300, in the example embodiment, also includes a power management system 330 that is configured to provide electrical power to any or all of the components of the robot 300. The power management system 330 includes a bank of one or more rechargeable batteries 332, as well as a recharging port (or just "port") 334 that provides an interface through which the batteries 332 can be recharged from an external power source (e.g., at a recharging station). In some embodiments, the port 334 includes an electrical coupling interface (e.g., plug) that may be mechanically coupled to a complementary interface to repower the batteries 332 (e.g., at a recharging station or the like). For example, the operations venue may include a designated area that is configured with one or more recharging stations for service robots 300. The robot 300 may be configured to move to a recharging station upon command from the robot management system server 106 or autonomously (e.g., upon detecting that a remaining charge level is below a pre-determined threshold). In some embodiments, the robot management system may be configured to centrally orchestrate recharging amongst a fleet of robots 300 by monitoring battery life remaining and determining when to send particular robots 300 to recharge while leaving enough active robots 300 to field service requests (e.g., having the lowest two robots 300 going to recharge while the remaining eight robots 300 of a fleet of ten remain in service). Upon arrival at the recharging station, the robot 300 may automatically mate with ("dock at") the recharging station by arranging the port 334 to be aligned with a particular position on the recharging station (e.g., the complementary recharging port) and moving the robot 300 until the port 334 is properly connected. In some embodiments, the port 334 includes a wireless coupling interface that allows the batteries 332 to be wirelessly recharged at a complementary wireless recharging location when properly positioned proximate the complementary recharging interface. In some scenarios, the robot 300 may be manually connected to the recharging station or via a power cord (e.g., by a service technician or other human support personnel).

In the example embodiment, the service robot 300 also includes one or more network interface devices 326 that enable wireless communication between the robot 300 and various wireless networks described herein. For example, the robot 300 may include a Wi-Fi network interface that allows wireless connection to one or more Wi-Fi access points installed at the operations venue. Such wireless network access provides network connectivity to the robot management system server 106 and may provide network connectivity to other infrastructure servers and networks such as network 214, to other robots 300, or to the Internet. In some embodiments, network interface devices 326 may include NFC beacons (active or passive), Bluetooth beacons, or other wireless network devices that allow proximity connection to nearby devices. Such proximity connections may allow the robot 300 to wirelessly communicate with nearby gaming devices 200, kiosks 260, personal devices 256 or EUDs 264, or with recharging stations. In some embodiments, network interface devices 326 may include cellular network interfaces (e.g., for connectivity to 3G/4G/5G cellular networks).

In the example embodiment, the drivetrain assembly 308 of the robot 300 includes a chassis 340 housing one or more electric motors 342 that drive a plurality of wheels 344, in this example embodiment. Gears (or gear boxes) 346 are configured to transfer power from the motors 342 to turn the wheels 344. The drivetrain assembly 308 is configured to move the robot 300 within the operations venue during operation based on operations received from the CPUs 320. In some embodiments, the drivetrain assembly 308 is configured as a tank drive configuration, which provides two independent treads or tracks (and associated wheels) to provide longitudinal movement (e.g., forward and backward, based on orientation of the chassis) and to turn the robot 300. In some embodiments, the drivetrain assembly 308 is configured as a mecanum drive configuration, which provides mecanum wheels with specialized angled rollers to additionally allow lateral (side-to-side, or "strafing") movement. In some embodiments, the drivetrain assembly 308 is configured as a slide drive (e.g., "H-drive"), which provides a tank drive modified with omni-directional wheels (e.g., "omni wheels") in place of typical traction type wheels, as well as an additional omni wheel oriented perpendicular to the other wheels to provide lateral movement. In some embodiments, the drivetrain assembly 308 is configured as a butterfly drive (or a grasshopper drive), which includes four butterfly modules (not shown) at each corner of the chassis 340, where each butterfly module includes a traction wheel and an omni wheel that may be alternatively be shifted to engage one or the other, depending on movement demands. In some embodiments, the drivetrain assembly 308 is configured as a kiwi drive (or a "holonomic drive"), which uses three omni wheels in triangular configuration to enable 360 degree surface movement. In some embodiments, the drivetrain assembly 308 is configured as a swerve drive, which is a holonomic drive train in which all drive wheels are independently driven and steered, allowing the robot 300 to move in any direction and independently change chassis orientation. Any other type of drivetrain that enables the systems and methods described herein may be used. It should be understood that FIG. 3B illustrates only the basic components of an example drivetrain assembly 308, and that other components may be used, but are excluded here for purposes of brevity (e.g., various rotary, linear, or incremental drivetrain encoders, transducers, and so forth).

The robot 300 also includes one or more display devices (or just "displays") 350 in the example embodiment. Display devices 350 provide graphical output to users (e.g., players, service technicians, operators) during operation. Displays 350 can include monochrome or color displays of any size, resolution, or color depth, such as high definition or 4K displays. Any of the displays 350 may also include touchscreen device(s) 352 (e.g., overlaid on the display device 350) that allow the user to interact with the robot by providing touch input in conjunction with graphical output provided on the underlying display 350 (e.g., touch gestures provided via virtual buttons or other digital objects provided on the display). The robot 300 may be configured to provide a graphical user interface (GUI) to users for a variety of functions, such as for kiosk operations, ordering of food or beverages, displaying mobile advertising, playing electronic games, or the like. The robot 300 may include multiple displays 350 for differing functions, such as a large "primary display" oriented to face the primary user during a task (e.g., providing an interactive GUI with virtual keyboard), one or more secondary displays oriented away from the user (e.g., providing mobile advertising), and a service display (e.g., a small display providing status information, maintenance information, current task information, or the like).

The robot might have a 3D fan display 'head', e.g., enclosed in a transparent (glass, Plexiglas, etc.) dome, used to provide dynamic display of, e.g., a humanistic head, or a robot head, or other information such as a coin, vehicle, dollar sign (e.g., $) or dollar amount image that might be an award.

In some embodiments, the robot 300 may include one or more audio output devices (or "speakers") 354 and one or more audio input devices (or "microphones") 356. The speakers 354 may, for example, provide audible advertisements, audio output of an electronic game, or accessibility audio. The microphones 356 may capture local audio input, for example, to accept verbal commands or interactions from the user, to perform voice recognition of the user (e.g., for user authentication, voice recognition), or to capture ambient noise at a particular location (e.g., for evaluation of noise levels or operational function of a gaming device 200). In some embodiments, the speakers 354 and microphones 356 may be used together to provide integrated audio interaction between the user and the robot 300 (e.g., accepting and responding to voice commands, providing verbal questions or queries). In some embodiments, the robot 300 may be configured to display closed captioning of speech content output by the robot 300. In some embodiments, the robot 300 may be configured to provide entertainment functions through use of the displays 350 and speakers, including playing songs or videos, telling jokes, performing animated movements or dances (e.g., alone or with other robots 300), or any combination thereof.

In some embodiments, the robot 300 may include one or more biometric scanners 358 that may be used for user authentication. For example, the robot 300 may include a fingerprint reader or hand print reader for scanning a fingerprint or hand geometry of the user. The robot 300 may include a retinal scanner for performing iris recognition of the user. In some embodiments, input from the microphones 356, camera devices 360, or thermal cameras (not separately shown) may be used to capture biometric data (e.g., voice samples for voice recognition, facial images or thermal images for facial recognition, emotion detection, head geometry, or the like). In some embodiments, thermal data may be used to detect the presence and focus of a nearby patron, thus causing the robot 300 to turn attention to that patron.

The robot 300, in the example embodiment, also includes one or more camera devices 360. Some camera devices 360 capture digital video input data (or just "camera data") in a field of view ("FOV") near the robot 300 which may be used for a variety of purposes. Such camera data may include still images or full motion video (e.g., 30 frames per second, or the like, in black and white, full color). In some embodiments, the captured camera data may be used for purposes of robot movement. For example, the captured camera data may be used for object detection, object recognition, obstacle avoidance, position determination within the venue, or travel orientation. In some embodiments, some camera devices 360 may be 3D depth cameras configured to capture 3D depth data. Such depth data can similarly be used for such movement functions. Some camera data may be used for facial recognition to authenticate users. Some still images or full motion video camera data may be used to evaluate health status of gaming devices 200 (e.g., to detect damaged components, malfunctioning components, or the like). Some camera data may be used for security operations (e.g., fraud detection). In some embodiments, the camera data may be used to provide users with personal photos of themselves and their companions, or to capture a profile image of the user (e.g., for loyalty account registration). In some embodiments, the robot 300 may include a thermal camera that can similarly be used, for example, for object detection, obstacle avoidance, and the like.

In some embodiments, the robot 300 may be configured to include one or more card readers 362A or ticket readers 362B (collectively, "readers 362"). For example, card readers 362A may include optical or magnetic readers to scan player loyalty cards of players, thereby allowing the user to identify themselves to the robot 300 by scanning or swiping their card. Card readers 362A may include magnetic or chip readers to scan payment cards (e.g., credit or debit cards, reward cards), thereby allowing the user to conduct payment card transactions via the robot 300 (e.g., food/beverage purchases, hotel check-in or check-out, event ticket purchases, gaming transactions, or the like). Ticket readers 362B may include optical scanners configured to, for example, accept, read an optical image from, and retain TITO tickets (e.g., in an internal, secured ticket collector), thereby allowing the user to, for example, provide funds for wager gaming at the robot 300 via an valid TITO ticket, deposit funds into their personal accounts via a valid TITO ticket, or redeem reward tickets issued through the TITO system. In some embodiments, the card readers 362A may be configured to scan or read and extract information from drivers licenses of patrons (e.g., optical code, mag stripe, optical character recognition ("OCR") of a digital image). The card readers 362A may include radio-frequency identification ("RFID") readers configured to, for example, read RFID tags from hotel key cards or other devices.

In some embodiments, the robot 300 may be configured to transact with users via contactless payment. For example, the robot 300 may include an RFID or NFC receiver (e.g., antenna, as a reader device 362) positioned near a surface of the robot 300, which may be identified by a visible symbol or lighting that identifies where the user is able to position the contactless payment device (user device, e.g., smart phone, mobile gaming device 256, chipped payment card, or the like) during a contactless payment transaction. The robot 300 may provide lighting or display a symbol or other indicia indicating when the robot 300 has activated the reader device 362 to accept a contactless payment. The robot 300 may additionally or alternatively provide a change in lighting to indicate when the robot 300 has effectively communicated with the contactless payment device and completed acquiring the payment information or completed the transaction. The contactless payment device may include a digital wallet or other contactless payment application and associated devices to enable wireless communication with or by the robot 300 and the user device. The robot 300 may allow users to complete payment transactions via contactless payment for various goods or services described herein, such as, for example, purchasing food or beverages (e.g., from a bar or restaurant provided at the venue, for immediate acquisition of food or beverages contained within the robot 300, or the like), purchasing show tickets, purchasing lodging or parking accommodations (e.g., hotel charges, valet charges), tipping staff, or other goods or services offered by the venue. In some embodiments, the robot 300 may provide various kiosk services and may allow contactless transactions for such services. For example, a player seated at a gaming device, a gaming table, or otherwise within the gaming venue, may interact with the robot 300 to acquire gaming credit (e.g., TITO ticket, gaming chips). The robot 300 may allow contactless payment from the player via their user device for a particular credit amount, and the robot 300 may then provide the credit amount to the player via generating and printing a TITO ticket (e.g., via an embedded ticket printer 354B) or dispensing the credit amount in chips (e.g., from an internal chip reservoir to a chip dispenser slot, neither shown, or through a task to fetch and deliver the credited amount in chips from a cashier cage or kiosk to the player).

In some embodiments, the robot 300 may be configured to include a card printer 364A or a ticket printer 364B (collectively, "printers 364"). For example, card printer 364A may be configured to print and issue player loyalty cards to new or existing loyalty account holders. Card printer 364A may be configured to issue hotel key cards for guests of a related hotel property. Ticket printer 364B may include a TITO ticket printer, such as ticket printer 222 (shown in FIG. 2A). As such, the robot 300 may be configured to issue TITO tickets, for example, after a gaming session at the robot 300, as a kiosk withdrawal transaction, during a reward redemption, or the like. In some embodiments, the robot 300 may include other types of printers, for example, laser printers or ink jet printers configured to print on sheet paper (e.g., 8.5×11 inch sheets), on roll paper (e.g., for printing of sales transaction receipts), or particular venue tickets (e.g., for printing show tickets or the like). In some embodiments, the robot 300 may be configured with one or more magnetic, optical scanner devices or chip readers (not separately shown). Such scanner devices may be configured to read data from, for example, loyalty cards, payment cards, rewards vouchers, hotel key cards, coupon vouchers, or the like.

In some embodiments, the robot 300 includes an inertial measurement unit ("IMU") 366 that is configured to measure aspects of movement data such as force, angular rate, linear acceleration, or orientation of the robot 300. The IMU 366 may include, for example, one or more accelerometers, magnetometers, gyroscopes (e.g., microelectromechanical systems "MEMS") gyroscope), or any combination thereof. In some embodiments, the IMU 366 includes any or all of an accelerometer, a magnetometer, and a gyroscope for any or all of three potential axes of motion. Such data may be used by the robot 300 as part of a navigation system to determine, for example, velocity of the robot 300, position of the robot 300, or to detect malfunction, impact to, or tipping of the robot 300. In some embodiments, the IMU 366 may include a tilt sensor to detect tilting of the robot 300 (e.g., beyond a pre-determined operational threshold).

In some embodiments, the robot 300 includes one or more collision detection (or "impact") sensors 368. Impact sensors 368 are used by the robot 300 to detect collisions between the robot 300 and other stationary or moving objects as the robot 300 moves through the operations venue or to detect other impacts to the robot 300. Example impact sensors 368 may include, for example, push button switches, limit switches, tactile bumper switches. Upon detection of physical contact with another object while moving, the robot 300 may be configured to stop moving, perform rerouting, slow movement speed, perform proximity sensing or object detection, or such similar actions to enhance operational safety of the robot 300. In some embodiments, touch sensors may be configured to detect touch events on surfaces of the robot 300, thereby allowing the robot 300 to detect when a patron has touched the robot 300 and, for example, stop movement, turn attention to the direction of the touch, greet the patron, or the like.

In some embodiments, the robot 300 may include an exterior lighting system 370 that is configured to provide lighting on or around the robot 300. The exterior lighting system 370 may be used to, for example, improve visibility of the robot 300 to patrons standing or walking around the operations venue, or to provide additional illumination for escorted guests or for capturing clearer camera data. As an example, FIG. 3C illustrates various components of the service robot 300 according to an implementation. In this example, the service robot 300 includes an example head unit 302 comprising a touchscreen display 312, a camera device 360 and two exterior lighting systems 370, lighting system 370*a* and lighting system 370*b*. In this example, lighting system 370*a* and 370*b* may, e.g., provide improved visibility of the robot 300 to patrons. Further, lighting system 370*a* may be comprised of, e.g., a plurality LEDs and used to provide lighting for taking photographic images of patrons or other objects. In an example, lighting system 370*a* is a "light ring" circular lighting apparatus that may be used to illuminate, e.g., a patron when taking the patron's photograph ("selfie"). In an example, lighting system 370*a* is a dimmable light ring allowing adjustment of, e.g., the light ring illumination brightness and/or color temperature.

In the example embodiment, the robot 300 includes an array of one or more proximity sensors 380. Such proximity sensors 380 may include, for example, ultrasonic range sensors 382, infrared ("IR") range sensors 384, or laser range sensors 386. In some embodiments, though not separately shown, proximity sensors 380 may include encoders, stereo cameras, or 3D depth cameras to provide depth information (e.g., distance sensing) with objects near the robot 300. The proximity sensors 380 are used by the navigation system of the robot 300 to perform object detection and obstacle avoidance as the robot 300 plans or executes movement actions within the operations venue. In some embodiments, proximity sensors 380 may be provided around a pre-designated front and forward-facing sides of the robot 300 based on a pre-defined direction of movement of the robot 300 (e.g., to detect static or moving objects ahead of or within the movement path of the robot 300, to detect potential intersecting paths with moving objects on the sides of the robot 300). In some embodiments, proximity sensors 380 may be provided around all sides of the robot 300, thereby allowing proximity detection and range detection through 360 degrees of operation. In some embodiments, proximity sensors 380 include camera devices 360 for visual object recognition. In some embodiments, inputs from multiple camera devices 360 may be used to determine depth information, or distance from the robot 300 to nearby objects.

In some embodiments, the robot 300 includes one or more positioning sensors 390 that are used to acquire sensor-based location information and perform sensor-based position determination of the robot 300 within the operations venue. For example, the robot 300 may perform trilateration or multilateration of wireless signals (e.g., Bluetooth, Wi-fi) to enable the robot management system server 106 or the robot 300 itself to determine a location of the robot within the operations venue (e.g., global positioning system ("GPS") or various indoor positioning systems). The robot 300, in some embodiments, may include a receiver that is configured to receive signals from multiple transmitters placed in fixed indoor locations throughout the operations venue, using time of arrival ("ToA") of the signals from the various transmitters to determine location of the robot 300 (e.g., based on propagation time). In another embodiment, the robot 300 uses ultra wideband ("UWB") indoor positioning to determine the position of the robot 300. The operations venue may be configured with multiple reference points that similarly use ToA, angle of arrival ("AoA"), time difference of arrival ("TDoA"), received signal strength ("RSS"), or a hybrid of such approaches to compute position estimations between the transmitters and receivers. In some embodiments, the operations venue may be configured with ultrasonic audio transmitters or receivers that can be used in conjunction with complementary ultrasonic receivers or transmitters on the robot 300 for location determination. In some embodiments, various outputs from camera devices 360 may be used for position determination and, as such, may act as positioning sensors 390. In some embodiments, the robot 300 may use positioning sensors 390 for landmark detection (e.g., identifying pre-defined landmarks statically positioned within the operational venue and having known positions and, by proxy, thus providing positioning information about the robot 300). In example embodiments, the service robot 300 uses multiple types of position sensors concurrently. Use of multiple different types of position sensors may provide technical benefits such as redundancy, more refined positioning, more reliable detection of obstructions, and such.

In some embodiments, the robot 300 may use sensor-based position determination in conjunction with camera input data to refine an estimated position of the robot 300 within the operations venue. For example, the robot management system may provide a position estimate of the robot 300 based on the sensor-based position data to give the robot 300 an approximate location on a map of the operations venue. Based on that approximate location, the robot 300 may capture digital camera data (e.g., digital images, 3D depth information, laser scanning) or proximity data from proximity sensors 380 to determine more accurate location based on known static objects or surfaces near that approximate location. In some embodiments, the robot 300 may use dead reckoning techniques from a known starting location to determine an approximate location, and may similarly refine that approximate location with proximity data or camera data.

In some embodiments, the robot 300 may include RFID transmitters or receivers (not separately shown). RFID may be used to read data from a corresponding transmitter or to transmit data to a corresponding receiver.

In some embodiments, the robot 300 may include a robotic arm (not shown) that can be configured to interact with objects in the nearby environment. The robotic arm can include several arm segments, joints, and motors that are configured to enable the robot arm to articulate in various degrees of freedom. The robotic arm includes at least one end effector (or "manipulator") configured to be used to perform various tasks, such as pressing buttons, grabbing and releasing objects, housing a sensor (e.g., RFID reader, camera), or the like. In some embodiments, the robot 300 may be configured to use the robot arm during maintenance operations, for example, to depress mechanical buttons 236 or touch touchscreen components of a gaming device 104, insert or collect tickets to test bill validators 234, ticket printers 222, or ticket readers 224. In some embodiments, the robot 300 may be configured to use the robot arm to load or unload delivery items from onboard storage (e.g., food and beverage, coat check). In some embodiments, the robot 300 may be configured to use the robotic arm to collect and deposit trash items into trash receptacles, empty ash trays, or collect dirty dishes (e.g., bus tables or gaming areas). In some embodiments, the end effector may include a communications coupling that may be extended and connected to a diagnostic port on gaming devices 104 (e.g., to establish direct communication with the gaming device 104 for diagnostics).

Figure 4:
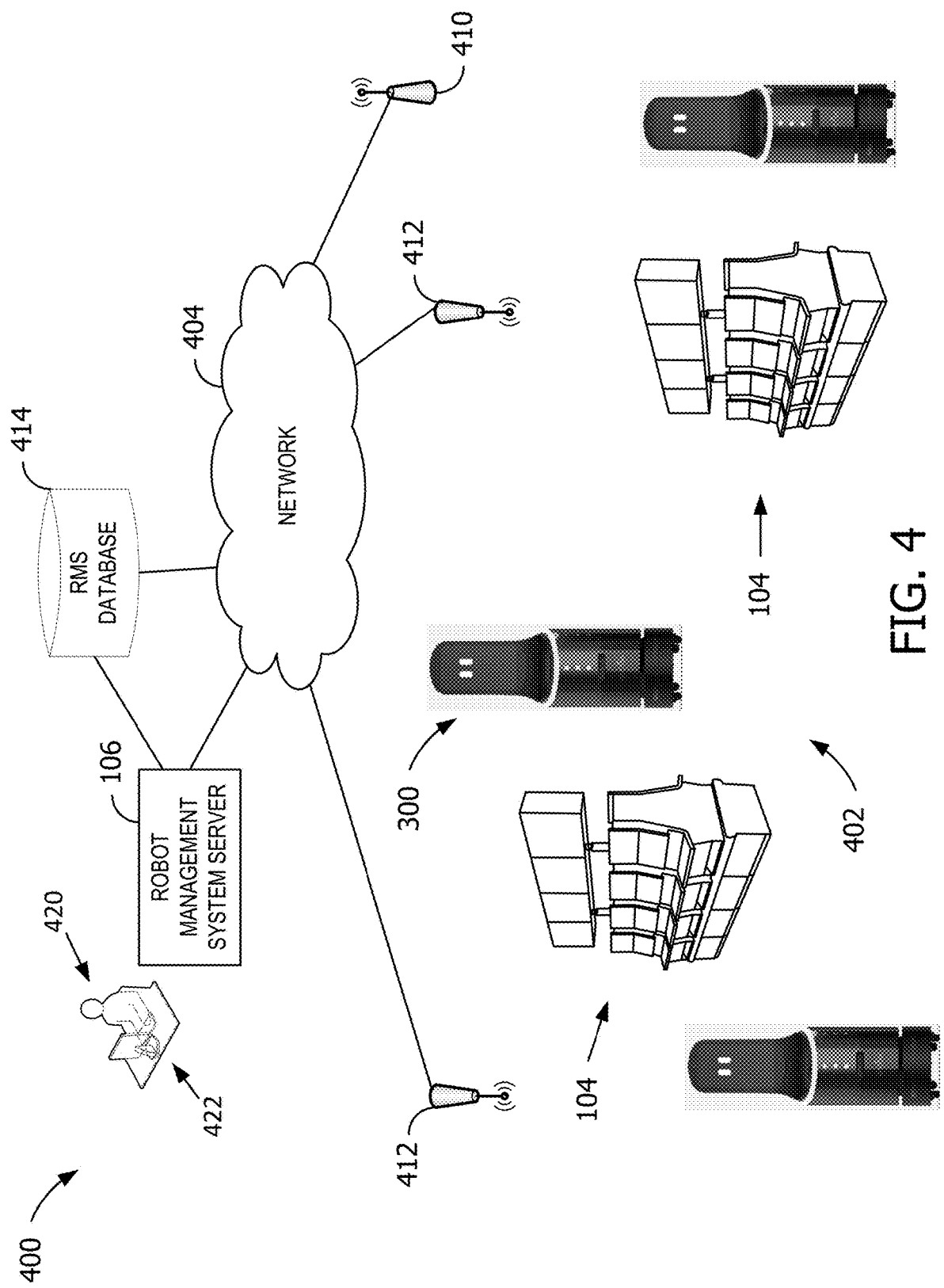
FIG. 4 is a diagram of an example networked environment for a robot management system.

FIG. 4 is a diagram of an example networked environment for a robot management system 400. In the example embodiment, the robot management system server 106 manages the fleet of robots 300. The robots 300 operate within and move around an operations venue (or just "venue") 402 (e.g., a casino or other gaming establishment, which may be similar to gaming environment 250 (shown in FIG. 2B)), and may perform various directed, semi-autonomous, or autonomous operations, either alone or in conjunction with the robot management system server 106, other robots 300 within the venue 402, or an operator 420 of the system 400.

The operations venue 402 includes numerous obstacles to the movement of the robots 300. Such obstacles include static inanimate objects that are typically placed in a location and not regularly moved. Static inanimate objects may include, for example, gaming devices 104, gaming tables 294 (shown in FIG. 2B), kiosks 260, and the like. The venue also includes various movable inanimate objects, such as chairs, pedestals, planters, floor signage, and other objects too numerous to name (and are not shown here for purposes of brevity). Such movable inanimate objects are more easily relocatable and may be regularly relocated (e.g., by players or service personnel). The venue 402 also includes structural obstacles, such as walls, pillars, stairs, escalators, and other surfaces that may not be traversable by the robots 300. Further, during normal use, the venue 402 also may include animate objects that present obstacles to movement of the robot 300, such as people (e.g., players, patrons, service personnel, and the like), animals (e.g., pets), and other robots 300, all of which may be present within and move about the venue 402.

The robots 300 communicate wirelessly with the robot management system server 106 and other networked devices via a network 404. The network 404 provides one or more wireless access points 410 that allow the robots 300 to wirelessly connect to the network 404 to transmit and receive data. The network 404 may be similar to the network 214 or may otherwise have connectivity to any of the system servers shown in FIG. 2A. In some embodiments, the robots 300 or the robot management system server 106 may communicate with other system servers during various tasks, such as the TITO system server 108 (e.g., when issuing or redeeming TITO ticket), the player tracking system server 110 (e.g., when identifying or authenticating loyalty members), or the progressive system server 112 (e.g., when performing a hand pay-out of a progressive jackpot).

In the example embodiment, the venue 402 includes multiple wireless indoor positioning transmitters (or just "transmitters") 412. Such transmitters 412 may be installed within the venue 402 and arranged throughout the venue 402 such as to allow adequate positioning coverage (e.g., trilateration or multilateration) to robots 300 in all areas where the robots 300 are expected to move and operate. For example, in some embodiments, the robots 300 use distance signals from at least three transmitters 412 to triangulate a position estimate of the robot 300.

In the example embodiment, the robot management system 400 includes a robot management system ("RMS") database 414. The RMS database 414 may be used for various robot management operations. For example, the RMS database 414 may include one or more static maps of the venue 402 and may share these maps with the robots 300. Static maps are digital representations (e.g., models) of the physical venue 402, identifying locations of various static inanimate objects or structural objects within the venue (e.g., gaming devices, gaming tables, walls, and the like). In some embodiments, the static maps may include user-identified areas of operation (e.g., floor space in the venue where the robots 300 may move) and may further refine those areas of operation by inclusion of blocked areas or barriers (e.g., boundaries or virtual exclusion areas where the robots 300 may not move, such as stairs down/up between gaming areas) as well as occupied space areas (e.g., areas in which static objects are known to exist, such as known locations of gaming devices, gaming tables, and perimeters around such devices). In some embodiments, the RMS database 414 may store real-time object detection data collected from the robots 300. For example, during operation, robots 300 may detect obstacles within the venue 402 that are not represented on the static maps (e.g., movable objects such as chairs, signs, or people, as detected via camera inputs, sensor inputs, or the like). Such data may be used as an overlay to the static maps to, for example, predict potential obstacles in certain areas. In some embodiments, the robot management system 400 may generate a heat map overlay for the venue 402. The heat map overlay indicates areas in which people often congregate or travel, using historical data, or are currently congregating or traveling using real-time data. Such data may be collected by the robots 300 or may be captured by thermal cameras deployed within the venue 402. Such data may be used during travel planning for the robots 300 (e.g., to avoid areas that may be congested with people). Further to this example embodiment, the RMS database 414 can generate an overlay map of the current position of the robots 300 showing their operating status, e.g., idle, recharging, en-route, on task, etc., and other information related to their operating status or a task they may be performing, e.g., the identification of a patron they may be assisting, a destination to which they may be heading, or an event for which they may be providing a service. In some embodiments, the RMS database 414 contains a listing of the robots 300 priorities and tasks, etc.

In an implementation, the robot management system 400 includes a robot management system terminal (or just "terminal") 422, in communication with the RMS server 106. The terminal 422 may be a stationary device, e.g., located in a venue back-office, located behind a bar, or a kiosk located on the venue floor, or may be a mobile device, e.g., a tablet computer, laptop, smart phone, etc. The RMS terminal 422 is configured for an operator 420 (e.g., administrator, technician, service staff) to perform various administrative functionality for the fleet of robots 300, such as accessing the RMS database 414 and, e.g., view the various maps and any other information contained in the RMS database 414. In an example, the terminal 422 is configured to allow the operator 420 to, using an input device operatively connected to the terminal 422 such as, e.g., a mouse or touchscreen, select a robot 300 and view detailed information pertaining to the selected robot 300, e.g., via a pop-up window appearing on the terminal display. In the example embodiment, the RMS terminal 422 provides an RMS GUI through which the operator 420 administers the fleet. Various administrative operations and tasks performed by the operator 420 and the RMS server 106 are described in greater detail below.

In an example, robot 300 detailed information includes a list of tasks the robot 300 is configured to perform, a list of tasks the robot 300 is currently scheduled to perform and the status or priority of those tasks. In some examples, the operator 420 can amend the task lists, e.g., adding or removing tasks, or reprioritizing the tasks.

In an example, the operator 420 can 'take control' of the selected robot 300. As an example, the terminal 422 displays a list of destinations for the robot to travel, e.g., a venue location or the location of a VIP player, and the operator 420 can select one of those destinations and, e.g., a task for the robot 300 to perform when it arrives at that location. In an example, the terminal 422 RMS GUI allows the operator 420 to 'drive' the robot 300, e.g., providing a 'joystick' or other user interface device that enables the operator 420 to change the robot's 300 rate of speed and direction, operate functions of the robot 300 such as, e.g., opening a storage compartment, printing a test ticket or a promotional voucher or communicate a greeting to a patron. In some examples, the terminal enables the operator 420 to directly communicate with a patron. As an example, the terminal 422 is configured with a camera 360, microphone 356 and speakers 354 enabling the operator 420 to engage in an audio/video interaction session (e.g., "facetime") with the patron, displaying real-time video of the operator 420 on the robot 300 display while communicating directly with the patron using the robot camera 360, speakers 354 and microphone 356.

In an example, the RMS terminal 422 provides an interface allowing the operator 420 to implement a robot scheduler, providing the operator 420 the ability to prioritize the actions and tasks of the robots 300, and the scheduling of those actions and tasks including, e.g., how and when they will come off-line for battery 332 recharge or exchange. As an example, each robot 300 is assigned a set of actions and tasks to perform during a first ("active") period and assigned a recharge period. In an example venue with a plurality of operational robots 300, the robots 300 have alternating active periods and recharge periods. As an example, a venue has six operational robots and two recharging stations. The robot scheduler is implemented by the operator 420, using the terminal 422 RMS GUI, to schedule the active and battery recharge periods for the robots 300 to enable four of the robots 300 to be active, e.g., performing tasks, while two of the robots 300 are recharging. In this example, as one robot 300 begins a recharging period a second robot 300 begins a first portion of an active period and a third robot 300 begins a second portion of an active period. This example allows four of the six robots 300 to be operational on the venue floor, while the other two robots 300 are recharging. As an example, a venue may have two operational robots 300 each with two batteries 332, and two battery charging and exchange stations. The robot scheduler is implemented by the operator 420 to schedule each of the robots 300 to perform actions and tasks and to periodically, on a predetermined schedule or on a triggering event (e.g., a robot battery low signal), travel to a battery charging and exchange station to exchange the low-charge robot battery 332 with a re-charged battery 332.

In an example, the robot scheduler is implemented by the operator 420 to create a running task list assigned to a plurality of robots 300. In an example, each robot 300 as they became available would request or be assigned a next task from the running task list based, e.g., of the capabilities of the robot and the proximity of the robot 300 to the task location of the venue. In an example, a task on the running task list assigned to a first robot 300 can be performed by a second robot 300 as, e.g., the second robot 300 happened to be available and in the area of the venue task location. Further to this example, the robot management system 400 keeps track of the location of the robots in the venue and, referencing the running task list and known capabilities of each robot, dynamically assigns a task to an available robot 300, e.g., based on the capabilities and current location of the robot 300. In another example, the robot management system broadcasts an open task, e.g., from the running task list, to the robots 300 and any available robot 300 capable of performing the task responds with their location information allowing the robot management system 400 to assign the task to, e.g., a robot 300 capable of performing the task and in proximity of the location of the task.

In some embodiments, the venue 402 includes a gantry system mounted to the ceiling of the venue 402, upon which robots 300 are suspended and can be moved throughout the venue 402. Such suspended robots 300 may be raised when traveling between locations, thereby avoiding some obstacles, and may be lowered when arriving at a particular destination to provide various configured services.

Figure 5:
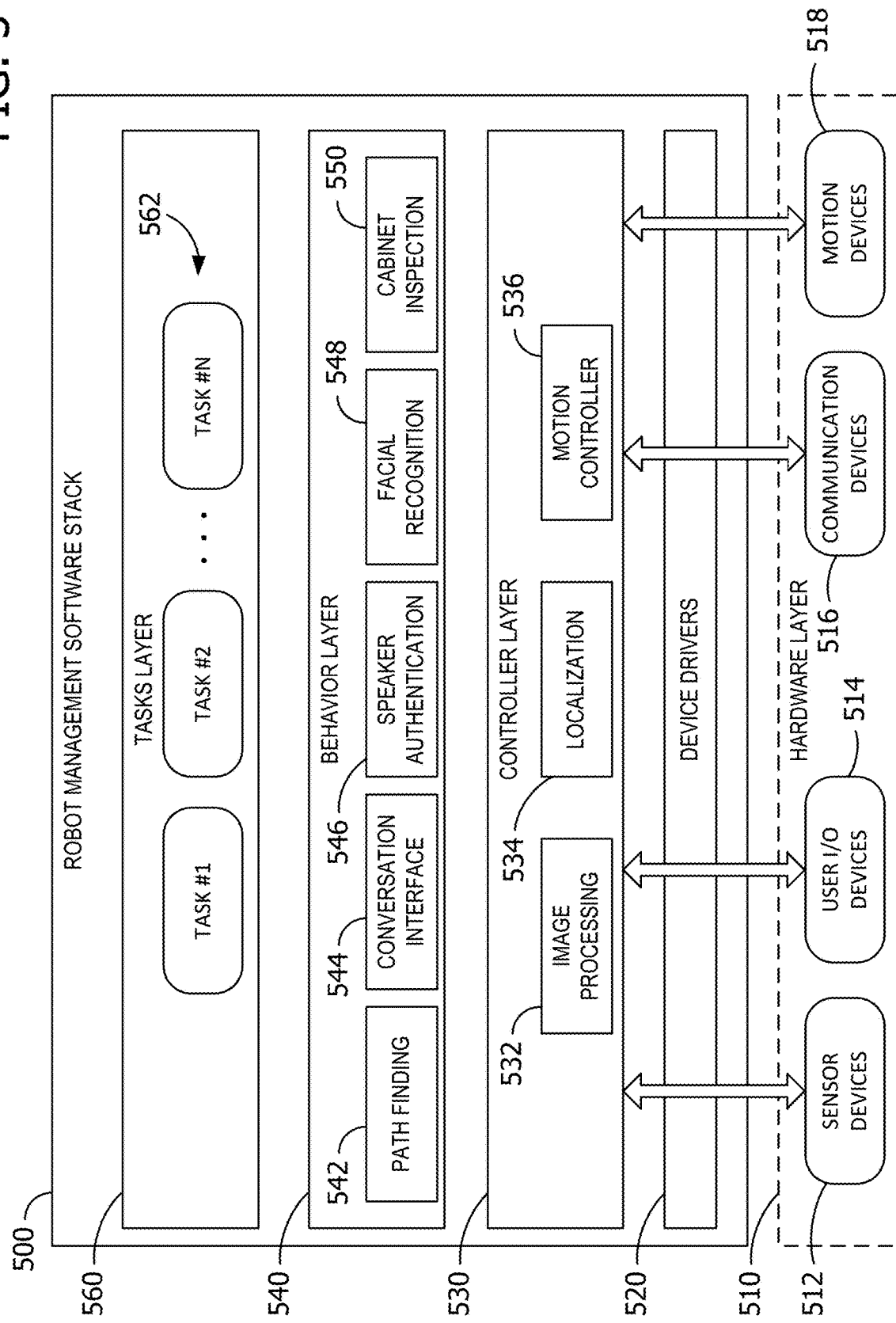
FIG. 5 illustrates an example robot management software stack for the robot.

FIG. 5 illustrates an example robot management software stack 500 for the robot 300. In the example embodiment, the software stack 500 is installed and executing on the robot 300 during operation (e.g., using CPUs 320, memory 322, and storage 324). While not separately depicted here, it should be understood that the robot 300 is executing an operating system ("base operating system," e.g., Linux, Windows) upon which the software stack 500 is running. In the example embodiment, the software stack 500 is implemented using the Robot Operating System ("ROS", e.g., ROS 2.0, as promulgated by the Open Source Robotics Foundation), the framework of which is pictured here. ROS is robotics middleware (e.g., a collection of software components) executing on top of the base operating system that provides a suite of modular functionality (e.g., via ROS packages) using a layered approach. Under ROS architecture, the various packages and associated hardware devices define "nodes" that perform various functions regarding control of the robot 300. The nodes share information with each other by publishing or subscribing to "topics" as ROS publishers or ROS subscribers.

In the example embodiment, the software stack 500 performs operations on hardware components of the robot 300 through a set of device drivers 520 specific to each of the hardware components in the hardware layer 510. The hardware layer 510 of the robot 300 can include any of the hardware components described with respect to the service robot base unit 304 of FIG. 3B, and are grouped here as sensor devices 512, user I/O devices 514, communication devices 516, and motion devices 518 for purposes of brevity. Sensor devices 512 may include, for example, impact sensors 368, proximity sensors 380, camera derives 360, touchscreen devices 352, speakers 354, microphones 356, biometric scanners 358, or the like. User I/O devices 514 can include, for example, display devices 350, touchscreen devices 352, speakers 354, microphones 356, biometric scanners 358, camera devices 360, readers 362, printers 364, or the like. Communication devices 516 may include, for example, network interface device 326, speakers 354, microphones 356, positioning sensors 390, or the like. Motion devices 518 may include, for example, drivetrain assembly 308, IMU 366, impact sensors 368, proximity sensors 380, or the like. Each particular device may have one or more device drivers 520 installed as part of the base operating system or included as components of an ROS package, and may have one or more nodes established to allow interaction with the device by other nodes during operation.

In the example embodiment, the software stack 500 includes a controller layer 530, a behaviour layer 540, and a tasks layer 560, each of which includes one or more ROS packages that perform some specific set of functions. The controller layer 530 is the lowest layer in the software stack 500 and includes packages that perform control operations directly with a hardware layer 510 (e.g., through the device drivers 520 specific to the hardware used by the particular operations). In the example embodiment, the controller layer 530 includes an image processing package 532, a localization package 534, and a motion controller package 536. The image processing package 532 captures camera data or sensor data and publishes such data for the use of other nodes. The localization package 534 performs functionality associated with position determination of the robot 300 (e.g., within the operations venue 402). The localization package 534 may use input data from positioning sensors 390, proximity sensors 380, camera devices 360, or IMU 366 to determine or refine position estimates for the robot 300. In some embodiments, the robot 300 may use external visual identifiers (e.g., magnetic or visual cues, visual codes, property landmarks) within the operations venue to determine or refine position estimates. In some embodiments, the robot 300 may use signals from wireless beacons or emitters installed within the operations venue to determine or refine position estimates. In some embodiments, the localization package 534 may publish a topic that includes a current position estimation and may include recent historical position data. The motion controller package 536 performs functionality associated with moving the robot 300 around the operations venue 402. The motion controller package 536 reads data from and sends control commands to the motion devices 518, such as the motors 342 of the drivetrain assembly 308, to cause various movements of the robot 300. In some embodiments, the motion controller package 536 may restrict speed of the robot 300 based on, for example, presence of nearby objects, pre-configured speed limits (e.g., global maximum, maximum for particular pre-defined areas within the operations venue). It should be understood that the example packages shown here in the controller layer 530 are examples that enable support of some hardware components and operations, but that other packages may additionally or alternatively be included in the controller layer 530 (e.g., to facilitate operation of other hardware, functionality, or features described herein).

In the example embodiment, the behaviour layer 540 is a middle layer of the software stack 500 and includes packages that perform various functions and operations that rely upon device data and operations performed by packages in the controller layer 530. The behavior layer 540 packages may, for example, subscribe to one or more topics published by any of the controller layer 530 packages and may, themselves, publish topics that are used by other behaviour layer 540 packages or tasks layer 560 packages. In the example embodiment, the behaviour layer 540 includes path finding package 542, a conversation interface package 544, a speaker authentication package 546, a facial recognition package 548, and a cabinet inspection package 550.

The path finding package 542, in the example embodiment, is configured to determine a travel route (or "path") through the operations venue 402 from a starting location (e.g., the current location of the robot 300, as determined by the localization package 534) to a destination location (e.g., as provided by a task layer 560 package). For example, the path finding package 542 may receive a destination location of a particular gaming device 104 within the operations venue 402 (e.g., as part of a task 562 to perform a hand-pay to a player after a big win, or to perform inspection of the gaming device 104). The path finding package 542 may read the current location of robot 300 from a topic published by the localization package 534 and then determine a travel path from the current location to the destination location (e.g., using static maps and optionally dynamic overlay maps of the operations venue 402). This travel path may be published as a topic that can be subscribed to by other behavior layer 540 packages or higher layer packages. In some embodiments, the path finding package 542 may additionally execute movement operations for the robot 300 to execute travel to the destination. For example, the path finding package 542 may transmit movement commands to the motion controller package 536 to execute movement of the robot 300 along the given path. The path finding package 542 may subscribe to topics published by the image processing package 532 to, for example, perform obstacle avoidance and speed control during the trip. The path finding package 542 may re-perform pathing during the trip when, for example, the robot 300 encounters an obstacle along the previous path.

The conversation interface package 544, in the example embodiment, is configured to perform audio or text-based one- or two-way interactions with the user (e.g., as a voice user interface). For example, the conversation interface package 544 may be instructed by a task 562 to receive a verbal user request for information (e.g., audio input via the microphone 356) and respond to that request with an audible response (e.g., audio output via the speakers 354). The conversation interface package 544 may, for example, use speech recognition techniques or packages to parse or convert the user request audio into text, submit the text request to a backend search engine (e.g., locally or to the robot management system server 106), receive response text, and output the response text as audio output through the speakers 354. For example, the user may request the operating hours of a local dining establishment and the robot 300 may reply with an opening and closing time of the restaurant. Some user requests may activate functions on the robot 300. For example, the user may verbally request printing of a new player loyalty card and the conversation interface 544 may, in response, activate a printing function of a player loyalty administration package (not shown) and associated GUI on a display device 350 of the robot 300. In some embodiments, the conversation interface 544 supports multilingual voice and text inputs and outputs, or visual recognition of sign language or other gestures. As such, the conversation interface 544 allows the robot 300 to respond in various ways to various audio commands or requests provided by the user.

The speaker authentication package 546, in the example embodiment, is configured to authenticate the identity of a particular speaker based on a captured speech sample (e.g., from the microphones 356). For example, during a privileged operation (e.g., requesting login to a particular player loyalty account, requesting printing of a hotel key card), such access may require or otherwise allow the user to authenticate themselves using speech authentication. The robot 300 may capture an audio sample of the user speaking a phrase and analyse the audio sample against a previously stored voice sample of the privileged person. If the audio sample matches the stored voice sample, then the robot 300 may allow the privileged operation. In some embodiments, the software stack 500 may also include a speaker identification package (not shown). The speaker identification package may use a captured audio sample to determine an identity of the speaker. For example, the speaker may initially request the reprinting of a player loyalty card, but the robot 300 may not yet know the identity of the speaker. As such, the speaker identification package may compare the audio sample to a database of known loyalty account holders to identify the identity of the user. Once the identity of the speaker is determined to be a particular loyalty member, then the robot 300 may activate other packages or tasks to print a new player loyalty card for the member (which may additionally require subsequent authentication).

The facial recognition package 548, in the example embodiment, is configured to identify people based on facial recognition. For example, during certain operations, such as delivering food, beverages, or other delivery goods, the robot 300 may perform facial recognition on people near a target delivery area in order to identify an exact location of, or to authenticate, a privileged recipient (or "intended recipient") of the delivery goods. The robot 300 may be configured to carry delivery goods via one or more secure compartments (e.g., enclosed drink holders), where service personnel (e.g., bartenders) may store a prepared drink in fulfilment of the order. Upon arrival at the target delivery area (e.g., a location where the patron placed an order via the robot 300), the robot 300 may capture camera data (e.g., digital images or video via the camera device(s) 360) and analyse the camera data to identify people near the target delivery area, and to perform facial recognition on the identified people. If the intended recipient is identified, the robot 300 approaches the recipient, unlocks the secure compartment containing that recipients goods (e.g., the drink), and provides an audible alert indicating to the recipient that they may take their delivery goods. In some embodiments, the robot 300 may include a sensor (e.g., pressure sensor) within the secure compartment that is configured to detect when goods are loaded into and unloaded from the secure container. After the goods have been delivered, the robot 300 completes and closes the order. In some embodiments, the robot 300 may capture video of the recipient as the delivery goods are removed (e.g., for proof of delivery). In some situations, the robot 300 may not initially be able to identify the intended recipient via an initial scan and analysis of camera data at the target delivery area. For example, some players may move from one gaming device 104 to another nearby gaming device 104. As such, the robot 300 may be configured to move around the operations venue 402 (e.g., near the initial target delivery area), capturing and analysing additional camera data for a period of time in an attempt to find the intended recipient. In some embodiments, the intended recipient may carry a personal location device (e.g., a GPS-enabled smartphone, a dedicated tracking device) and the robot 300 may request a current location of the recipient during the delivery operation. In some embodiments, other robots 300 or fixed camera devices (e.g., security cameras, cameras within gaming devices 104 (not shown)) may perform facial recognition on people throughout the operations venue 402 (referred to herein as "system-level patron location data") and the robot 300 may request and receive recent system-level patron location data of the intended recipient to determine the target delivery area.

The cabinet inspection package 550, in the example embodiment, is configured to perform visual inspection operations on assets within the operations venue 402. For example, the robot 300 may be configured to periodically perform visual inspections on gaming devices 104, kiosks 260, gaming signage systems 254, gaming tables 294, ceiling lighting, displays, marquees, or other such assets ("inspected assets"). The robot 300 may move to a position in front of a particular inspected asset, such as a gaming device 104 (e.g., based on a known location of the device 104 within the operations venue 402) and capture digital images, video, or audio (an "inspection sample") of the inspected asset. The robot 300 may analyse the inspection sample against baseline image, video, or audio samples of the asset (e.g., samples previously collected and certified as examples of the asset in normal working order). In some embodiments, the robot 300 may transmit the inspection sample(s) to the robot management system server 106 for analysis or long-term storage. The cabinet inspection package 550 (or complementary server-side analysis) may be configured to identify visual problems with gaming devices 104, such as screen brightness, screen functionality, trim or overhead lighting functionality (e.g., burnt out lights), cleanliness of the asset, ambient temperature at or around a location, or power to the asset. The cabinet inspection package 550 may be configured to identify visual problems with electronic signage, such as burnt out components (e.g., bulbs, letters, or the like) or unpowered signage. The cabinet inspection package 550 may be configured to detect audio problems with gaming devices, such as volume levels outside a preferred range or failed speakers. In some embodiments, the robot 300 may transmit a diagnostic command to a gaming device 104 to cause the gaming device 104 to initiate a diagnostic routine (e.g., self test mode) or display diagnostic or status information that can be read by the robot 300 (e.g., via QR code).

In the example embodiment, the tasks layer 560 is a top layer of the software stack 500 and includes packages (or "tasks 562") that perform various functions and operations that rely upon functions performed by or data published by packages in the controller layer 530 or the behavior layer 540. Tasks 562 typically invoke a combination of functions in a particular order to accomplish an overall goal. For example, the robot 300 may be configured with a task 562 to accept a drink order from a player at a particular gaming device 104. The task 562 may begin with receiving a location ("request location") of the player wishing to place the order (e.g., based on an alert sent from the gaming device 104 when the player requests service). The task 562 may invoke the path finding package 542 to execute movement along a determined path between a present location of the robot 300 (e.g., as determined by the localization package 534) and the request location (e.g., as identified by the known location of the particular gaming device submitting the request). Upon arrival at the request location, the task 562 may invoke the conversation interface package 544 to prompt the player for their drink order, perhaps displaying a GUI with drink options on the display device 350. Upon capturing and performing speech recognition on the audio sample of "I would like a martini" spoken by the player, the task 562 may then transmit an order request to the robot management system server 106 (or other back-end system) to have the bar prepare a martini for future delivery to the requesting player. After successful submission of the order, the task 562 may provide an order confirmation to the player and subsequently move the robot 300 away from the request location, thereby concluding the task 562. As such, tasks 562 represent a composite of functions provided by other packages and data of the software stack 500 to accomplish more complex operations. These "task-level operations" together represent the role of the robot 300.

FIGS. 6A-6E illustrate various maps and map overlays of an operations venue 600 within which the robot management system 400 coordinates activities of a fleet of robots 300. In the example embodiment, the operations venue 600 is a gaming establishment offering various wager gaming activities. It should be understood that other types of operations venues are possible for use with the robot management system 400. The operations venue 600 represents an area in which the robots 300 operate, and may be similar to the operations venue 402 shown and described in FIG. 4. The various maps and map overlays may be used by the robots 300 or the robot management system 400 to perform various tasks, such as navigation, object avoidance, pathing, and such. Only a portion of the operations venue 600 is illustrated here for ease of illustration.

Figure 6A:
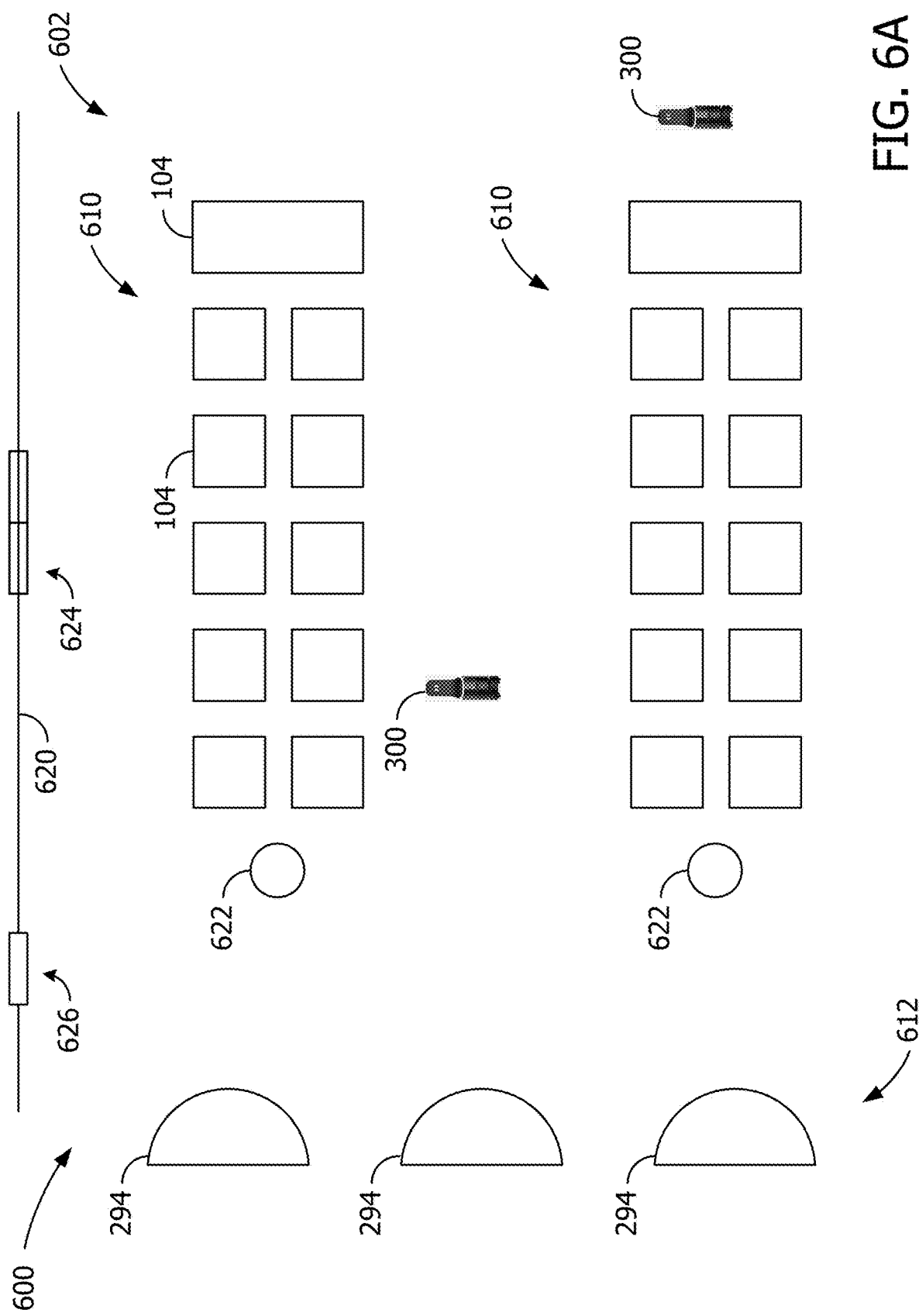
FIG. 6A is an overhead view of a portion of an operations venue.

FIG. 6A is an overhead view of a portion of the operations venue 600. In this example, the operations venue 600 represents a pre-defined virtual map (or "static map") 602 encoded and stored for use by the robots 300 and the robot management system 400. It should be understood that FIG. 6A is used herein to describe both aspects of the real-world environment of the operations venue 600 as well as digital representations of those objects. The operations venue 600 includes numerous static objects (e.g., furniture, electronic devices, walls, structural components, stairs, rails, and so forth) that impede movement of the robots 300. In the example embodiment, the operations venue 600 includes various groups 610 of gaming devices 104 at which patrons play electronic games (e.g., slot machines). The operations venue 600 also includes groups 612 of gaming tables 294 at which patrons play table games (e.g., black jack, roulette, craps, and so forth). Such "static objects" may be movable or relocatable, but are typically installed in particular location and remain at that location for extended periods of time. The operations venue 600 also includes "structural objects" that are not relocatable, such as walls 620 of the operations venue 600, pillars (or load bearing members) 622 of the operations venue, or other fixed structural obstructions such as fixed railing, stairs, doors 624, escalators, and so forth (not shown for purposes of brevity). In some embodiments, the venue 600 includes a service access door 626 that may be used by the robots 300 to access a service room (not shown in FIG. 6).

In the example embodiment, a static map 602 of the operations venue 600 is predefined (e.g., by administrators, operators) and stored for use by the robot management system 400 (e.g., in the RMS database 414) and may additionally or alternatively be stored locally on the robots 300 (e.g., in nonvolatile storage 324). The static map is used for various navigation tasks, allowing the robot to move through the environment while avoiding such static and structural objects. The static map may be used, for example, to identify areas through which the robots 300 may not move. Such static objects, structural objects, and movable objects represent obstructions to the robots 300 and, as such, may be configured to be avoided. Further, the static map may be used (e.g., individually by a particular robot 300 or centrally by the robot management system server 106) to determine a planned travel path through the operations venue 600 (e.g., when moving to a particular target location, such as a particular gaming device 104).

The static map may additionally include device identification information for various devices in the operations venue 600, such as device IDs for gaming devices 104, gaming tables 294, kiosks, or the like. As such, location information for each particular device is stored in the robot management system 400, thereby allowing robots 300 to be moved to particular devices during certain operations.

In some embodiments, the static map may include pre-defined locations of various "movable objects," such as chairs, trash cans, movable signage, movable railing, and the like. For example, gaming devices 104 or gaming tables 294 may include one or more movable seats for patrons. During operation, such movable objects may or may not appear in their pre-defined locations and, as such, the robots 300 may use other object detection methods to detect the presence of the movable objects and precise object location (e.g., computer vision, camera and sensor inputs).

FIG. 6B illustrates an exclusion zone overlay 630 that can be used to pre-define areas where the robots 300 are not allowed to move. In the example shown here, objects appearing in the static map 602 are illustrated in broken line for purposes of explanation, and various exclusion zones 632 are illustrated in hashing, identifying areas within the operations venue 600 within which the robots are not allowed to move. Indicia for various objects introduced in FIG. 6A are excluded in FIG. 6B for purposes of clarity.

In the example embodiment, an exclusion zone 632A is defined behind gaming tables 294. This area represents an area where dealers and pit bosses typically stand or walk, and may be included to prohibit robots 300 from entering this exclusion zone 632A because, for example, the robots 300 may not provide services needed by the staff, may provide too much distraction to staff or patrons, or the like. Another exclusion zone 632B is defined near door 624, identifying an area in which opening doors may periodically present obstacles to the robots 300 and may cause impacts and damage to the robots 300. As such, robots 300 may be prohibited from navigating through the exclusion zone 632. Numerous other exclusion zones 632 may be defined by the administrators or operators for a variety of purposes, thereby further restricting travel areas and travel paths of the robots 300. It should be understood that, while these examples are illustrated as allowing the robots 300 to move anywhere not excluded (e.g., by exclusion zones 632 or other objects), the robot management system 400 may be conversely configured to exclude every area except what is defined with inclusion zones (not shown).

Exclusion zone 632C, in the example embodiment, is an object proximity exclusion zone. In some embodiments, the robot management system 400 may allow objects on the static map 602 to be identified as having a proximity exclusion distance (e.g., a distance from the object within which the robots 300 may not travel). For example, the pillar 622 may be defined with a proximity distance of 2 feet and, as such, the robot management system 400 may define the exclusion zone 632C 2 feet out from the surface of the pillar 622, thereby causing the robots 300 to avoid traveling within 2 feet of the pillar 622.

During operation, the robots 300 and robot management system server 106 may use the static map 602 and the exclusion zone overlay 630 to define areas within which the robots 300 will not move (e.g., during movement operations, path planning, and the like).

In some embodiments, some exclusion zones 632 may be assigned to particular robots, or to particular groups of robots (e.g., particular service types). For example, some robots 300 may be configured to perform dealer assist operations, and thus may not be subject to the exclusion zone 632A behind the gaming tables 294, where that exclusion zone 632A may be enforced on other robots 300.

FIG. 6C illustrates a heat map overlay 640 that can be used to identify heat signatures of patrons at various locations within the operations venue 600. In the example shown here, objects appearing in the static map 602 are illustrated in broken line for purposes of explanation, and various heat signatures 642 are illustrated in hashing, identifying areas within the operations venue 600 having heat signatures detected by thermal sensors (not shown) (e.g., statically mounted thermal cameras statically mounted within the operations venue 600). Indicia for various objects introduced in FIG. 6A are excluded in FIG. 6C for purposes of clarity. Further, only some heat signatures 642 are numbered in FIG. 6C for purposes of simplicity.

In the example embodiment, the thermal map overlay 640 includes a heat signature 642A for players or spectators standing or sitting near the gaming tables 294, as well as heat signatures 642B for dealers, pit bosses, or other staff. The thermal map overlay 640 also includes heat signatures 642C for players or spectators seated or standing near the gaming devices 104. The thermal map overlay 640 also includes heat signatures 642D of other patrons, staff, or other people standing or walking through the operations venue 600. While FIG. 6C only illustrates heat signatures generated by human beings, it should be understood that other objects within the operations venue 600 may generate heat signatures 642.

During operation, the robots 300 and robot management system server 106 may use the thermal map overlay 640 for various purposes. For example, the thermal map overlay 640 may be used during path planning (e.g., to avoid moving the robots 300 through heavily congested areas or areas where human presence may cause obstructions and delays due to avoidance or re-pathing). The thermal map overlay 640 may be used for obstacle avoidance during active navigation (e.g., as an additional method of object detection). The thermal map overlay 640 may be used to detect the presence of players at gaming devices 104 or gaming tables 294 (e.g., to approach for services solicitation, or in an attempt to locate a particular patron).

In some embodiments, the robot management system 400 may capture thermal data over time and may use such historical thermal data to generate a historical heat map (not shown). The robot management system 400 may subsequently use such a historical heat map, for example, to identify areas of heavy foot traffic or heavy patron presence. The robot management system 400 may then use such congested area data during robot pathing, avoiding moving the robot through areas that are often heavily congested.

In some embodiments, the robot management system 400 may generate a dynamic object detection overlay (not shown). During operation, the robots 300 may detect various static objects or moving objects within the operations venue 600 (e.g., object detection via camera vision, proximity sensors, and so forth). Movable animate and inanimate objects may appear within the venue 600 that may not appear on other overlays. For example, patrons and staff may move around within the venue 600, chairs or trash cans may be repositioned, and so forth. As such, the robot management system 400 may collect object location information from the robots 300 as they operate within the venue 600 and integrate that object location information into the dynamic object detection overlay. Since some of the detected objects may be movable objects, their positions may change over time. As such, the dynamic object detection overlay is regularly updated as objects are detected at a location and their absence is later detected. The robots 300 or the robot management system server 106 may similarly use the dynamic object detection overlay in path planning, obstacle avoidance, or the like.

In some embodiments, the robot management system 400 may include a preferred path overlay (not shown). The preferred path overlay defines various travel paths preferred for robot travel. In some embodiments, administrators or operators may pre-configure preferred paths for the robots 300 or for certain types of robots 300. In some embodiments, the robot management system 400 may automatically build preferred paths within the preferred path overlay (e.g., based on historical thermal map, historical object detection data, or the like). During operation, the robots 300 or robot management system server 106 may use the preferred paths in the preferred path overlay when path planning. In some embodiments, the operations venue 600 may include path tracking (e.g., visual indicators) within the floor that the robots 300 can use for position determination or path planning. An indication of such path tracking may also appear within the preferred path overlay.

In some embodiments, robots 300 might be programmed to proactively, and optionally in coordination with the robot management system 400, adapt to events happening in and around the casino venue. As an example, when the doors for a show are getting ready to open for patron seating the robots 300 will avoid the area where the patrons are waiting in queue or, further to this example, purposely visit the area to offer services to the waiting patrons. Similarly, when a show is getting ready to let out the robots 300 will position themselves out of the exit path but remain in the area to provide services to the exiting patrons.

Figure 7:
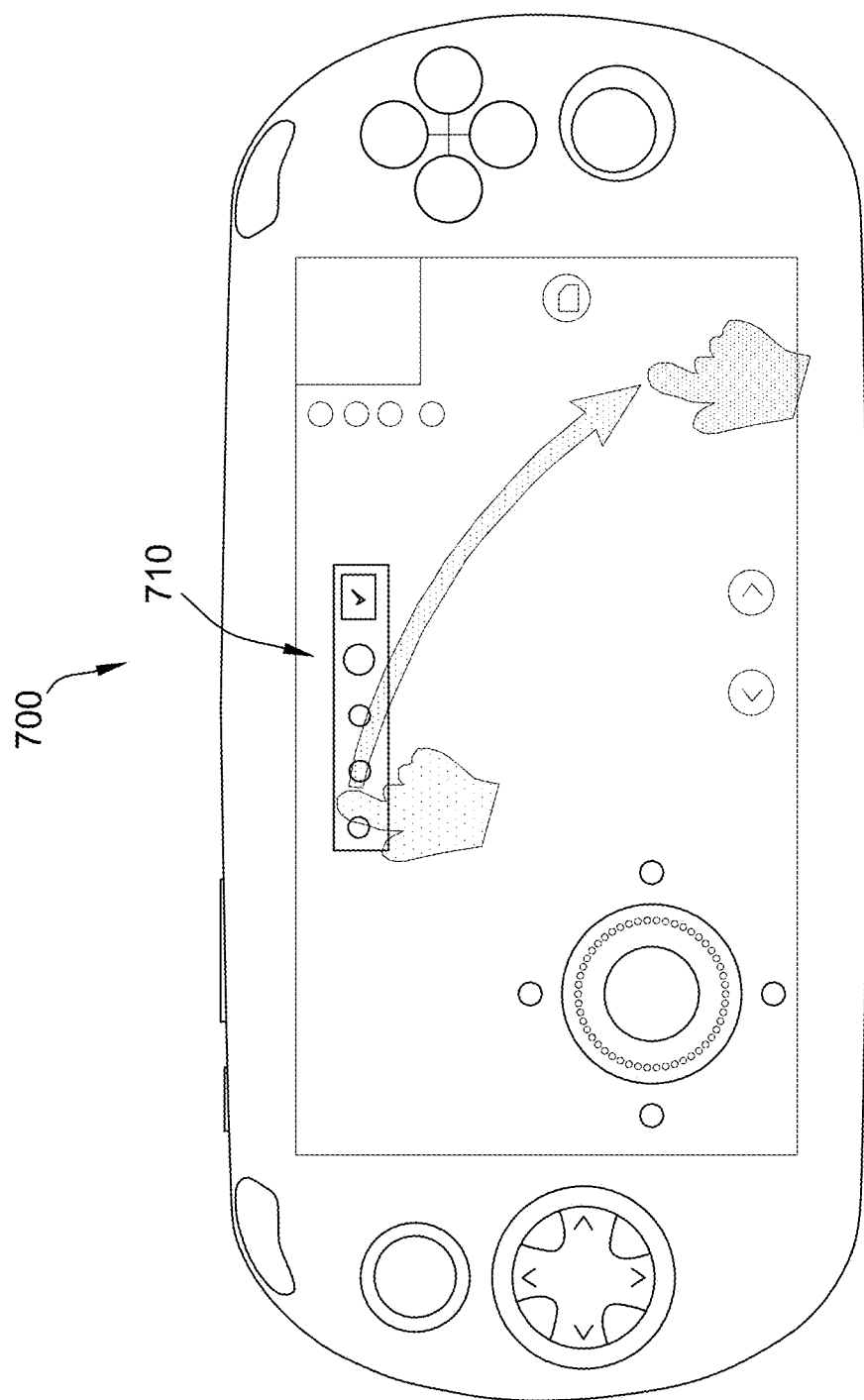
FIG. 7 illustrates an example mobile device that can be used to provide a mobile robot management system terminal.

FIG. 7 illustrates an example mobile device (or "RMS terminal") 700 that can be used to provide a mobile RMS GUI 710. The RMS terminal 700 and RMS GUI 710 may be similar to the terminal 422 and RMS GUI shown and described in FIG. 4. The example mobile device may be a Mogi I7S mobile gaming device comprising a housing, a touchscreen-display, one or more 3D joysticks, one or more skills keys, one or more cross keys, a power control switch and a volume control.

FIGS. 8A-8D illustrate the example mobile RMS terminal 700 with an example RMS GUI 820A-820D.

Figure 8A:
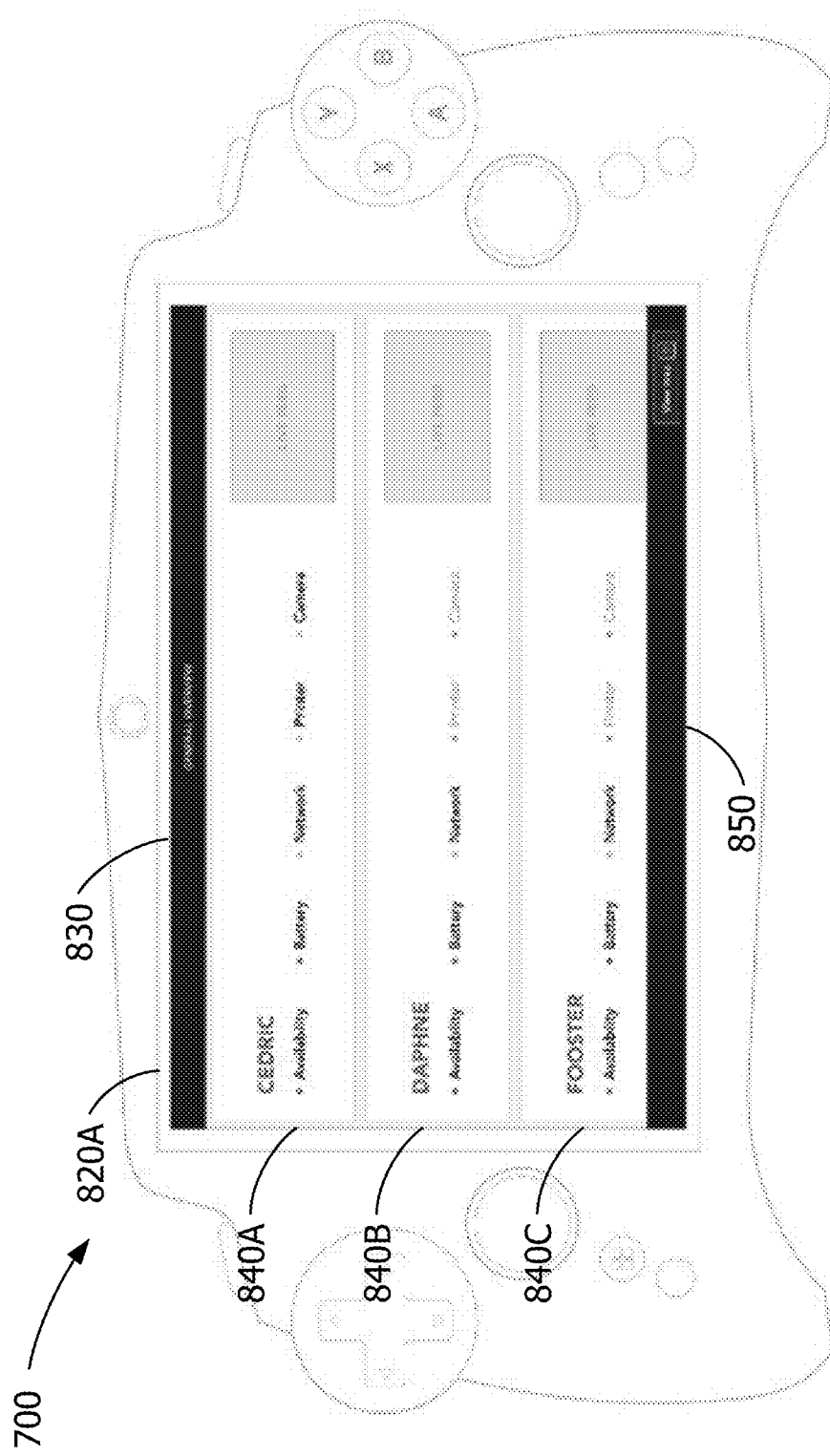
FIG. 8A illustrates example robot management system terminal user interface general overview screen.

FIG. 8A illustrates example GUI 820A, displayed on the touchscreen display of mobile terminal 700. Example GUI 820A illustrates a General Overview screen, comprising a header bar 830 indicating the user interface screen description (e.g., General Overview), three robot status fields 840A-840C and a footer bar 850. Further, the example GUI 820A robot status fields 840A-840C each display a "name" of a robot 300 (e.g., Cedric, Daphne, Foster), status indicators (e.g., Availability, Battery, Network, Printer, Camera) and a "Live Feed" area. In an example implementation, the availability indicator may provide a status indication (e.g., red—busy, green—available) of the availability of the robot, the Battery indicator may provide a status of the battery 332 charge (e.g., red—discharged, yellow—charge low, green—charged), the Network indicator may provide an indication of network connectivity status (e.g., red—no connection, yellow—marginal connection, green—good connection), the Printer indicator may provide an indication of printer 364 status (e.g., red—inoperable, yellow—needs service, green—operational), and the Camera indicator may provide an indication of the camera 360 status (e.g., red—inoperable, yellow—needs service, green—operational). In the example, the Live Feed field area may provide a video display of the live view of the robot 300, e.g., a live feed as provided by the robot camera 360, or a live feed of the video displayed on a robot display device 350/352. In this example, the footer bar 850 includes a "View Map" button which, when selected by the user, may cause the mobile terminal 700 display to present a, e.g., "Robot's Map" user interface screen, e.g., as illustrated in FIG. 8B.

Figure 8B:
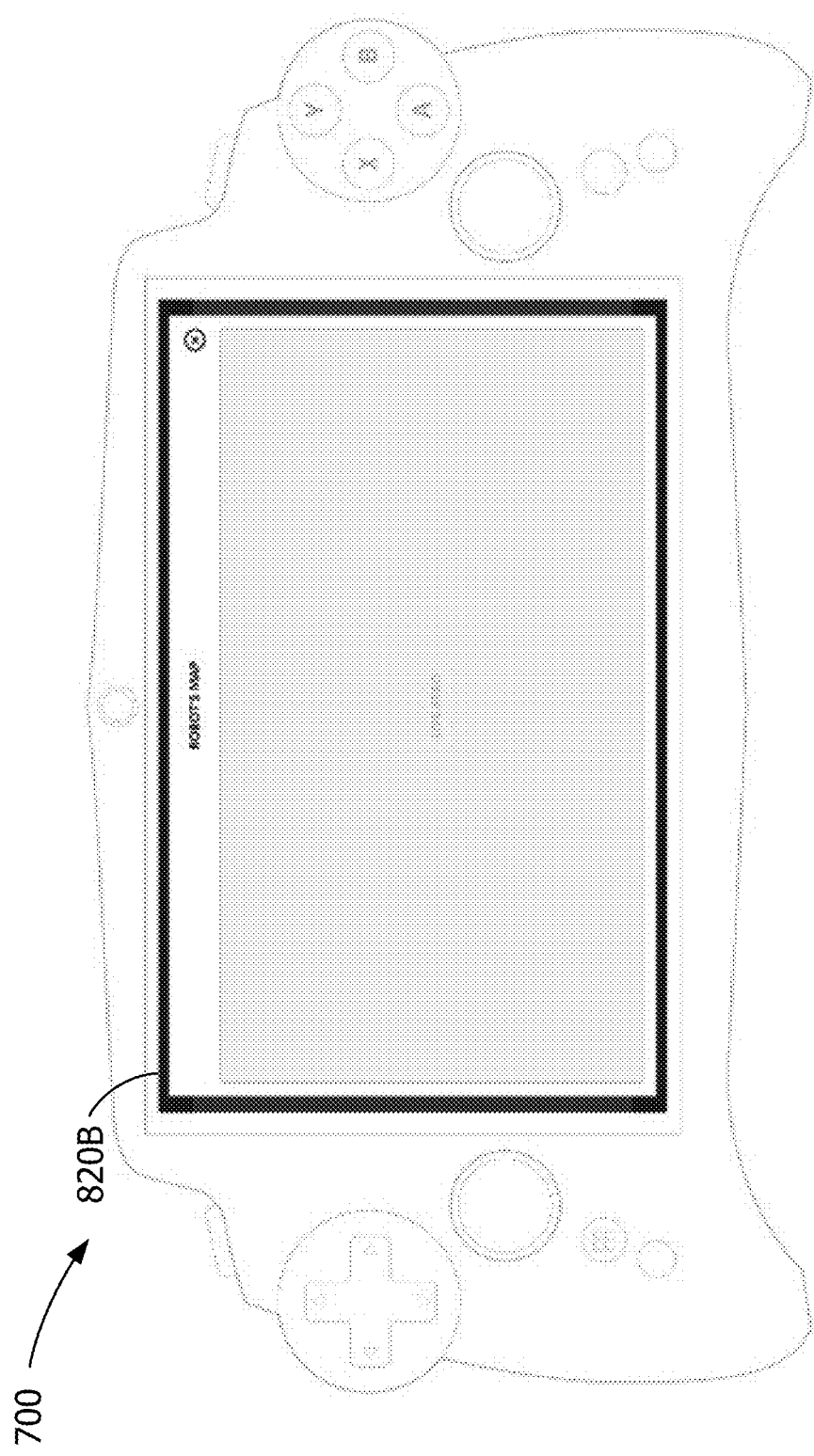
FIG. 8B illustrates example robot management system terminal user interface robot map screen.

FIG. 8B illustrates example GUI 820B, displayed on the touchscreen display of mobile terminal 700. Example GUI 820B illustrates a "Robot's Map" user interface comprising of a Live Feed display on the touchscreen display 710. In an embodiment, the live feed may be comprised of a video display of live image video received from a camera 360, or from a network source, e.g., video content of a venue map from a server, e.g., a robot management server 106. In an example, the robot's map GUI 820B may further be comprised of a map overlay, (e.g., a heat map overlay, a preferred path overlay, etc.), as received from, e.g., the selected robot or from a network server, e.g., the robot management server 106.

Figure 8C:
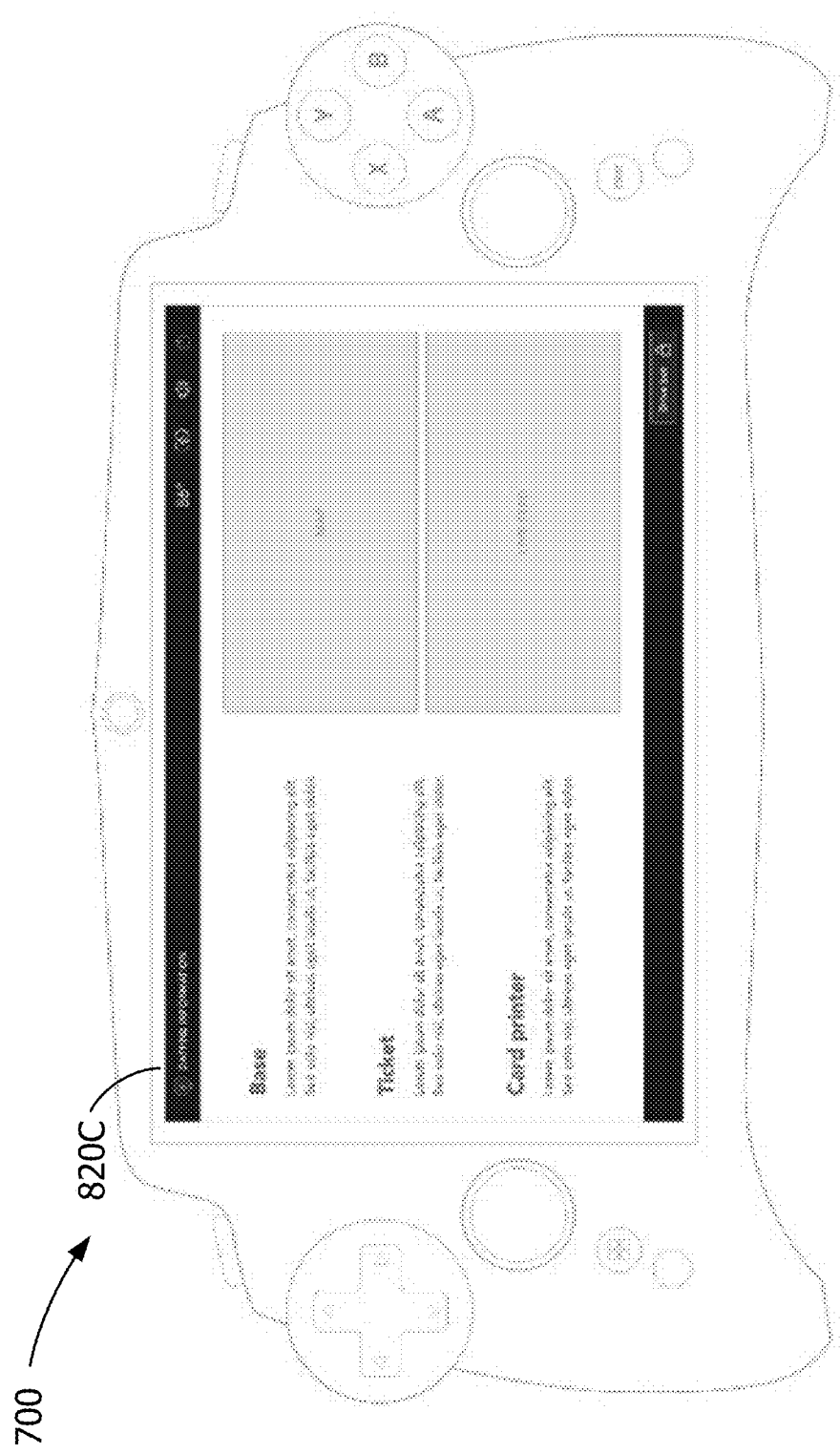
FIG. 8C illustrates example robot management system terminal user interface robot information screen.

FIG. 8C illustrates example GUI 820C, displayed on the touchscreen display 710 of mobile terminal 700. Example GUI 820C illustrates an information user interface for an exemplary selected robot 300 (e.g., a "Daphne" robot). The header bar 830 includes a temperature reading, e.g., the robot 300 ambient temperature or the casino venue ambient temperature, an indication of robot battery 332 charge level, an indication of robot 300 sound level, and an indication of the robot 300 power status, e.g., whether the robot 300 in 'on' or 'off'. In an example, a user may select, using the touchscreen display 710 the, e.g., sound or power indicators and open a user interface which allows the user to, e.g., adjust the robot 300 sound level or turn the robot 300 power 'on' or 'off'. Further, the illustrated GUI 820C comprises three areas providing information pertaining to the status of, e.g., the robot base unit 304, the robot ticket printer 364B or robot card printer 364A. In this example, the GUI 820C also comprises a Map display area which may, e.g., provide a view of a map of the casino venue, optionally with an overlay, e.g., a thermal overlay, a preferred path overlay, etc. In this example, the GUI 820C also comprises a Live Feed display area which may, e.g., provide a display of video received from a camera, or a display of video received from a server, e.g., a robot management server. In this example, the footer bar comprises a "Drive bot" button which, when selected may allow the user to enable the mobile terminal 700 to control motion and other operational features of the selected robot 300, e.g., using a mobile terminal 700 joystick to instruct the robot 300 to move forward and back, steer the robot 300 left and right, use a mobile terminal 700 button open a robot container 318, enable the robot camera 360, etc.

Figure 8D:
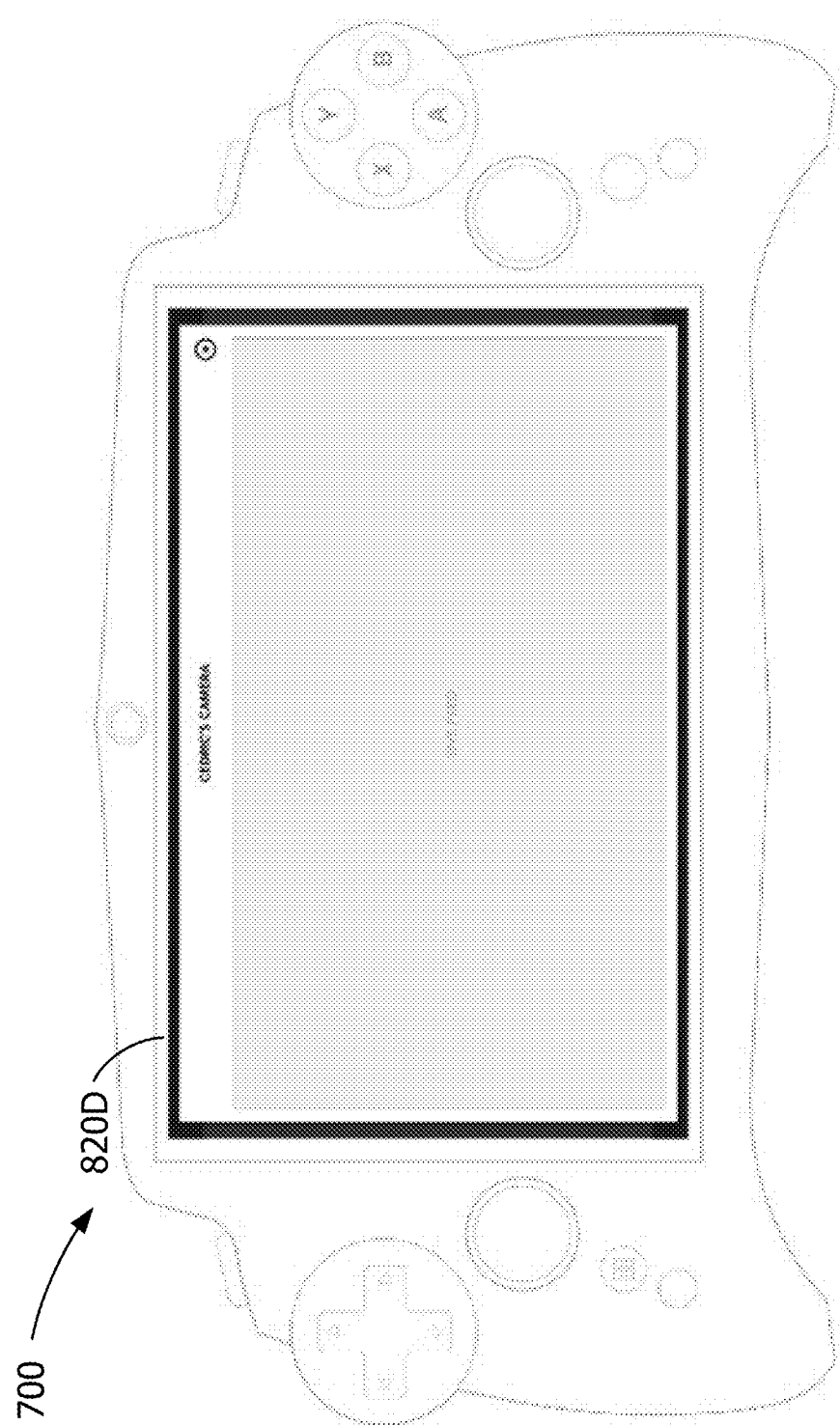
FIG. 8D illustrates example robot management system terminal user interface robot camera live feed screen.

FIG. 8D illustrates example GUI 820D, displayed on the touchscreen display of mobile terminal 700. Example GUI 820D illustrates a Live Feed display of video provided by a camera of a selected robot, e.g., "Cedric's Camera" of a selected "Cedric" robot. In an example, the live feed view may provide a live view of, e.g., the casino venue as provided by the robot camera. Further, the live feed view may be further comprised of an overlay, e.g., an object avoidance overlay or a heat map overlay, which may be overlayed upon the live feed view.

Additional Example Use Cases

The robots 300 can be configured to perform any combination of the various functions or tasks described herein. Each function may implicate the use of particular hardware devices and, as such, it is implied in these examples described herein that the robot 300 includes devices sufficient to support execution of the functions as described. Further, many of the examples herein describe robot "roles", which effectively represent collections of tasks, functions, or ROS packages that enable the robot 300 to perform some set of services of interest. It should be understood that these roles are provided for purposes of illustration and that other combinations of tasks, functions, packages, hardware or such are possible.

In some embodiments, the robot 300 is configured to perform a player service role. The player service role involves the robot 300 performing various services for players within the gaming venue 402 (e.g., actively playing at gaming devices 104, gaming tables 294, keno games, sports betting areas, lounges, spectating, dining, or the like). The player service role may include services such as, for example, the ordering of food, beverages, or other consumables that may be delivered within the gaming venue 402, player account operations (e.g., account registration, (re)printing player loyalty cards, performing financial transactions to deposit, withdraw, or transfer funds, examine loyalty point balances or available coupons or promotions), summoning a staff member, requesting first aid, reservation operations (e.g., booking reservations for hotels, shows, or other entertainment events), informational operations (e.g., answering player queries), or other kiosk operations.

The robot 300 may be triggered to begin a player service request for a player in one of many potential ways. In one example, the player initiates a player service request by pressing a service button on a gaming device 104, causing the gaming device 104 to transmit the player service request to the RMS server 106. In another example, the player initiates a player service request through the player app on their mobile device, thereby causing the player app to transmit the player service request to the RMS server 106. In still another example, the player at a gaming table 294 may ask a dealer at the table to initiate the player service request, and the dealer may use a dealer computing device at the table 294 to transmit the player service request to the RMS server 106. In yet another example, the player may verbally interact with an inactive robot 300 to begin a service request. In still another example, the player may request a robot 300 at a robot request station (e.g., a dedicated device positioned within the venue 402) or at a kiosk 260.

Upon receipt of the player service request, the RMS server 106 determines a location of the request ("request location"). This is the destination to which a robot 300 will be dispatched. For example, the player service request may include a device identifier of the requesting device (e.g., the gaming device 104 or gaming table 294 generating the request). As such, the RMS server 106 may determine a location of the requesting device and use that location as the request location for the request (e.g., where the robot 300 goes to begin service). In another example, the RMS server 106 may determine a current location of a known player based on the mobile device of the player (e.g., via player tracking, device tracking, or the like).

These and other methods of locating a particular patron may be used by the service robot role or other robot roles or functions. For example, the robot management system (e.g., the RMS server 106, the robots 300) may locate a particular patron based on the patron presentation of their player loyalty card (e.g., into a gaming device 104, kiosk 260, at a gaming table 294, or the like), through a mobile device of the patron (e.g., position location via GPS or indoor positioning system of their EUD 264), through human identification and reporting (e.g., by casino employees), through robot request stations, through facial recognition by property cameras or sensors (e.g., security system, robots 300), through payment card transactions, through vehicle identification (e.g., at valet), through biometric scanning (e.g., facial or speaker recognition), or through a dedicated tracking device. For example, patrons may carry around a dedicated tracking device that can be position located within the venue 402. Tasks that involve location of a particular patron within the operations venue 402 may use these or any other location methods described herein.

Once a request location is identified, the RMS server 106 may examine the current locations and operational status of the robots 300 within the fleet and assign an available robot 300 to this request (e.g., based on nearest available unoccupied robot to the requesting gaming device 104 capable of performing a service request or a delivery). The RMS server 106 may then transmit the player service request to the assigned robot 300, identifying the request location, and optionally an identity of the requesting player. As such, the robot 300 may determine a path and move to the request location to begin the service request.

Once at the request location, the robot 300 may engage in verbal communications with the requesting player or may present a graphical user interface through which the player can further clarify their service needs. In some embodiments, the robot 300 may authenticate the identity of the player. The robot 300 may present the player with request options (e.g., via the touchscreen GUI) or may receive audible instructions from the player. In situations involving the ordering of consumables, the robot 300 accepts the order from the player and transmits a food, beverage, or consumable order to the RMS server 106 (or to a supporting order management server, not shown). As such, the consumable order is submitted on behalf of the player, along with order information such as player identity and order location, and may subsequently be delivered (e.g., by service staff, by a delivery robot). In some embodiments, the robot 300 may allow the player to complete a payment transaction for the ordered goods or services (e.g., cash payment via bill/coin acceptor, payment card transaction, account transfer transaction, charge to room, digital wallet payment, Internet payment service, TITO ticket presentation, or the like).

At times, e.g., due to long wait times in line at a player loyalty club service booth, a player can be discouraged from enrolling in a player loyalty club or inconvenienced when needing to request a replacement player loyalty club card, at times resulting in a player deciding not to enroll in the club or an otherwise enrolled player choosing not to wait in line to obtain a replacement card and thus not have their game play tracked.

In some embodiments, the robot 300 may provide the player with an option to enroll in a player loyalty club (e.g., a player tracking club). If the robot 300 is equipped with a card reader 362 or camera 360, the robot 300 may read, take a photograph of, or otherwise scan a player's ID (e.g., driver's license, passport, or other government issued identification) to automatically retrieve the player's identification information, and transmit the information to a player loyalty club server (e.g., player tracking system server 110). Alternatively, the player may enter their identification information via a user I/O device 514 of the robot 300, e.g., a user interface provided on a touchscreen display device 352 of the robot 300. Following receipt of the player's information from the robot 300, e.g., communicated wirelessly via network 404 using wireless communication device 314 and wireless access points 410, the player loyalty club server 110 may enroll the player in the player loyalty club and send confirmation information to the robot 300 to communicate to the player.

In some embodiments, the robot 300 may become aware, e.g., receiving a communication from a player loyalty server or a robot control center operator, that a uncarded player has been playing for an extended period and provide the player with an opportunity to, using the robot 300, enroll in a player loyalty club. For example, the robot may be dispatched to the location of the player and inform the player, e.g., via auditory message, that if they enroll in the loyalty club using the robot 300 they will receive player club points for their historical and future game play, and may also be entitled to a promotional award. Further, the player may receive a promotional award, for enrolling in the loyalty club via the robot 300, which is either a predetermined fixed award, e.g., a free trip through the buffet, or a promotional award that is conditioned on the amount of their historical play, e.g., a first award for $100 wagered, a second award for $1000 wagered, etc.

In some embodiments the robot 300 may provide the player with the option to print a player loyalty card, e.g., upon the player newly enrolling in the player loyalty club as described above, or to replace a loyalty card that may have been, e.g., damaged, forgotten or misplaced. If the robot 300 is equipped with a loyalty card printer, the robot 300 may print the loyalty card locally, e.g., communicating player identifying information to player loyalty club server 110 and, upon the player loyalty club server 110 authenticating the player, receiving player loyalty club information therefrom to print the players loyalty card. Otherwise, the robot 300 may submit a request for printing of a loyalty card at a card printing station or loyalty desk and, in some embodiments, the RMS server 106 may dispatch a delivery robot 300 to deliver the card to the player, once printed.

In some embodiments, if a player desires a complimentary (comp) good or service e.g., as a reward for the players tracked game play, or would like to participate in a promotional program, e.g., offered to player for enrolling in the player loyalty club or for being "carded in" to an EGM during a promotional period, a service robot 300 may perform the role of guest host and immediately attend to the players comp or promotion participation request. For example, the player may request a comp or promotion via a user interface on an electronic gaming device 200, or an app on their end user device 264, e.g., their mobile device or smart phone, in response to which a robot 300 is dispatched to attend to the request of the player, e.g., by delivery of the requested comp, or assisting the player in participating in the promotion.

In some embodiments, a service robot 300 may allow a casino guest to check, e.g., using a user I/O device 514 of the robot 300, any promotional offers or the loyalty point balances that may be associated with their loyalty account. For example, a player may request or otherwise obtain a service robot 300 and, e.g., access their loyalty account by inserting their loyalty card into a card reader 362A of the robot 300 and entering their loyalty account PIN. Following, the robot 300 retrieves the casino guest's loyalty account information via the loyalty account server 110 and presents a user interface on a robot 300 display device 350. Using the user interface, the casino guest can, e.g., via a menu provided, access their loyalty account data, promotional offers, point balances, etc.

In some embodiments, a service robot 300 may allow a casino guest to make a reservation at a hotel or restaurant, e.g., that may be located within or in proximity of the casino property. For example, a casino guest can, e.g., via a user interface presented on a display device 350 of the robot 300, access a reservations web page of the hotel or restaurant, enter the required reservation information and submit their reservation request. Following, the service robot 300 may, via the user interface provide a confirmation of the reservation and, in some embodiments, using the robot 300 printer 364 print a confirmation receipt or, in other embodiments send a confirmation message, e.g., an email or text message, to the casino guest's mobile device 264.

In some embodiments, a service robot 300 might be deployed to attend to casino guests in areas of the casino that might see lesser patronage or otherwise get less attention (e.g., dedicated smoking or non-smoking areas), or in areas that are more secluded and thus less often frequented (e.g., by human casino hosts).

In some embodiments, a service robot 300 might provide a different frequency of service for a priority player, e.g., a player of a higher tier in the loyalty club or a 'whale' or VIP player. For example, a robot 300 might 'round robin' priority players in between performing other tasks (e.g., lower priority tasks) to ask if the priority player needs anything (drinks, etc). Further, a robot 300 might be assigned to prioritize the requests of priority players above other requests or tasks.

In some examples, a priority player might be provided with a 'beeper' or a feature of an app on their mobile device 264 to summon the robot. Further to this example, the beeper or mobile app might provide a signal or other information the robot might use to determine the location of the summoning priority player, such as geolocation information, a wireless beacon, or provide identify information of a physical object, e.g., an EGM, gaming table, etc. located in proximity of the summoning priority player.

In some embodiments, a service robot 300 may offer a plurality of tiers of service tasks, comprising a plurality of tasks the robot 300 is configured to undertake. Further, the tiers of service tasks may be organized as event-based tasks, and time-scheduled tasks. As an example, a jackpot hand pay task is tiered as an event-based task, e.g., a hand pay service task is performed by the robot 300 upon the occurrence (event) of a player winning a randomly determined jackpot award, a venue security check task is tiered as a time-based task, e.g., a venue locked door security check service is performed by the robot on a predefined time schedule. As a further example, a VIP service task may be tiered as both an event-based task, performed by the robot upon request by the VIP, e.g., in response to the VIP pressing a service request button on an app on their mobile device 264, and as a time-scheduled task, e.g., performed by the robot at a predetermined frequency such as the robot 300 visiting the VIP at least once every 30 minutes, once every hour, etc.

In some embodiments, a service robot may prioritize player service tasks in accordance with the VIP status or the player loyalty club tier of the player. As an example a player at a lower loyalty club tier, e.g., a "silver" tier might be entitled to a first set of available service tasks, provided at a first frequency, while a player at a higher loyalty club tier, e.g., a "platinum" tier might be entitled to a second set of available service tasks, e.g., comprised of a greater number and/or higher value service tasks as compared to the first set of available service tasks, the tasks available to be provided at a second frequency, e.g., at a greater frequency than the first frequency. Further to this example, a robot 300 might provide a VIP having a first status with a complementary beverage at a first frequency, while the robot 300 might provide a VIP having a second status with a complementary premium beverage at a second frequency (e.g., at a frequency greater than the first frequency).

In some embodiments, a service robot 300 might perform tasks, e.g., in accordance with task tiering, to optimize performance of the robot 300. As an example, a robot 300 might order the performance of time-based tasks to minimize the distance they travel when performing the tasks, e.g., when traveling to perform a time-based VIP service task the robot 300 may detect that a venue locked door due for a time-based security check is near the travel path to the VIP, and perform the venue locked door security check prior to visiting the VIP. As another example, a robot 300 may detect a number of VIP players gathered in an area of the venue and, as tasks provided to VIP player are of a higher tier, the robot 300 might use the area of the venue as a "home" area, returning to the venue area to offer service to the VIPs between performing lower tier tasks.

In some embodiments, service requests may be automatically triggered based on certain trigger conditions. For example, a service request may be triggered based on a game event (e.g., occurrence of a jackpot win, feature trigger, or to perform a hand-pay service), based on a scheduled event, or upon insertion of a player loyalty card. In some embodiments, service requests may be triggered by a casino employee or via a casino systems media window. In some embodiments, a service request may be triggered by identification of a particular patron being recognized as present at a property (e.g., via facial recognition scanning by a security system at the operations venue 402 or a robot 300, via room check-in, via payment card transaction of the patron at the property, via license plate identification at valet service, via biometric recognition obtained from sensors within the property, through interactions with a robot 300, etc.). Such service requests may include dispatching a robot 300 to the location of the patron to provide any of the various services described herein.

For example, during execution of a hand-pay service, the robot 300 may fill out government tax forms (e.g., a W2-G) for the player and may prepopulate the forms with various player information (e.g., from a stored player profile) and a win amount. The robot 300 may provide a GUI that allows the player to complete the government tax forms. Once completed, the robot 300 may optionally print the form or file the form electronically on behalf of the player.

As another example, upon identification of a particular patron newly appearing at the property (e.g., within the operations venue 402), the RMS server 106 may identify and dispatch a robot to the location of the patron. The robot 300 may be tasked, for example, to greet the patron, escort the patron to a particular location, interact with the patron to assess any immediate requests of the patron, and such.

In some embodiments, the robot 300 is configured to perform in a delivery role. The delivery role involves the robot 300 delivering physical items ("delivery goods") from one location to another. In the example gaming venue 402, the robot 300 may be configured to perform various delivery services, such as food/beverage delivery, prize delivery, person-to-person delivery, or hand-pay service. The robot 300 may include one or more secured containers 318 that may be automatically opened and closed only by the robot 300 (e.g., dedicated drink slots, food slots, cargo slots). Delivery requests can be submitted in various ways. In some embodiments, a delivery request may be generated by the RMS server 106 (or by an order management server) when an order of food, drink, or consumables is prepared and ready for delivery. In some embodiments, a person-to-person delivery may be initiated by one patron for delivery to another patron. In some embodiments, a delivery request may be generated after a player loyalty card has been printed and is ready for delivery. Delivery requests may identify a particular individual as the "target recipient," or the person for whom the delivery is to be made. In some embodiments, delivery robots may be used to deliver bingo or keno cards to players.

Delivery services start at a "pickup location" and end at "delivery location." Some delivery requests identify a fixed location as the pickup location or the delivery location (e.g., a particular station at a bar or restaurant, a particular gaming device 104 or gaming table 294). Some delivery requests identify a particular person as a pickup target or as a delivery target (e.g., in lieu of a pickup location or delivery location, respectively). In situations where either or both of the pickup location and delivery location is a person, the robot management system 400 determines a current location of the person (e.g., a player or property patron) to use as the respective location.

Similar to the robot assignment discussed above, once the pickup location is determined, the RMS server 106 assigns an available robot to the delivery request, and the assigned robot 300 moves to the pickup location to acquire the delivery goods. Once at the location, the robot 300 assigns one or more of the secured containers 318 to this delivery request and opens the secured container(s) 318 to allow service staff to load the delivery goods. In some embodiments, each secure container may have an associated button that the service staff can press once the delivery goods have been loaded. In some embodiments, the robot 300 may allow verbal interaction with the service staff and may broker the closing of the secured containers 318 as such. In some embodiments, the secured containers 318 may include pressure sensors, QR or bar code scanners, or camera devices that can detect whether, when, or what goods are loaded into the secured container 318, and may provide error alerts when the loaded goods do not match expectations for the delivery request.

Once the delivery goods have been loaded into the assigned secured container 318, the robot 300 travels to the delivery location. Upon arriving at the delivery location, the robot 300 may, for example, perform facial recognition or speaker authentication to identify and authenticate the target recipient for the delivery goods. Once authenticated, the robot 300 opens the secured container(s) 318 associated with the delivery and allows the recipient to withdraw the delivery goods. In some embodiments, the robot 300 may require a method of payment prior to opening the secured containers 318 (e.g., via payment card transaction, via ticket scan or feed into a ticket acceptor, charging to room via player identification or room key insertion, or such). In some embodiments, the robot 300 may capture image or video camera data collected during authentication or as the delivery goods are being removed from the secured container 318. In some embodiments, the robot 300 may sense the removal of the goods within a secured container 318 and automatically close the container. In some embodiments, the robot 300 may accept an audible command from the recipient when the delivery is complete. Subsequently, the robot 300 leaves the area and marks the delivery request as complete.

In some embodiments, the robot 300 may be dismissed by the user in various ways. For example, the robot 300 may be dismissed based on a pre-defined idle timeout value (e.g., after 60 seconds of disuse), based on a wait time after completing a particular task (e.g., 10 seconds after concluding a delivery), based on a verbal statement by the user (e.g., "goodbye", "you may go", "thank you", or the like), based on a GUI event (e.g., pressing a "dismiss" or "exit" button), or based on a bodily gesture (e.g., waving of an arm, turning away from the robot 300, walking away from the robot). Once dismissed, the robot 300 may transmit a message to the RMS server 106 indicating that the robot 300 has completed an assignment or is otherwise available for a next assignment. The robot 300 may move away from the present location and may be configured to move to an "idling position" within the operations venue 402.

In some embodiments, the robot 300 is configured to perform in a vending role ("vendor robot"). For example, the robot 300 may house a selection of canned or bottled beverages, individually wrapped snacks, or other consumables or products (collectively, "vending products" or "offerings"), and patrons may interact with the robot 300 to acquire these offerings. In some embodiments, the player may summon the robot 300 to their location by pressing a service button on a gaming device 104, at a kiosk 260, via dealer at a table 294, or via their player app on their mobile device (e.g., EUD 264). The summon location may be determined based on a known location of the summoning device (e.g., fixed location of the requesting gaming device 104, kiosk 260, or table 294) or via detecting location of the summoning player (e.g., detecting a location of the EUD 264 of the player, detecting player presence of the player based on a wireless connection between the EUD 264 of the player and a gaming device 104, kiosk 260, or table 294 with a known location). For example, if the player initiates a service request via their player app and EUD 264, the robot management system 400 may detect that the player is connected to a particular gaming device 104 and may use the known location of that gaming device 104 as the destination location for a dispatch request to the robot 300. In some embodiments (e.g., when an identity of the summoning player is known), upon arriving, the robot 300 may perform facial recognition to ensure that the summoning player is properly located before providing service, and if the summoning player is not identified, the robot 300 may be configured to request an updated location of the player from the RMS server 106 or may be configured to search the nearby area using facial recognition in an attempt to find the summoning player.

Upon arriving at the service location, the robot 300 may present a GUI to the patron, thereby allowing the patron to choose from among the offerings. In some embodiments, the offerings may be limited to a current stock of the robot 300. In some embodiments, the offerings may include items not currently carried by the robot 300, and an order for such items may cause the robot 300 to dispatch an order for delivery of those items to the patron (e.g., via delivery robot). The robot 300 may be configured to perform a payment transaction before the order is dispensed (e.g., payment card transaction, ticket scan or feed into a ticket acceptor, charging to room via player identification or room key insertion, or the like). Once an order has been approved, the robot 300 dispenses the requested products (e.g., transferring each requested product from an interior reserve to a dispensing area on the robot 300). The robot 300 may be configured to print a receipt for the transaction.

In some embodiments, the robot 300 is configured to maintain an internal inventory for the various vending products carried by the robot 300. For example, the robot 300 may include sensors configured to detect how many bottles of water, cans of soda, or candy bars of a particular type remain in internal inventory, or the robot 300 may maintain a running total based on an initial number of items that is reduced as transactions for those items occur. The robot 300 may be configured to automatically return to a restocking area, or may be tasked by the RMS server 106 to return to the restocking area, when inventory totals for one or more items is at or below a pre-determined threshold. In some embodiments, the robot 300 may be manually restocked with items. In other embodiments, the robot 300 may interface with a dispensing inventory robot at the restocking area to automatically restock the robot 300 (e.g., automatically identifying the needed items and transferring the needed items to the robot 300).

In some embodiments, the robot 300 may be configured to dispense restricted products, such as alcoholic beverages or tobacco products and, as such, may perform age verification of the purchaser to ensure that the purchaser meets legal age requirements for the particular purchase (e.g., based on the jurisdiction of the operations venue 402). For example, the robot 300 may identify the purchaser based on facial recognition, biometric scan, presentation of a government ID, or any combination thereof. If the robot 300 cannot positively identify the purchaser, the transaction may be rejected. In some embodiments, the robot 300 may capture and store camera data associated with the transaction.

In an implementation, a robot 300 is configured to provide promotional fulfilment services. In an example, a patron loyalty application enables a patron to recognize that they are within an area of the venue, e.g., a geo-fenced area, providing a robot fulfilment service. The patron loyalty application further enables the patron to select an offered promotional gift, e.g., a free toaster, two free tickets to a show, etc., and to select to have a robot 300 deliver the promotional item to them at their venue location, e.g., at a restaurant or bar, a gaming table or an EGM within the geo-fenced area.

In some embodiments, the robot 300 is configured to perform in a service technician role. The service technician role, in the gaming venue 402, involves the robot 300 performing service operations or device inspections on devices, electronics, and property within the venue 402. In the example embodiment, the robot 300 is configured to perform device inspections of gaming devices 104. Device inspections can be initiated in several ways. In some embodiments, the RMS server 106 or other system server may periodically (e.g., weekly) schedule device inspections of the gaming devices 104 within the venue 402. In some embodiments, the robot 300 may automatically perform a device inspection of a device 104 ("target device") when they perform a delivery or a service request at that device 104 or are otherwise near the device and/or if the previous device inspection time for the device exceeds a pre-determined threshold. In some embodiments, players or support staff can request a device inspection.

In some implementations, a robot 300 is configured to perform in a drop team role. The drop team role, in the gaming venue 402, involves the robot 300 performing service operations associated with the casino venue nightly drop process, including exchanging the paper currency and ticket cans from an EGM 104 bill/ticket validator 362 with an empty can, and recording the EGM game data, e.g., the EGM game play meters. In an example, a robot 300 is configured to securely dock with the EGM cabinet, open the secure EGM door to access the bill/ticket validator can and exchange the existing bill/ticket validator can with an empty can. In an example, the robot 300 is configured to wirelessly interface with the EGM to read EGM electronic game data meters. In an example, the robot 300 is configured to use a camera, or other optical scanning device, to optically read the EGM mechanical game data meters. In an example, the robot 300 works under the supervision of a human drop team member. The human drop team member first verifying that the EGM is not being actively played by a patron, and that the area, e.g., in front of the EGM, is clear of obstacles that would prevent the robot 300 from performing the drop task. In an example, the robot 300 first inspects the EGM for actively play and/or obstacles and, if detected, alerts a human drop team member for assistance. In an example, the robot 300 and the EGM cabinet are configured to enable the robot 300 to securely access the bill/ticket collection area within the EGM and retrieve any paper currency and tickets contained therein. In an example, the robot 300 is configured to read or validate each bill and ticket as it is retrieved from the bill/ticket collection area within the EGM, and record the value of the bills and tickets in a memory of the robot 300 or a network server, e.g., a casino management server.

In an implementation, a robot 300 is configured to provide electronic gaming device (EGM) 200 data collection services. As an example, a robot 300 is configured to receive and record game play data from an electronic gaming device 200. In an example implementation the robot 300 is in wireless, e.g., WiFi, Bluetooth, NFC, other, communication with the electronic gaming device 200 and receives game play data via the wireless interface. In an implementation, the wireless interface is a secure wireless interface with the game play data being encrypted using, e.g., Triple DES, RSA, Blowfish, Twofish, AES, other, encryption protocol by the EGM 200 prior to transfer to the robot 300. In some implementations, the wireless data interface is a unidirectional interface configured to transmit data from the EGM 200 to be received by the robot 300. In some implementations, the wireless protocol is bidirectional allowing both the EGM 200 and the robot 300 to transmit and receive data. In some implementations, the robot 300 receives and records data from the EGM 200 as they pass by or are otherwise in proximity to the EGM 200. In some implementations, the robot 300 records data in real-time from the EGM 200 as the EGM is being actively played by a patron. In some implementations, the robot 300 stores the received data in a memory device 322, 324 for later upload to a server, e.g., the robot management system server 106. In some implementations, the robot 300 is in network communication the robot management system server 106, and actively uploads the data at the time it is received from the EGM 200. In an implementation, the robot 300 uses real-time game play data to create a real-time heatmap indicating where patrons are actively playing EGMs 200 in the casino and the characteristics of their play, e.g., coin-in, rate of play, coin-out, etc.

Upon receipt of a device inspection request and assignment of a nearby robot 300 configured to perform such a service, the assigned robot 300 moves to the location of the device to begin an inspection process. In some embodiments, the RMS server 106 provides the device location to the assigned robot 300 as a part of the request assignment, where in other embodiments, the robot 300 receives a device identifier for the target device and locates the device automatically (e.g., via static map, via a location request to the RMS database 414, via manual search).

Once at or near the target device location, the robot 300 may begin an inspection process. In some embodiments, the robot 300 may not be able to complete the inspection process if the target device is occupied. As such, the robot 300 may initially scan the area in front of the target device and determine whether the device is occupied (e.g., whether a player is standing or sitting in front of the device). If the target device is occupied, the robot 300 may delay or cancel the inspection process and may transmit a message to the RMS server 106 indicating a delay on the inspection request. If the target device is unoccupied, or if the robot 300 is configured to perform the inspection process regardless of current device use, the robot 300 continues the inspection process.

The inspection process may include one or more inspection tasks. In some embodiments, the robot 300 may capture an image of the target device and compare the captured image to a baseline image to determine, for example, whether current brightness of the target device is within acceptable range, whether the device is powered on, whether edge lighting is fully functional, whether there is any physical damage to the cabinet, button deck, displays, chair, reels, or other visible device components. In some embodiments, the robot 300 may establish a wireless connection with the device (e.g., via network 404, via NFC connection directly with the target device). Once connected to the target device, the robot 300 may initiate diagnostic routines and may capture digital images or video of the target device or particularly of the output occurring on the display (e.g., evaluating the graphical output for error codes, alerts, or the like). After the inspection process is complete, the robot 300 may transmit an inspection completion message to the RMS server 106 or RMS database 414 for tracking the completion of the inspection and optionally any results of such inspection.

In some embodiments, the robot 300 is configured to perform in a companion role. The companion role, in the gaming venue 402, involves the robot 300 being assigned to a particular patron for a period of time and or otherwise being available to prioritize performance of various companion services for the assigned patron during that time. Such assignment may include greeting the patron upon their arrival or upon assignment to the patron, following the patron around the venue 402, escorting the patron to particular locations (e.g., to particular gaming devices, gaming tables, restaurants, shops, or other venue locations), providing electronic games to be played by the patron, reserving or holding a position at a gaming device or gaming table while the patron is away, performing audio interactions with the patron, offering reservations to restaurants or shows, providing maps, relaying audio or visual messages to or from other patrons, performing delivery services on behalf of the patron, performing hotel check-in or check-out for the patron, summoning car via valet, or any of the various service request or kiosk operations described above. In some embodiments, the RMS server 106 may automatically detect when the patron arrives on the property and may automatically assign and dispatch an escort robot to the patron (e.g., VIP patrons, high rollers, and the like). In some embodiments, the assigned patron may carry a dedicated tracking device, allowing the assigned robot to locate the patron and possibly allowing the patron to summon a companion robot. In some embodiments, the companion role may respond to availability requests of a patron, such as "find me an open seat at a poker table" or "is there an open seat at a Lightning Link® gaming device," and the robot management system 400 may be configured to determine such information based on machine use data, heat map data, camera data, or the like (e.g., a centralized "in-use" database).

In an implementation, the robot is configured to assist a patron in the location of an EGM with a particular game, e.g., a patron's favorite game, or a game they otherwise desire to play, and/or a game with a particular progressive jackpot, e.g., a wide area jackpot that may be above a desired award amount (e.g., $1 M, $500K, $10K, etc.). In an example, the patron can request the assistance of the robot 300 and communicate the game title or progressive award amount to the robot 300 using a user I/O device of the robot 300 or, e.g., with voice commands via a robot microphone 356. In an example, the robot 300 provides a menu, e.g., displayed on a touchscreen display 312, of all available games in the venue enabling the patron to navigate the menu and select the game they desire to play. In some examples, the robot 300 provides a map of the venue with the location of the machine. In some examples, the robot 300 escorts the patron to the location of the machine, e.g., with a "follow me, the game is this way". In some examples, the map of the venue displayed by the robot 300 with the location of the machine also informs the patron if the EGM is currently being played. In some examples, if the EGM displayed on the robot display 312 is not currently being played, the robot 300, e.g., in communication with a robot management server or a casino management server, enables the player to reserve the machine, disabling the EGM from being played by another patron until the reserving patron arrives at the EGM.

In an implementation, a robot 300 is configured to provide a game overview, or tutorial, to a patron. As an example, the robot 300 is in an area of the venue where one or more EGMs with new games are located. The robot 300 displays and periodically announces a message that a new game is available and to "come see me" for a demo of the game and information on how to play, e.g., how to win the top award, or to trigger a bonus feature, etc.

In an implementation, a robot 300 is configured to perform a secure escort service to securely escort a patron to a location within or in proximity of the venue. As an example, a patron can request a secure escort service using, e.g., an application on their end user device 264, via a kiosk, or via a robot user interface 514 to enter the request and also enter the destination location, e.g., a restaurant or bar in the venue, the valet booth or cab stand in proximity of the entrance of the casino, their hotel room, or the location of their car in the parking lot or parking garage. The robot 300 is configured to receive the request and, either autonomously or in communication and coordination with the robot management system and/or with the venue security system and personnel, determine a path to the destination and escort the patron thereto. Further to this example, during travel to the destination the robot 300 is configured to communicate status information to the robot management server and/or the venue security system, e.g., location information, video images, audio data, etc. In this example, the robot 300 is configured to communicate with the patron, e.g., sharing interesting facts about areas of the venue, discuss current events or the weather, etc. Further to this example, the robot 300 is configured to detect when the patron is in an unsafe environment or situation, e.g., monitoring for alarming words or phrases from the patron ("help", "call 911", "call security", "fire", etc.) and respond to the unsafe situation by, e.g., alerting security, sounding an alarm, flashing a bright light or strobe light, dialling 911, escorting the patron away from the unsafe environment, toward an emergency exit, etc.

In some implementations, a robot 300 is configured with fire detection and suppression equipment, e.g., heat sensors, flame sensors, thermal imaging equipment, smoke detectors, carbon monoxide detectors, hazardous substance detectors, fire extinguishers, fire suppression blankets.

In some embodiments, the patron may be able to view a current status of a robot 300 currently assigned to a task for that patron. For example, the patron may have submitted an order for a drink and the robot management system 400 may provide status information on the order (e.g., via the player app). The status information may include current task status (e.g., awaiting drink to be made, carrying drink to patron), or current location information of any robot 300 currently assigned to that task, thereby allowing the patron to see where their robot 300 is currently located, watch the robot movement (e.g., on a floor map), or the like. In some embodiments, the patron or an administrator may be able to view current camera data from the robot 300 or take control of the robot 300.

In some embodiments, the robot 300 is configured to perform in an entertainment role. The entertainment role, in the gaming venue 402, involves the robot 300 performing any one of various entertainment features, such as playing songs or videos for spectators, telling jokes to patrons, performing animated movements or orchestrated dances with other robots 300, or capturing personal photos for patrons.

In some embodiments, the robot 300 is configured to perform in a mobile advertising role. The mobile advertising role involves the robot 300 displaying digital advertising on the display devices 350, playing audio via speakers 354, or some combination thereof. When performing in a mobile advertising role, the robot 300 may be assigned to a particular location or to a particular advertising area within the venue 402. The robot 300 moves to that location and executes ad presentation at that location or within that area. When an advertising area is assigned, the robot 300 may move throughout the area, thereby attracting additional attention and providing improved visibility coverage. The RMS server 106 may provide the ad content presented by the robot 300. In some embodiments, robots 300 that are currently unassigned to other tasks may autonomously enter the mobile advertising role or may otherwise be assigned to the mobile advertising role (e.g., until the robot is needed for a new request).

In some embodiments, the robot 300 is configured to perform in a security role. The security role involves the robot 300 acting in a security capacity on behalf of the operations venue 402. When assigned to the security role, the robot 300 may perform various security tasks, including moving to assigned locations, moving to a particular gaming device or gaming table, moving to a particular suspect, maintaining visual contact with a particular patron, capturing images or video of a particular patron, or transmitting captured camera data to a central security system (not shown).

In some implementations, the robot 300 is configured to assist in the execution of an evacuation plan, e.g., by guiding and assisting patrons along an emergency route, toward an emergency exit, away from a dangerous area, etc. In some examples, the robot 300 can assist with the search and sweep of an evacuation area for patrons that are in need of, e.g., rescue or medical assistance, security personnel assistance, locating an emergency exit, escort away from a dangerous location or situation, etc.

In some embodiments, the robot 300 is configured to perform in a medical assist role. The medical role involves the robot 300 carrying various medical equipment and supplies that may be needed to assist distressed patrons. For example, a medical robot 300 may be configured to dispense first aid supplies (e.g., band aids, alcohol wipes, or the like). The medical robot 300 may be configured to carry an automated external defibrillator ("AED") device and cardiopulmonary resuscitation (CPR) equipment that, upon arrival of the robot 300, may be used by nearby patrons or staff to provide CPR and defibrillation aid to a distressed patron. The medical robot 300 may be summoned or dispatched by the robot management system server 106, or by verbal requests made at other robots 300. Various robots 300 may be configured to actively listen for distress calls of patrons (e.g., calls for help) and dispatch a medical assist robot upon detection In some embodiments, the robot 300 is configured to perform a custodian role. The custodian role involves the robot 300 performing various cleaning, disinfecting, and sanitizing operations within the gaming venue 402. In such embodiments, the robot 300 may include one or more extendable robotic arms and various effectuator that can be used for associated cleaning operations. For example, the robot 300 may include a gripping effectuator that can grasp items (e.g., trash, ash trays, dirty dishes, or the like) and the robot 300 may be configured to identify trash (e.g., via object recognition and digital video processing), pick up those items, and remove those items from the area. In some embodiments, the robot 300 may be configured to carry the item to a designated deposit location (e.g., nearby public trash receptacle, dish bussing station, kitchen, bar, or the like). In some embodiments, the robot 300 may include one or more internal collection receptacles that can accommodate such collections, such as a trash receptacle, a dirty dishes receptacle, an ash receptacle, or the like, and the robot 300 may be configured to open the collection receptacle and deposit the collected items (e.g., based on a detected type of object). In some embodiments, the robot 300 may be configured to audibly interact with patrons to secure consent for removing a nearby object. In some embodiments, the robot 300 may be configured to detect when an internal collection receptacle is emptied (e.g., based on weight or volume consumed within the receptacle, based on a tracked inventory of collected items) and the robot 300 may automatically be tasked to empty the collection receptacle (e.g., moving to a designated location, automatically withdrawing the contained items, allowing manual withdrawal of the contained items by service personnel at the designated location, or the like). In some embodiments, one robot 300 (a "picker robot") configured with the robotic arm may work in tandem with another robot 300 (a "receptacle robot") configured with the one or more internal collection receptacles to accept such items. When items are detected for collection, the picker robot may position itself within reach of the item and the receptacle robot may position itself such as to be within reach of the picker robot but to not interfere with the item collection. The picker robot collects the item and deposits the item within the collection receptacle of the receptacle robot.

In some embodiments, robots 300 may be configured to escalate service requests based on the type of service requested by the patron. For example, during an interaction with a patron, if a particular robot 300 is not configured to perform a particular service, that robot 300 can automatically summon another robot 300 that is configured for that operation. Some tasks may cause an escalation to a human staff member (e.g., a floor manager).

In some embodiments, the robot management system server 106 may evaluate robot utilization at various time periods (e.g., times of day, days of week) and may deploy more or fewer of various types of robots 300 based on historical and/or anticipated need.

In some implementations, a robot 300 is configured to perform table game services. As an example, a table game dealer, table game pit manager or other casino personnel can request, e.g., via a table or pit terminal, an app on a mobile device, a robot user I/O device, etc., a table game chip fill or credit pick up service from the casino cage. The request is communicated to, e.g., a robot 300 or the robot management server 400, and a robot 300 is dispatched to the casino cage to receive a fill of casino chips for delivery to the table or dispatched to the table to retrieve the credit (e.g., chips, currency, TITO tickets) for delivery to the casino cage.

In some implementations, a robot 300 is configured to perform bingo game play services. In an example, a robot 300 is operational in a, e.g., bingo hall or other venue where bingo is played, and is configured to receive bingo card purchase requests from bingo patrons, e.g., via an app on a patrons end user device, a special purpose mobile device, a kiosk or a robot user I/O device, for one or more current or future bingo games. In this example, the robot 300 is configured, in response to the bingo card purchase, to deliver the purchased bingo card to the player, e.g., from a set of preprinted bingo cards stored upon or retrieved by the robot 300, or printed on demand by the robot 300 by a robot printer. In an implementation, a robot 300 stores the bingo card information in a robot memory device and associates the bingo card with the patron, e.g., associating the bingo card information with the patron's loyalty account ID. Further to this example, the robot 300 is configured to monitor bingo game play (the bingo ball call) and, if the patron's bingo card wins a bingo or other award the robot 300 alerts the patron and, in some examples, announces "bingo", and does a celebration performance, e.g., a robot "dance", plays a song, etc.

In some implementations, a robot 300 is configured to perform bingo game side-bet services. In an example, the robot 300 is configured to take side-bet wagers from patrons during a current bingo game or in advance of a future bingo game. Examples of bingo side-bets include bets on specific calls, e.g., whether the final house ball will be odd or even, whether the final house ball will be high or low—for example, above or below 45 in 90-ball bingo, whether the final ball will be a paired number, e.g., 22, 44,66.

In some implementations, a robot 300 is configured to perform keno game play services. In an example, a robot 300 is operational in a, e.g., keno lounge, restaurant or other venue where keno is played, and is configured to receive keno ticket purchase requests from keno patrons, e.g., via an app on a patrons end user device, a special purpose mobile or remote device, a kiosk or a robot user I/O device, for one or more current or future keno games. In this example, the robot 300 is configured, in response to the keno ticket purchase, to deliver the purchased keno ticket to the player, e.g., with the robot 300 retrieving the printed ticket from the keno cage, or by the robot 300 printing the keno ticket using, e.g., the robot printer. In an implementation, a robot 300 stores the keno ticket information in a robot memory device and associates the keno ticket information with the patron, e.g., associating the card with the patron's loyalty account ID. Further to this example, the robot 300 is configured to monitor keno game play (the keno ball call or keno board) and if the patron's ticket wins an award the robot 300 alerts the patron and, in some examples, announces "keno winner" and does a celebration performance, e.g., a robot "dance", plays a song, etc.

In some implementations, a robot 300 is configured to receive payment from a patron for keno ticket purchases or bingo game cards and side-bet purchases, e.g., receiving currency or credit tickets via a robot bill validator or ticket reader.

In some implementations, a robot 300 is configured to provide keno game or bingo game and side-bet winnings to a patron, e.g., dispensing currency from a robot currency dispenser or printing a credit ticket from a robot ticket printer.

In some implementations, a robot 300 is configured to enable a patron to place sporting event, e.g., basketball, horse racing, etc., wagers using a robot user I/O device. In an example, a robot 300 in communication with a sports wagering system provides a user interface, e.g., on a robot display device. The robot 300 provides sporting event wager information to the patron via a display device and receives sporting event wager information from a patron via the user interface. In some implementations, the robot 300 provides on a display device a listing of horse racing sporting event wagering information including, e.g., a plurality of horse races to be run, along with the current odds for each horse running in each of the horse races. Via the user interface the robot 300 enables the patron to receive the horse race event wagering information and to place a wager on one or more horses in one or more of the horse races. In some examples, the robot 300 upon receiving wager information from the patron via the user interface and wager payment via, e.g., a currency validator or credit ticket reader, places the wager for the patron, e.g., via the sports wagering system, and prints a wagering ticket for the patron via a ticket printer.

In an implementation, a robot 300 is configured to provide celebration services. In an example, one or more robots 300 celebrate casino gaming award related events, e.g., jackpot awards, tournament winners, bingo winners, etc., and/or patron loyalty award related events, e.g., scatter awards, hot-seat awards, random bonusing awards for carded and uncarded patrons, etc., by displaying a light-show, playing music, displaying a congratulations screen, "dancing" and spinning around, and other fun celebratory actions. In an implementation, multiple active robots 300 are operational in a venue and, upon the occurrence of a patron hitting a jackpot award at an EGM 200, begin a celebration display with the robots 300 all traveling to the vicinity of the EGM 200 and, when they're all in proximity, begin spinning, dancing, displaying flashing lights, playing music, announcing congratulation messages, e.g., "woo-hoo", "award winner", big winner", "congratulations", etc., and displaying congratulations screens on each of the robots 300. In some implementations, the robots all operate in synchronization, preforming a choreographed dance routine, line dancing, etc. In some implementations, the celebration follows the theme of the EGM game awarding the jackpot (e.g., a buffalo stampede themed celebration displaying and/or mimicking running buffalos and announcing "buffalo!") for a jackpot award hit on an Aristocrat "Buffalo" themed game.

In an implementation, a robot 300 is configured to provide award hand-pay services. In an example implementation, when a robot 300 receives notification, e.g., from a robot management system server 106, that a hand-pay event (e.g., the award of a jackpot above a reportable gambling winnings for taxation threshold, e.g. US $1,200, and the filing of a W-2G is required) on an EGM 200 has occurred the robot 300 will travel to the EGM 200 and greet the winning patron. Further to this example, the robot 300 facilitates the completion of a government tax form, (e.g., a W-2G form), for the patron by receiving the patron's identification information, e.g., photographing the patrons driver's license or other government issued ID with a camera device 360, scanning the ID card with an optical scanning device, reading the ID card with a card reader 364A, etc., and completing the tax form entering the personal information and any other required information, e.g., the win amount, any taxes withheld, etc. In some examples, the robot 300 receives the patron's signature via a touchscreen device 352. Once the tax form has been completed the robot 300 transmits a copy of the tax form to a server, e.g., the robot management system server 106 for electronic filing and prints a copy of the government tax form for the patron using a printer 364.

In some implementations, a robot 300 is configured to perform jackpot alert services. As an example, a robot 300 is notified, e.g., by the robot management system server 106, that a jackpot, e.g., a progressive jackpot, is above a threshold amount, e.g., $10,000, $100,000, $1,000,000, etc., and in reaction to the notification the robot 300 may announce, e.g., "Aristocrat Dragon Link Grand Progressive is now above $50,000" in an exciting manner and, e.g., display flashing lights, dance, spin and run around, display exciting video, etc. In another example implementation, a robot 300 in a first area of the casino venue is notified, e.g., by the robot management system server 106, that a jackpot has just been awarded in a second area of the casino venue the robot may announce, e.g., "an Aristocrat Dragon Link Grand progressive of $50,901 has just been awarded near the Show Room" in an exciting manner and, e.g., display flashing lights, dance, spin and run around, display exciting video, etc.

In some implementations, a robot 300 is configured to provide "selfie" services. In an example, a robot 300, using a camera device 360, presents a video display of a patron on a display device 350 and, receiving an input from a patron, e.g., via a user I/O device 514, captures a photograph of the patron. Further to this example, the robot 300 uploads the photograph to a server, e.g., the robot management system server 106 and, in some examples, prints a ticket, using a ticket printer 364, to provide to the patron comprising a link to the photograph on the server. The patron can then access the link to retrieve a copy of the photograph. In some implementations, the robot 300 enables the patron to provide their identifying information, e.g., via reading the patrons loyalty card, or other ID, using the card reader 362A. Further to this example, the robot then uploads the patron information to the server, e.g., robot management system server 106, and the server associates the photograph with the patron's information. In some instances, the loyalty system server 110 is in communication with the robot management system server 106 and, upon the patron accessing their patron loyalty account, enables the patron to access and/or retrieve the photograph via the loyalty account server 110. In some implementations, the robot 300 enables the patron to provide their social media site account information, e.g., their Facebook® account information, etc., and have the photograph uploaded directly, e.g., via the robot management system server 106, to the patron's social media site. In some implementations, a robot 300 is configured to enable the patron to take their photograph with an EGM 200 game screen displaying a winning outcome, e.g., a jackpot award. In some implementations, a robot 300 is configured to enable a patron to take their photograph with another person or another robot. As an example, a server, e.g., the robot management server 106, notifies the robot 300 that a celebrity is in the proximity of a VIP patron and the robot 300 then guides the patron to the celebrity to have their photographs taken. In some implementations, a robot 300 is configured to overlay a photograph with, e.g., casino venue branding information or other artwork, e.g., a photograph taken at an Aristocrat EGM 200 is overlaid with an Aristocrat logo, etc.

In some implementations, a robot 300 is configured with photographic facial detection, auto-frame, and auto-lighting capabilities. In an example, a robot 300 is configured with facial recognition software enabling the robot to detect and properly center a patron's face when taking a photograph, detect whether a patron is smiling, their eyes are open, etc. In an example, a robot 300 is configured with light emitting devices, e.g., surrounding a display device 312. Further to this example, the robot 300 is configured to detect the lighting of the patron's face and, using the light emitting devices, automatically correct the lighting brightness and color, e.g., by adjusting the light output of the light emitting devices, when taking a photograph of the patron. In some examples, the light emitting devices are tri-color LEDs.

In an implementation, a robot 300 is configured to provide auto-teller machine (ATM) services. In an example, the robot 300 receives patron casino account or patron financial institution account information and patron requested transaction information, e.g., via a user I/O device, and performs the requested patron financial transaction. In an example, a robot 300 is configured to wirelessly communicate with a patron end user device, e.g., smart phone. The robot 300 is further configured to receive patron account and transaction information from a "digital wallet" application running on the patron end user device and communication that information to, e.g., a casino account server or financial institution account server. Upon patron and transaction authentication and validation by the account server, the robot 300 receives patron transaction information, e.g., transaction approved or denied, from the account server and, in accordance with the received transaction information completes the patron transaction, e.g., issues payment of currency via a currency dispenser, issues a credit ticket via a ticket printer or displays a "transaction denied" message on a display device.

In an implementation, a robot 300 is configured to perform parking lot ticket validation services. In an example, a robot 300 may be configured to receive a parking lot ticket from a patron via, e.g., a ticket reader or an optical scanning device, and validate the parking lot ticket. In some examples, the robot is in communication with a parking lot payment system server and, upon receipt of the ticket, communicates parking lot ticket information to the server for validation. Further to this example, the robot 300 receives parking lot ticket validation information from the server, e.g., validation approved or denied, and accordance with the received information completes the parking lot ticket validation, e.g., prints a validation receipt using a ticket printer, returns the parking lot ticket to the patron and presents a "validation approved" message on a display device or returns the parking lot ticket to the patron and presents a "validation denied" message on a display device.

In an implementation, a robot 300 is configured to provide parking valet services. An as example, a robot 300 is in communication with a parking valet system server and is enabled to receive a parking valet ticket from a patron, e.g., via a ticket reader or optical scanning device. Further to this example, the robot 300 communicates parking valet ticket information to the parking valet system server and, upon receiving acknowledgement from the server that the ticket has been received and is valid, displays a confirmation message on a display device. In some examples, upon receiving acknowledgement from the parking valet system server that the valet ticket is valid, the robot 300 retrieves the patron car keys from a storage location, e.g., in a valet booth or in a robot 300 storage compartment, and delivers the car keys to a parking valet attendant. In some examples, the robot 300 delivers the car keys to the valet attendant at a location proximate to the patron, e.g., at or near a casino venue exit. In some examples the robot 300 delivers the car keys to the attendant at a location distal from the location of the patron, e.g., at or near the valet parking lot. In some implementations, a first robot 300 receives and validates the valet ticket and a second robot delivers the car keys to the valet attendant. In some implementations, the parking valet system upon receiving and validating the parking valet ticket communicates a valet car retrieval request to the patrons autonomous self-driving vehicle, instructing the patrons vehicle to travel to the patron, e.g., proximate to the casino venue exit.

In an implementation, a robot 300 is configured to provide video projection services. In an example, the robot 300 is configured with video projection equipment and is enabled to project, e.g., marketing videos, promotional videos, entertaining videos, network television shows, slot game play screens, live sporting events, etc. In an example, a robot 300 is configured to project video in a predetermined location in the casino venue, e.g., a projection display screen or known open wall of the casino venue, an open ceiling area of the casino, a surface of an opaque or frost glass or any other surface upon which video can be projected. In an example, a robot 300 might be configured to provide video projection services when docked at a recharging station, e.g., when in a stationary kiosk mode at the recharging station or otherwise idle. In an implementation, a robot 300 is configure with a fog making device and, using one or a plurality of video projectors, project a video hologram into the fog medium. In some implementations, a robot 300 is configured with a laser light show apparatus and, in an example, projects laser light messaging, a laser animation, etc. onto a projectable surface, or projects a laser hologram, e.g., onto a fog medium (as described above).

In an implementation, a robot 300 is configured with a digital camera array. In an example, a robot 300 using a digital camera array creates, e.g., 3D images or panoramic images. In an example, a plurality of robots 300 configured with digital cameras are enabled to cooperatively create 3D images, e.g., the robots 300 arranged in predetermined locations about an object (EGM, patron, etc.) capturing images of the object from a plurality of perspectives.

Figures 9A, 9B:
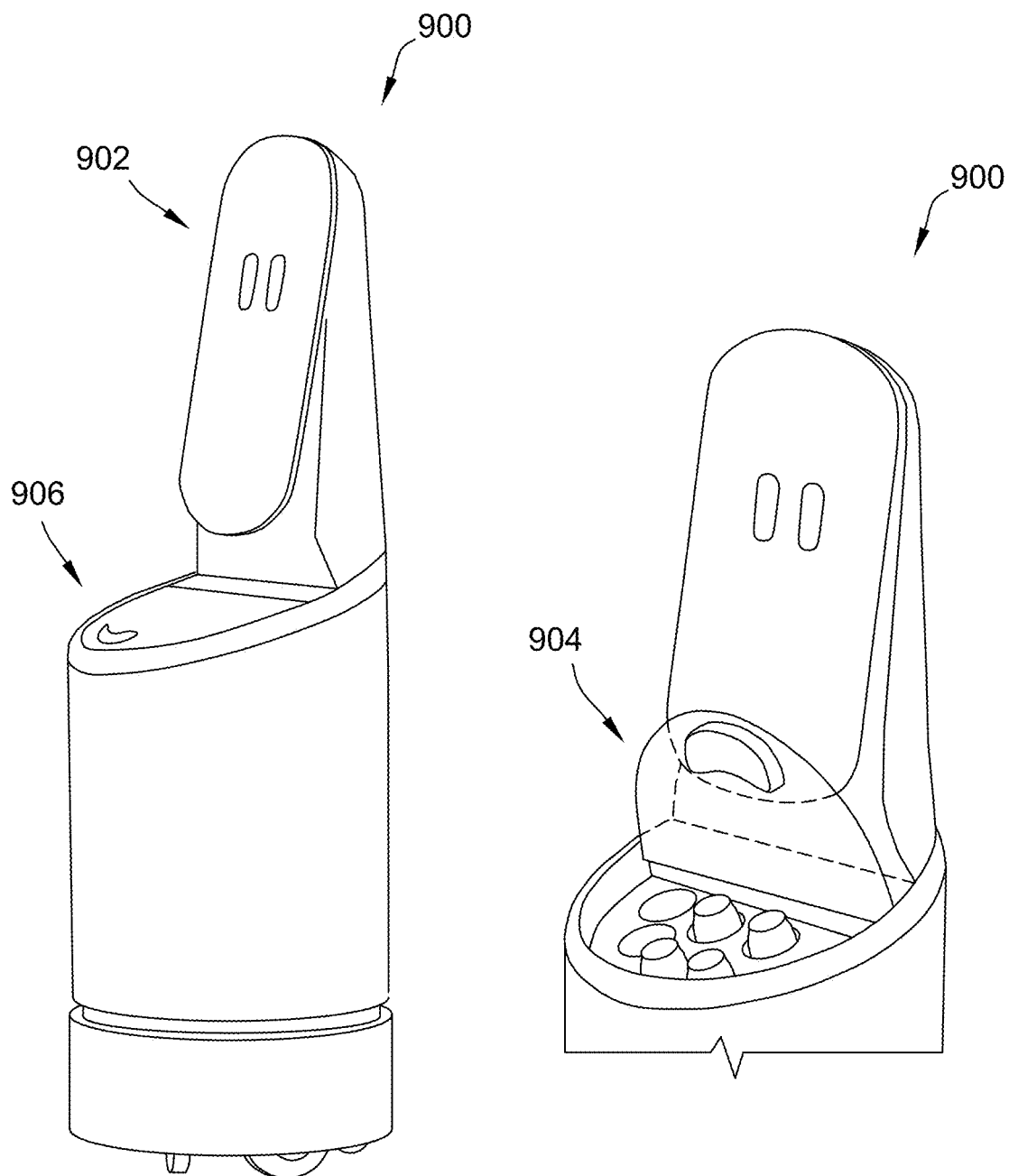
FIGS. 9A and 9B illustrate an example vendor robot that is configured to dispense food or beverages.
Figures 10A, 10B:
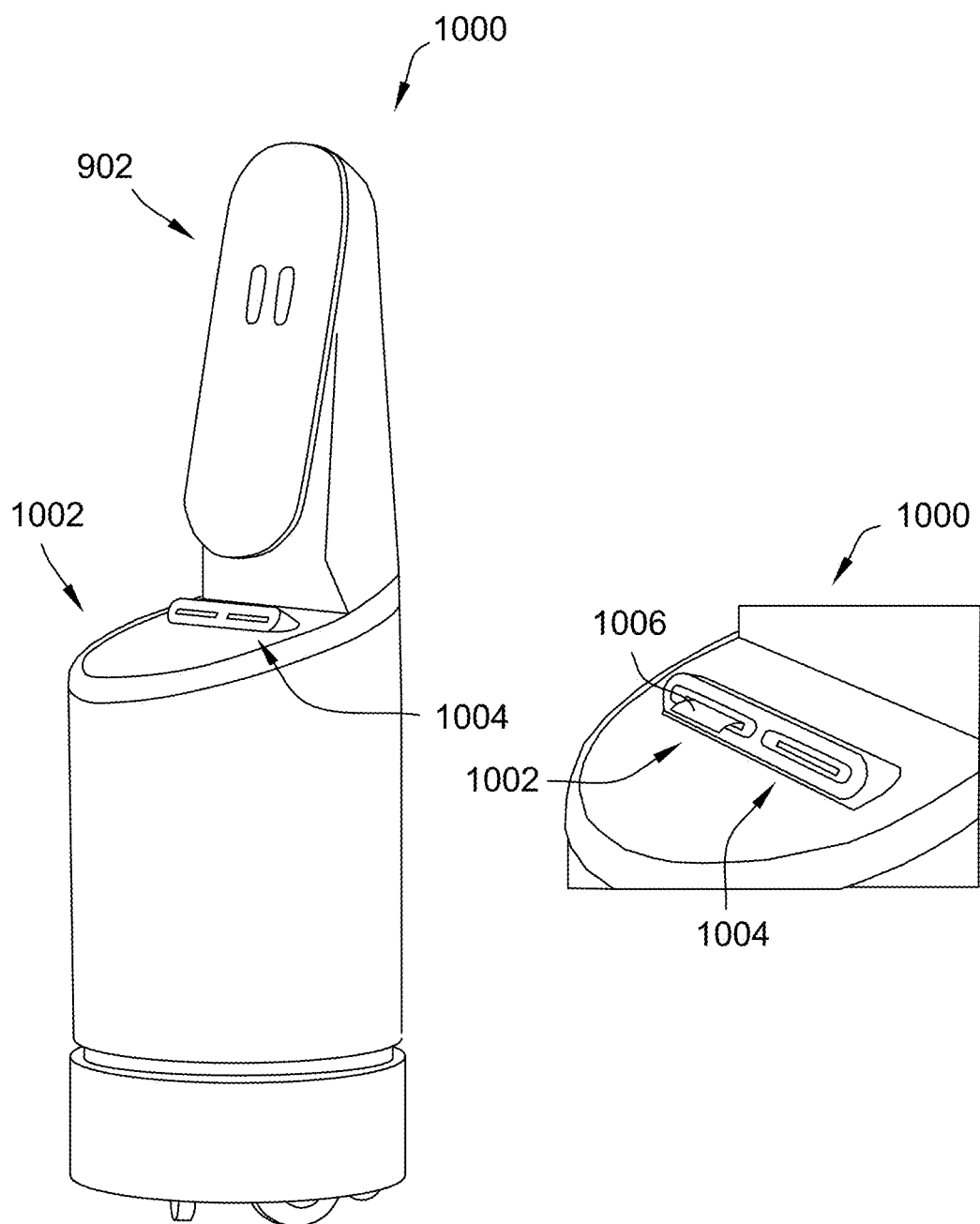
FIGS. 10A-10D illustrate an example customer service robot.
Figure 10D:
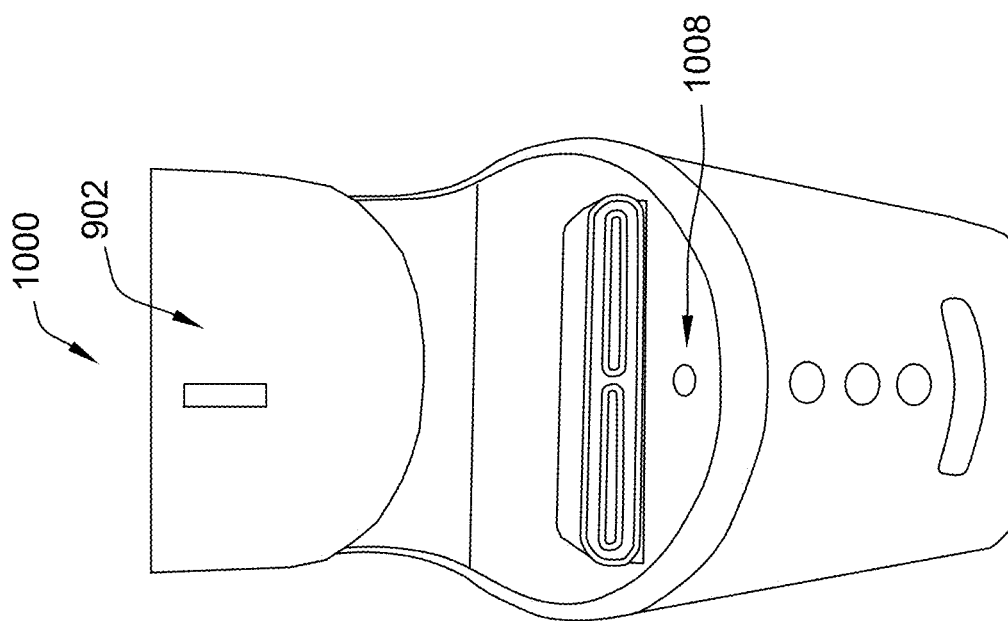
Figure 10C:
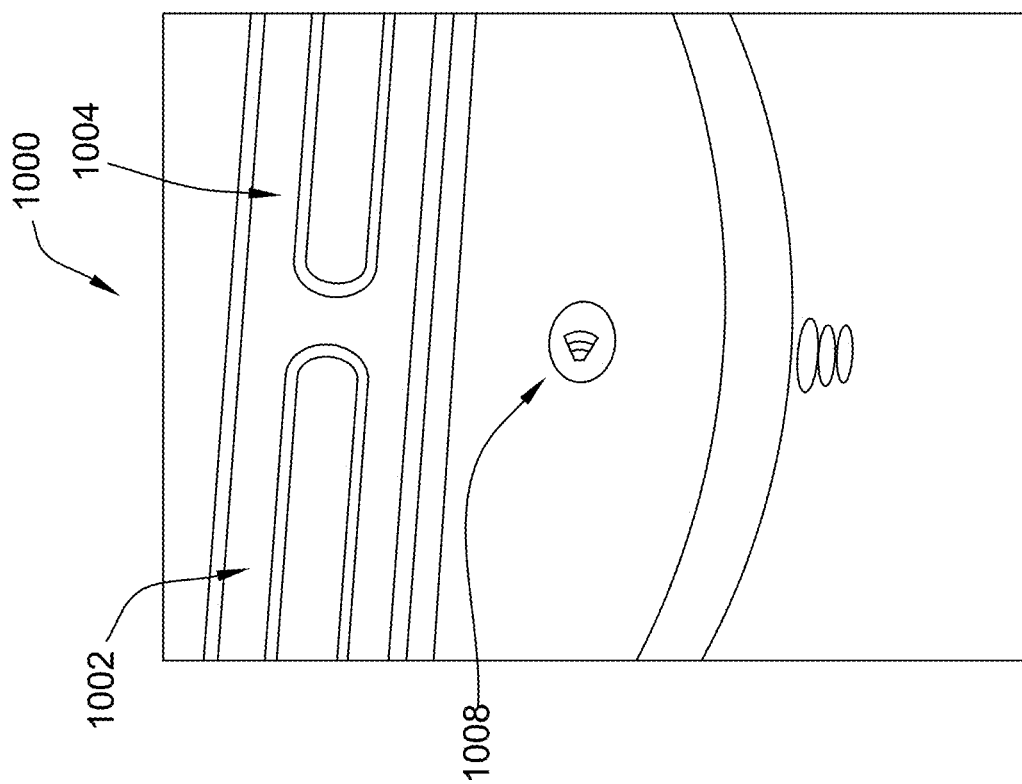

FIGS. 9A and 9B illustrate an example vendor robot 900 that is configured to dispense food or beverages. The vendor robot 900 may be similar to the robots 300 discussed above.

In the example embodiment, the vendor robot 900 includes a display device 902 (e.g., a graphical display, a touchscreen display, or the like) and an internal container system 906 that houses the various products offered by the robot 900. The internal container system 906 is enclosed and protected by a lid 904 that is configured to open and close to provide access to the products within the container system 906. The lid 904 is hinged to allow manual or automatic opening to provide access to an interior space and contents of the internal container system 906. In some embodiments, the robot 900 may restrict access to the interior space or some or all of the contents of the internal container system 906 until a user has completed a transaction for purchased goods.

FIGS. 10A-10D illustrate an example customer service robot 1000. The customer service robot 1000 may be similar to the robots 300 discussed above. In the example embodiment, the customer service robot 1000 includes a printer device 1002 and a card reader device 1004 beneath the display device 902. The printer device 1002 may be similar to the card/ticket printers 364A, 364B shown in FIG. 3A, and may be used by the service robot 1000 to, for example, print cashless tickets 1006 (e.g., TITO tickets), show tickets, receipts for goods or services purchased through the robot 1000, create new player loyalty cards, or the like. The reader device 1004 may be similar to the card/ticket readers 362A, 362B shown in FIG. 3A, and may be used by the service robot 1000 to, for example, collect and read TITO cashless tickets (e.g., TITO tickets), read loyalty cards, read payment cards and chipped payment cards, or the like. In some embodiments, the reader device 1004 may be a cash intake device (e.g., a bill acceptor/validator). In some embodiments, the robot 1000 may have any combination of a ticket printer, a card printer, a card reader, a ticket reader, a bill acceptor, or the like.

In some embodiments, the robot 1000 may include a wireless receiver 1008 (e.g., an RFID or NFC receiver) that allows contactless payment transactions with the robot 1000. Users may transact with the robot 1000 via contactless payment using, for example, a personal mobile device (e.g., smartphone, tablet computer, wearable), chipped payment card or loyalty card, or the like, by holding the payment device near the wireless receiver 1008 as indicated by the wireless symbol appearing on the robot 1000. In some embodiments, the robot 1000 may include lighting or may display graphics or instructions when the robot 1000 is ready to interact with a payment device (e.g., lighting white or displaying the wireless symbol when ready to read), and may change lighting or display graphics based on status of the payment interaction (e.g., changing lighting to red for payment failure, changing lighting to green on payment success, or the like). The robot 1000 may allow contactless payment using, for example, a digital wallet of the player (e.g., via RFID or NFC communication with their smartphone), or a chipped payment card or loyalty card (e.g., with RFID tag).

The robot 1000 may be configured to provide various kiosk type services using the receiver 1008, the printer device 1002, the card reader device 1004, and/or a bill validator. For example, the robot 1000 may allow a player to acquire a TITO ticket for game play by initiating and completing a cash or cashless transaction with the player (e.g., a contactless payment using their digital wallet) and printing a TITO ticket for the transaction value. As such, the player can then use the TITO ticket (e.g., redeemed at gaming devices 104 or table games) for game play.

In some embodiments, the robots 300 may be configured to present persona animations during use. Some users may be uncomfortable with the presence of robots or reticent to interact with robots. As such, the robots 300 may be configured to emulate aspects of human interactions and social conventions through various persona animations (e.g., via graphical displays and audio outputs). For example, the robots 300 may be configured to display facial features such as, for example, eyes, nose, mouth, lips, eye brows, and the like. The robots 300 may use and alter the display of these facial features during interactions with users, thereby making the interactions seem more like human to human interactions and easing discomfort of the user (e.g., smiling, mouth and lip movements while talking, or the like). In some embodiments, the robots 300 may display certain persona interactions based on a current activity or task currently being performed by the robot 300. For example, the robot 300 may display a sleeping face when the robot 300 is inactive, charging, or otherwise idle, thereby allowing nearby players to understand that the robot 300 is currently inactive. Upon activation of the robot 300 (e.g., by receiving a remote task, via physical interaction with the device, by keyword voice activation from a nearby player), the robot 300 may display the face waking up and looking alert, or otherwise changing away from the sleeping face. The robot 300 may display a moving face or animation while the robot 300 is moving to a destination (e.g., bobbing back and forth, sweating, or the like). The robot 300 may display facial expressions and lip movements while interacting with a player (e.g., emulating articulation of audible interactions). Such persona animations allow nearby players to understand what the robot 300 is currently doing, as well as eases human interaction with and comfort around the robots 300.

In some embodiments, a fleet of robots 300 may be configured with various personas based on their function. For example, a food/beverage service robot may be configured to present one persona (e.g., a waiter/waitress character and associated animations), a personal service robot may be configured to present another persona (e.g., a butler character and associated animations), and a maintenance robot may be configured to present still another persona (e.g., a service technician character and associated animations). Such differing personas within a fleet of robots 300 allows nearby players to learn and recognize what function sets any particular robot 300 can perform.

Example Kiosk Robot

As described elsewhere herein, in various implementations, one or more kiosk robots may provide mobile kiosk functionality (e.g., similar to robot 300 shown in FIGS. 3A-3C or the customer service robot 1000 shown in FIGS. 10A-10D). In these example embodiments, if not expressly identified here, the kiosk robot is presumed to include hardware components and software components sufficient to enable performance of the described tasks. In an example embodiment, the kiosk robot includes a touchscreen display device that allows digital video output as well as touchscreen input from a nearby user (e.g., a player or customer). Further, the kiosk robot also includes a propulsion system and associated sensors and software sufficient to, for example, allow the kiosk robot to navigate about an operations venue, determine pathing, avoid obstacles, and the like (e.g., as shown with reference to FIGS. 3A-3C, and elsewhere herein). Although embodiments are disclosed in relation to communications between robots 300 and RMS server 106, it should be understood that the RMS 400 may be communicating with the CMS server 114 or other server computers 102 to, for example, authenticate patrons, perform payment transactions, player tracking services, manage TITO ticket creation and redemption, determine aspects of EGM utilization, or any other operations as described herein.

Figure 11:
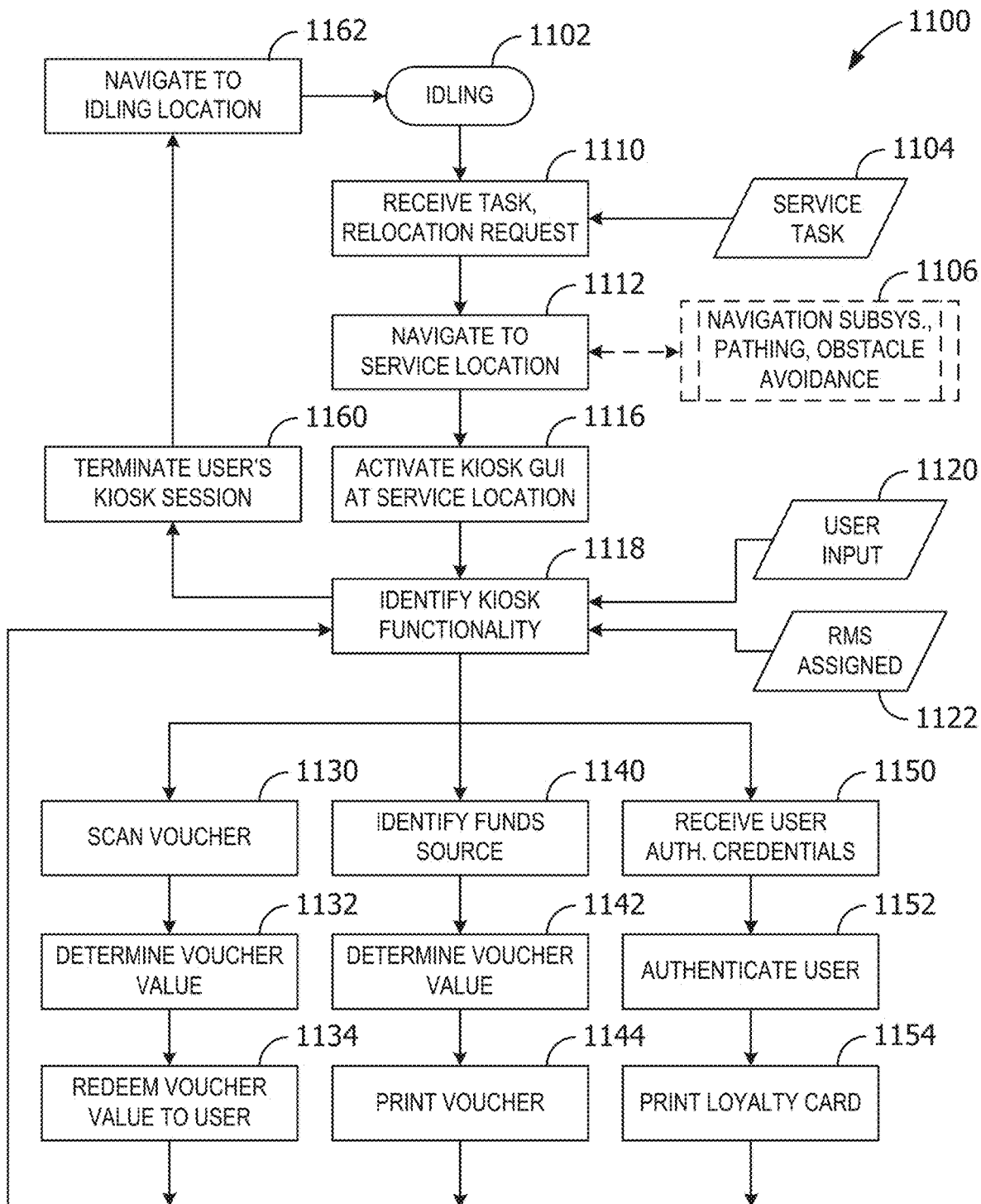
FIG. 11 illustrates an example method for providing several kiosk functionalities using a kiosk robot similar to robot shown in FIGS. 3A-3C.

The kiosk robot may be configured to perform any or all of the various kiosk functionalities described herein. FIG. 11 illustrates an example method 1100 for providing several kiosk functionalities using a kiosk robot similar to robot 300 shown in FIGS. 3A-3C. In the example embodiment, the kiosk robot begins at an idling status 1102 and is presumed to be in an operational state (e.g., within an active operational window, or otherwise configured in an active operational state in which the robot is available to provide kiosk service and support to users within the operations venue). Further, the kiosk robot is in wireless networked communications with at least a robot management system (e.g., RMS server 106) and perhaps a casino management system (e.g., CMS server 114), a player loyalty system (e.g., PTS server 110), a cashless ticketing system (e.g., TITO server 108), a progressive system (e.g., progressive system server 112), other robots 300, gaming devices (e.g., EGMs 104, 200), wireless beacons (e.g., wireless access points 410, transmitters 412), or other devices as described herein. While in the idling state 1102, the kiosk robot may be navigating through, or may be stationary within, the operations venue, but the kiosk robot is considered to be available for a new service task (e.g., not currently working a service task).

At step 1110, the kiosk robot receives a new service task. In the example embodiment, the new service task 1104 includes a relocation request, received from the RSM server 106, which identifies a service location within the operations venue. In some embodiments, the RSM server 106 may receive a request for kiosk services from a particular EGM 104 in the operations venue (e.g., identified by a unique device ID of the EGM 104). EGMs 104 may, for example, provide a virtual or mechanical button through which a player can summon kiosk services. Accordingly, the RMS server 106 may receive a request for kiosk services from the "requesting EGM" and may assign a service task to the kiosk robot. In some embodiments, the RMS server 106 may receive a request for kiosk services from a table management device of a gaming table (e.g., initiated by a dealer, perhaps on behalf of a player at the gaming table 294, identified by a unique table ID). In some embodiments, the RMS server 106 may receive a kiosk service request from a personal location device of a player or a mobile device of a player (e.g., mobile gaming device 256, via player app on their smartphone). In some embodiments, an operator of the RMS may manually submit a new service task for the kiosk robot (e.g., to stage the kiosk robot at a particular location within the operations venue and make active for open kiosk functionality). In some embodiments, the RMS server 106 or the kiosk robot itself may automatically initiate the service task (e.g., periodically, according to a particular schedule, at the start of an operational shift, according to a predefined schedule, or the like).

In the example embodiment, the RMS server 106 identifies a service location for the service task. The service location represents the location within the operations venue to which the kiosk robot is to move, and at which the kiosk robot is to provide kiosk functionality. When the service task is initiated from an EGM 104 or from a gaming table 294, the RMS server 106 may identify a predefined location for that requesting device (e.g., from a table of unique devices and locations of those devices within the operations venue). When the service task is initiated by a personal location device or a mobile device of the player, the RMS server 106 may determine a current location of the requesting device (e.g., position location via GPS or indoor positioning system of the requesting device). When the service task is initiated by an operator or automatically by the RMS server 106 or the kiosk robot itself, the service location may be manually provided or the service location may be preconfigured. Accordingly, in the example embodiment, the service task 1104 includes the service location (e.g., a coordinate location within the operations venue, a named location within the operations venue, or the like).

The kiosk robot treats the assignment of this service task 1104 as a relocation request, or a request to move the kiosk robot to the service location. At operation 1112, the kiosk robot navigates to the service location. In this and other example embodiments described herein, when robots 300 such as the kiosk robot navigate to a particular location, it should be understood that the robot 300 may be using various hardware components such as the drivetrain assembly 308, positioning sensors 390, proximity sensors 380, IMU 366, or any of the other hardware components described herein (e.g., referring to FIGS. 3A-3C) to perform movement, pathing determination, obstacle avoidance, maps, and other motion functions such as to facilitate movement from one location to another. Such hardware and software is represented here as navigation subsystem 1106. In some embodiments, the RMS server 106 plots a course between a current location of the kiosk robot and the service location, where in other embodiments, the kiosk robot plots the course (e.g., using maps of the venue, such as shown and described with respect to FIGS. 6A-6C, or the like).

At step 1116, once the kiosk robot has arrived at the service location, the kiosk robot activates a kiosk GUI. The kiosk GUI is provided as digital video output on a touchscreen display device 312, 350, 352 and allows the user to select kiosk functionality of interest. For example, the kiosk GUI may provide a list of available functions, such as player loyalty account functions (e.g., player loyalty registration, loyalty card printing, account status, viewing/editing personal information), wagering functions (e.g., sports betting, quick pick sales, tournament registration, drawings), hotel functions (e.g., hotel check-in/check-out, hotel card printing, hotel reservations, valet), financial transactions functions (e.g., TITO ticket creation/redemption, withdrawals/deposits, digital wallet transactions), reservation functions (e.g., restaurant reservations, show/event registrations, personal services reservations, ticketing), or informational services (e.g., show times, wayfinding, robot escort). The kiosk GUI may allow the user to navigate a menu system (e.g., via user input 1120) that allows the user to identify the kiosk functionality of interest and may accept inputs that allows the user to refine the kiosk functionality described herein. At operation 1118, the kiosk robot identifies a particular kiosk function to provide. In some situations, the user identifies the kiosk function through user input 1120. In some situations, the particular kiosk function may be assigned 1122 to this service task by the RMS 106.

In this example embodiment, FIG. 11 illustrates several process flows for a few example kiosk functions. For example, in one embodiment, the kiosk robot provides voucher redemption for TITO tickets. At step 1130, the user inserts a TITO ticket into a ticket reader 362B. The kiosk robot reads ticket information from the TITO ticket and transmits ticket information to a back end server (e.g., to TITO system server 108, either directly or indirectly through the RMS server 106). The kiosk robot receives an authentication message for the TITO ticket and a determined voucher value for that ticket at step 1132. Accordingly, the kiosk robot redeems the voucher value to the user at operation 1134 (e.g., via cash dispensation using a cash dispenser, not shown, via chip dispensation using a chip dispenser, not shown, via an account deposit to a player account, digital wallet account, financial account, or the like).

In one embodiment, the kiosk robot provides voucher printing of TITO tickets. At step 1140, the kiosk robot identifies a source of funds for the voucher request. For example, the user may identify an account (e.g., player house account, digital wallet account, financial institution account) or may provide cash (e.g., via a bill acceptor on the kiosk robot) or chips (e.g., via chip acceptor on the kiosk robot). At step 1142, the kiosk robot determines a voucher value for the new voucher (e.g., through input from the user, through calculating a total of cash provided by the user). At step 1144, the kiosk robot prints a new voucher using a ticket printer 364B. The kiosk robot may communicate directly or indirectly with the TITO system server 108 to generate voucher details for the new voucher and may provide the funds source and voucher value. The kiosk robot may receive ticket details from the TITO system server 108 to be used to print the new voucher.

In one embodiment, the kiosk robot provides loyalty card printing services. In the example embodiment, the user already registered and has an existing loyalty account. At step 1150, the kiosk robot receives authentication credentials for the user. For example, the kiosk robot may authenticate the user via a player name and password, or via scanning a personal identity card (e.g., driver's license). In some embodiments, the kiosk robot may authenticate the user via biometric data, such as using facial recognition (e.g., through camera devices 360), using biometric scanners 358, or the like. At step 1152, the kiosk robot properly authenticates the user 1152, thereby identifying and associating the user with an existing player account. For such authentication, the kiosk robot may communicate with the player tracking system server 110 or casino management system server 114, sending authentication credentials and receiving authentication verification and loyalty account information for the user. At step 1154, the kiosk robot prints a new loyalty card for the user using a card printer 364A.

Upon completion of a particular kiosk function, the kiosk GUI returns to identifying additional kiosk functionality at step 1118. At step 1160, the kiosk robot terminates the user's kiosk session, and thus completes the service task. Termination of the kiosk session may be expressly initiated by the user (e.g., via the kiosk GUI), may be automatically terminated by the kiosk robot (e.g., via an inactivity timeout, via video or sensor detection of the user moving away from the kiosk robot), or may be remotely terminated (e.g., via a command from the RMS server 106). Upon conclusion of the kiosk session, the kiosk robot may transmit a service task concluded message to the RMS server 106, which may mark the service task as complete. Further, at step 1162, the kiosk robot may be configured to navigate to an idling location within the operations venue before returning to the idling state 1102. For example, the kiosk robot may be configured to position itself at a predetermined idling location within an area of the operations venue (e.g., in an easily accessible location, in a centralized location to minimize response time for future requests, at a docking station for recharging).

In some embodiments, while in the idling state 1102, the kiosk robot may be configured to provide the kiosk GUI and kiosk functionality (e.g., to any passers by). In some situations, the kiosk robot may receive another service task 1104 while fielding this example service task, or while navigating to the idling location. Accordingly, once the current service task 1104 is complete at step 1160, the kiosk robot may immediately initiate processing of the new service task 1104 (e.g., navigating to a new service location at step 1120, and so forth).

While not depicted in FIG. 11, the method 1100 can include numerous other kiosk functions. For example, the method 1100 can include loyalty registration. With loyalty registration, the kiosk robot may be configured to receive identity information of the user in order to create a new player loyalty account. The kiosk GUI may allow the user to scan an identity card (e.g., a driver's license) or provide data input fields to acquire personal information for the user (e.g., name, address, email address, mobile phone number). The kiosk robot may capture a photo or other biometric data of the user and may allow the user to provide authentication information for the loyalty account (e.g., password, PIN, or the like). The kiosk robot may transmit such data, directly or indirectly, to the player tracking system server 110 or casino management system server 114 for account creation. The kiosk robot may receive account information for the new account and may print a new loyalty card for the user using the card printer 364A.

In another example, the method 1100 can include a robot escort service. With robot escorting, the kiosk robot may be configured to escort the user to a particular destination. For example, the user may request an escort to the nearest restroom, to a particular type of EGM 104 or gaming table, to a sports book or poker room, to their car or valet attendant (e.g., as a security feature after a large win), or the like. The kiosk robot may, accordingly, identify an escort destination location for this request and plot a course between the current location of the kiosk robot and the escort destination location (e.g., based upon map analysis, avoiding static obstacles). The kiosk robot may then navigate to the escort destination location, allowing the user to follow the robot to their desired destination. Upon arrival at the destination location, the kiosk robot may terminate the kiosk session. In some embodiments, the kiosk robot may be configured to request, from the user, whether to await the user for a return trip (e.g., through audible interaction, kiosk GUI, or the like). For example, the user may wish to return to their original location after using the bathroom. Accordingly, the kiosk robot may be configured to wait a predetermined amount of time and detect the return of the user to the robot (e.g., via video analysis). Once the user has returned to the kiosk robot, the kiosk robot then navigates back to the original location, plotting and traversing a course. In some embodiments, the robot escort service may include security features such as video and audio capture using onboard camera devices 360 and microphones 356, or real-time video and audio monitoring of live feeds (e.g., viewed by a back end operator or security focal during the escort). In some embodiments, the kiosk robot may be configured to follow the user without awareness of the escort destination (e.g., to their car in a parking lot). The kiosk robot may track the user using video capture and object tracking. The kiosk robot may accept verbal commands from the user during escort, such as "wait here" to cause the kiosk robot to wait in place, "follow me" to continue the escort, or "we are here" to terminate the escort.

In some embodiments, the kiosk robot may provide wayfinding directions to the user, including directions from their current location to the identified destination location. For example, after determining the destination location from the user, the kiosk robot may provide audio instructions for how to get to the destination location, an overhead map illustrating a travel path to the destination location, or virtual video illustrating travel from current location to the destination location. The kiosk robot may generate a virtual map of the area and a travel path to the destination location and may allow the user to access the virtual map via a mobile device of the user. For example, the kiosk robot may generate and display a custom QR code which the user can scan and be redirected to the virtual map. In some embodiments, the kiosk robot may transmit the virtual map to the mobile device (e.g., via NFC, wireless network, or the like) allowing the user to view the virtual map via the player app.

In another example, the method 1100 can include a sports wagering feature. With sports wagering, the kiosk robot may be configured to facilitate the submission of wagers on sporting events through the kiosk GUI. For example, the kiosk GUI may provide a list of sports wagering offerings (e.g., upcoming sporting games, sporting events, or the like) and associated bets. The user may provide a selection for a particular sports wager, as well as associated wagering details such as wager amount, funds source, and the like. Accordingly, the kiosk robot may transmit a sports wager request to a sports wagering management system (not shown) and may receive, in return, ticket details for the sports wager, and may print a sports wager ticket for the user using ticket printer 364B.

In some embodiments, the RMS server 106 determines which kiosk robot, from a fleet of multiple kiosk robots, to assign to the service task 1104. The RMS server 106 may select a particular kiosk robot based on current location of each of the kiosk robots relative to the service location of the service task 1104 (e.g., selecting the closest idle kiosk robot, queueing the service task 1104 for the closest kiosk robot) and may assign a particular kiosk robot based on a pending task list for each particular kiosk robot.

Example Robot Security Features

In some embodiments, robots 300 such as the kiosk robot may be configured with various security features to, for example, detect unauthorized tampering with the robot 300, detect invalid or unauthorized location of the robot 300, detect unauthorized access into the robot 300, or the like. Since some robots 300 may contain currency, chips, goods, or other valuables, and since the robots 300 represent valuable devices in any case, such security features as described herein may provide asset protection for the robot fleet. In some embodiments, the individual robots 300 may provide security features and alerting autonomously (e.g., using their own sensors and other hardware components). In some embodiments, the RMS server 106 may provide security features and alerting for the robot fleet. It should be understood that the various security features may be described herein as being performed autonomously by a particular robot 300, but that the RMS server 106 may similarly perform some such security features using similar data from the robot 300.

In one embodiment, the robot 300 includes a tilt sensor that is configured to detect an angle of tilt of the robot 300. The robot 300 may be configured with a baseline tilt angle (e.g., when out of service and in a static, upright configuration). During operation (e.g., when the robot 300 is in service), the robot 300 may be configured to sense a current tilt angle of the robot 300 (e.g., continuously, periodically) and may be configured to trigger an alarm function when the current tilt angle of the robot 300 exceeds a predetermined threshold from the baseline tilt angle. In one embodiment, the robot 300 includes one or more weight or strain sensors that are configured to capture weight or strain values of the robot 300 (e.g., for the weight supported by each wheel, or the like). The robot 300 may be configured with baseline weight values for each weight sensor. During operation, the robot 300 may be configured to sense current weight values for the kiosk robot and may be configured to trigger an alarm function when the weight values exceed a predetermined threshold from the baseline weight values (e.g., lower values registering on some or all weight sensors if the robot 300 is picked up or tipped over, higher values on some weight sensors if the robot 300 is tilted or leaned upon). In one embodiment, the robot 300 may be configured to determine a current location of the robot 300 within the operations venue and trigger an alarm function if the current location deviates from an expected position of the robot (e.g., relative to controls provided to direct movement of the robot 300), thereby detecting when there is a discrepancy in the movement of the robot 300. In one example, the robot 300 may be configured to compare the current location of the robot 300 to a predefined area of operation for the robot 300 and trigger an alarm function if the current location is outside the predefined area of operation.

The alarm function may include, for example, activating an onboard audible alarm, video graphics, or lighting functions. The alarm function may include transmitting a tilt alarm message to the RMS server 106. The alarm function may include capturing audio, video, or other sensor data (e.g., current location data) from the onboard hardware components of the robot 300, all of which may be transmitted to the RMS server 106.

Example Fleet Administration

In the example embodiment, the RMS 400 shown in FIG. 4 may provide an RMS GUI that may be used to administer a fleet of robots 300. The RMS GUI may be provided, for example, by the RMS server 106, the RMS terminal 422, mobile devices such as the mobile RMS terminal 700 (shown in FIGS. 7-8D), tablet computing devices, smartphones, or the like. The RMS GUI allows operators 420 to perform various administrative tasks to facilitate the fleet functionality herein. In some embodiments, the operators 420 may be assigned to one or more particular robots 300 of the fleet (e.g., in a one-to-one or one-to-many fashion) and may support the RMS or other operations from back offices of the venue 402 or from remote locations (e.g., as remote support staff, disabled support staff, or the like). Although embodiments are disclosed in relation to communications between robots 300 and RMS server 106, it should be understood that the RMS 400 may be communicating with the CMS server 114 or other server computers 102 to, for example, authenticate patrons, perform payment transactions, player tracking services, manage TITO ticket creation and redemption, determine aspects of EGM utilization, or any other operations as described herein.

In the example embodiment, the RMS GUI provides an "interactive graphical display of the fleet of robots 300 overlaid onto a map 602 of the operations venue 600 (shown in FIGS. 6A-6C) and may include one or more overlays (e.g., overlays 630, 640) on the map 602. This view of the fleet may be referred to herein as a "map view" of the GUI. In some embodiments, the map view may appear similar to the map 602 and 630, 640 shown in FIGS. 6A-6C. The map view may include icons for each robot 300 superimposed over the map at their present locations (e.g., current location data, as tracked by the RMS system 400 and the robots 300 themselves). The map view may also include icons for various gaming devices 104, gaming tables 294, kiosks 260, wireless beacons 258, or other static or mobile gaming device or computing devices within the operations venue 600. The map view may allow the operator 420 to select which overlays or types of devices appear on the map view. The map view may be periodically updated as mobile device and/or robot location data changes (e.g., at a pre-determined frequency, upon receipt of new location information). The map view may allow the operator 420 to select, view, or edit various static maps 602 and overlays of the venue 600, trigger robots 300 in the fleet to perform remapping operations (e.g., to rebuild static maps after a floor layout change).

The map view may allow the operator 420 to select and interact with various features of the map view. Some example interactive features that may be included on the map view provide informational views for a selected asset. For example, the operator 420 may select an EGM 104 to view information about that EGM 104, such as device information (e.g., EGM ID), current status (e.g., idle, occupied, in/out of service, maintenance window), identity and information of an occupying player (e.g., carded loyalty patron, loyalty tier level), or device statistics (e.g., meter values, daily coin in/out, software version). For gaming tables 294 assets, the map view may device information (e.g., table ID), current status (e.g., inactive/no dealer present, active/dealer present, seats occupied, identified player information), or table statistics (e.g., table performance, hands dealt, table limits).

Some example interactive features that may be included on the map view provide informational views for a selected robot 300. For example, the operator 420 may select a robot 300 to view information about that robot 300, such as device information (e.g., robot name, unique robot ID, components IDs), current configuration information (e.g., service role or persona of the robot 300, assigned zone of operation), current status information (e.g., battery charge, stationary/moving, movement speed), assigned tasks (e.g., current task queue, task history), movement information (e.g., historical movement or location data, current movement path, current destination), current inventory information (e.g., food/beverage inventory, ticket paper remaining, enclosed cash totals).

Some example interactive features that may be included on the map view provide control functionality for a selected robot 300. For example, the operator 420 may select a robot 300 to perform control functions for that robot 300, such as operational status changes (e.g., taking robot into/out of service, forced recharging, forced return to robot locker), movement control (e.g., taking manual control of robot movement, assigning travel waypoint), task control (e.g., cancelling tasks from the queue, adding tasks to the queue, editing current tasks in the queue), configuration changes (e.g., editing configuration settings, editing schedule assignment, changing zone of operation), interactive control (e.g., viewing live audio/video data provided by the robot 300, enabling/disabling audio/video recording, performing video conferencing).

The RMS GUI may provide a list view that includes individual rows for assets such as the robots 300, gaming devices, or other electronic devices tracked and managed by the RMS 400. Each row in the list view may display high level information for the asset (e.g., asset name, asset location, asset status) and may allow the operator 420 to select a particular asset to, for example, see more detailed information about the asset, edit configuration information for the asset, or perform control functionality for the asset. In some embodiments, selection of a particular asset from the list view may cause the RMS GUI to display the map view and focus the map view on the selected asset. The list view may provide any or all of the above features as described in relation to the map view.

The RMS GUI may provide a patron view (e.g., as list or map) that allows the operator 420 to view information about patrons present at the venue. In some embodiments, the patron map view may present a patron overlay (not shown) over a static map, where the patron overlay identifies the location of patrons (e.g., identified or unidentified) within the venue. The RMS 400 may collect current patron location information from various sources such as, for example, robotic sources, gaming device sources, patron device sources, or security sources. Robotic sources of patron location data may include voice or video recognition of patrons (e.g., performing facial or voice recognition of patrons using onboard cameras or microphones as the robots 300 move throughout venue 600, as the robots 300 interact with patrons), authenticated interactions with patrons (e.g., when a patron authenticates their identity with a robot 300 via presentation of a loyalty card, payment card, room card, TITO ticket, login ID, or the like), or wireless interactions with patron devices (e.g., NFC communications and identification of a known patron). Gaming device sources may include carded gaming sessions at gaming devices 104, gaming tables 294, kiosk 260, cage, or the like (e.g., via presentation of loyalty card at a known device location). Patron device sources may include location information obtained from mobile devices 256 of patrons (e.g., smartphones, personal locators), such as via GPS or indoor device location tracking. Security sources of patron location data may include voice or video recognition of patrons using audio or video data (e.g., with facial recognition) captured from venue security cameras.

In some embodiments, the RMS 400 may log various historical data and the RMS GUI may provide historical views. For example, in one embodiment, the RMS 400 logs robot utilization data for the fleet of robots 300, such as logs of task data (e.g., task assignment, task performance, and task successes/failures), robot fleet deployments (e.g., when various robots 300 were active, their service roles during deployments, coverage areas during deployments), robot status history (e.g., recharging periods, outage periods, maintenance periods, error logs), or movement history. The RMS GUI may provide historical views that allow the operator 420 to view such raw historical data (e.g., per robot, for the fleet, at or near a particular location or zone). In some embodiments, the RMS 400 may aggregate such data to identify trends. For example, the RMS GUI may provide a historical heat map showing patron location information, thereby allowing the operator 420 to identify hot spots for patron congregation and help the operator 420 to figure out how they may reconfigure the venue 600. In some embodiments, the RMS GUI may provide a historical occupancy map of gaming devices or table games showing how frequently or infrequently various wagering positions are occupied.

In the example embodiment, one of the control functions provided by the RMS GUI is an operator assist experience. The operator assistance experience allows the robot 300 to present live audio/video conferencing between the operator 420 and a patron. In other words, the operator assistance experience captures and displays audio/visual data of the patron (as captured by the robot 300) to the operator 420 (e.g., on the RMS terminal 422), and conversely captures and displays audio/visual data of the operator 420 (as captured by the RMS terminal 422) to the patron (e.g., on the robot 300). The RMS GUI may provide an operator assist view that includes the audio/video of the robot 300 and may include additional functionality that helps the operator 420 provide assistance to the patron. As such, the operator assistance experience provides virtual, face-to-face interaction between patron and operator 420.

The operator assist experience may be triggered in various ways. In some embodiments, the operator assistance experience may be triggered by a patron. For example, the patron may press a "help" button on an EGM 104, causing the RMS 400 to task and dispatch a robot 300 to the location of the EGM 104. In another example, the patron may trigger the operator assistance experience while interacting with a robot 300 (e.g., via pressing a "talk with live operator" button on the robot 300, via verbal request to "talk to operator").

In some embodiments, the operator assist experience may be automatically triggered by the RMS 400. For example, when a large win at an EGM 104 is accompanied by a "hand-pay," the RMS 400 may automatically task and dispatch a robot 300 to perform a hand-pay protocol, which may involve the operator assistance experience to complete. In another example, the RMS 400 may automatically trigger a cordiality visit of a robot 300 to a highly regarded patron upon detection of that patron at the venue 600, and that cordiality visit may include an operator assistance experience. In some embodiments, the operator assistance experience may be automatically initiated when a patron interaction session with a robot 300 has exceeded a predetermined amount of time. For example, some patrons may have difficulties interacting with the robot 300, and thus may become frustrated and take up an extensive amount of interaction time. As such, automatic initiation of the operator assist experience may allow the operator 420 a chance to guide the patron through their interaction with the robot 300 or otherwise be able to assist in the patron's underlying issues or requests. In some embodiments, the operator assist experience may be automatically triggered when the RMS 400 detects uncarded play at an EGM 104 (e.g., triggering a robot 300 to visit, and prompting an unassisted registration experience or the operator assist experience, such as to reminder to card into the EGM 104, reprint a loyalty card, or incentivizing the player to enroll as a loyalty member).

In some embodiments, the operator assist experience may be triggered by the operator 420. For example, while working in the RMS GUI, the operator 420 may notice a highly regarded patron at the venue (e.g., via the patron view). Upon determining that the patron has not yet been welcomed to the venue (e.g., via viewing a recent history of patron/robot interactions), the operator 420 may initiate a cordiality visit task and have a robot 300 deployed to perform such task. In some embodiments, the patron may be requested at a particular location and the operator 420 may dispatch a robot 300 to that patron to perform an escort operation to take that patron to the desired location. In such a scenario, the operator 420 may initiate the operator assistance experience when the robot 300 first reaches the patron, thereby providing the operator 420 a chance to explain the request and escort.

In situations where an operator assist experience necessitates deployment of a robot to a request location, the tasked robot 300 may travel to a location of a requesting patron (e.g., to a location of the request, to a requesting EGM 104). From the operator perspective, the robot 300 or the RMS 400 may cue the operator 420 in the RMS GUI prior to (e.g., within a predetermined distance of, within a predetermined time of arrival of) the robot 300 arriving at the patron location. The operator cue may include providing an interaction button that allows the operator 420 to start the video conference (when they are ready), and may provide an arrival time estimation showing how long before the robot 300 is expected to reach the request location. From the robot perspective, the robot 300 may cue the patron when the robot 300 arrives at the request location (e.g., with an on-screen button) or may automatically initiate the video conference when the robot 300 arrives at the request location.

During the operator assist experience, audio/video data is being captured and transmitted bi-directionally between the robot 300 and the terminal 422 of the operator 420. During the interaction, the RMS GUI may allow the operator 420 to control aspects of interaction with the robot 300 (e.g., via remote screen control), thereby allowing the operator 420 to remotely interact with the robot 300 in assistance of the patron. The RMS GUI may allow the operator 420 to display data on the robot 300, such as a map, a list of shows and show times, or other information that may be requested by the patron. At any time during the experience, either the operator 420 or the patron may terminate the experience.

In some embodiments, as mentioned above, the robots 300 may provide escort services for patrons. For example, a robot 300 may be tasked with escorting a patron to a particular venue location (e.g., restaurant, bathroom, particular gaming device, to another patron). As such, the escort task may include providing the operator assist experience before, during, or after the escort, thereby allowing the operator 420 to converse with the patron (e.g., for direction, for conversation, for a more personal escort experience). In some embodiments, the operator assist view of the RMS GUI may include a function that allows the operator 420 to permission the robot 300 to move outside of normal movement boundaries. For example, the escort task may involve escorting a patron to their vehicle in a parking lot. As such, the operator 420 may permission the robot 300 to move into the parking lot or otherwise disable the movement restrictions for the robot 300 during the escort task. In some embodiments, the RMS GUI may allow the operator 420 to enable/disable recording of the operator assist experience (e.g., for quality control, for security purposes).

In some embodiments, the robots 300 may provide assistance or support for hand pays. In such scenarios, the robot 300 may facilitate a hand pay process that allows the robot 300 to collect data from the patron (e.g., name, address, social security number, or other tax-related information), create and print/email/submit tax paperwork (e.g., W2-G form) for the hand pay, and print payout ticket or receipt. In some situations, the operator assist experience may be provided during the hand pay. For example, if the winning patron is experiencing difficulties completing the automatic hand pay process, the robot 300 may automatically initiate the operator assist experience, thereby allowing the operator 420 to help the patron through the rest of the hand pay process. In some embodiments, the operator 420 may actively monitor the automatic hand pay process being performed by the robot 300 (e.g., via a hand pay view provided by the RMS GUI) and may manually intervene and initiate the operator assist experience to help the patron.

Example Item Delivery Robot

As described elsewhere herein, in various implementations, one or more robots, such as item delivery robot 900, may provide and deliver items (e.g., food and beverage) to one or more recipients within an operations venue, such as gaming environment 250 (shown with reference to FIG. 2B). More particularly, in at least one example embodiment, robot 900 may include a storage area, such as internal container system 906, which may be secured by lid 904 and arranged to contain one or more items, such as one or more food and/or beverage items, for delivery to one or more recipients (shown with reference to FIGS. 9A and 9B).

In addition to internal container system 906, robot 900 may include, as described herein, a propulsion system, such as drivetrain assembly 308, a wireless interface, such as one or more network interface devices 326, one or more memory devices 322-324, and one or more processors 320 (as shown with reference to FIG. 3B). Robot 900 may, in addition, include a variety of other components, as shown in FIGS. 3A and 3B, such as one or more biometric scanners 358, camera devices 360, and the like.

Figure 12:
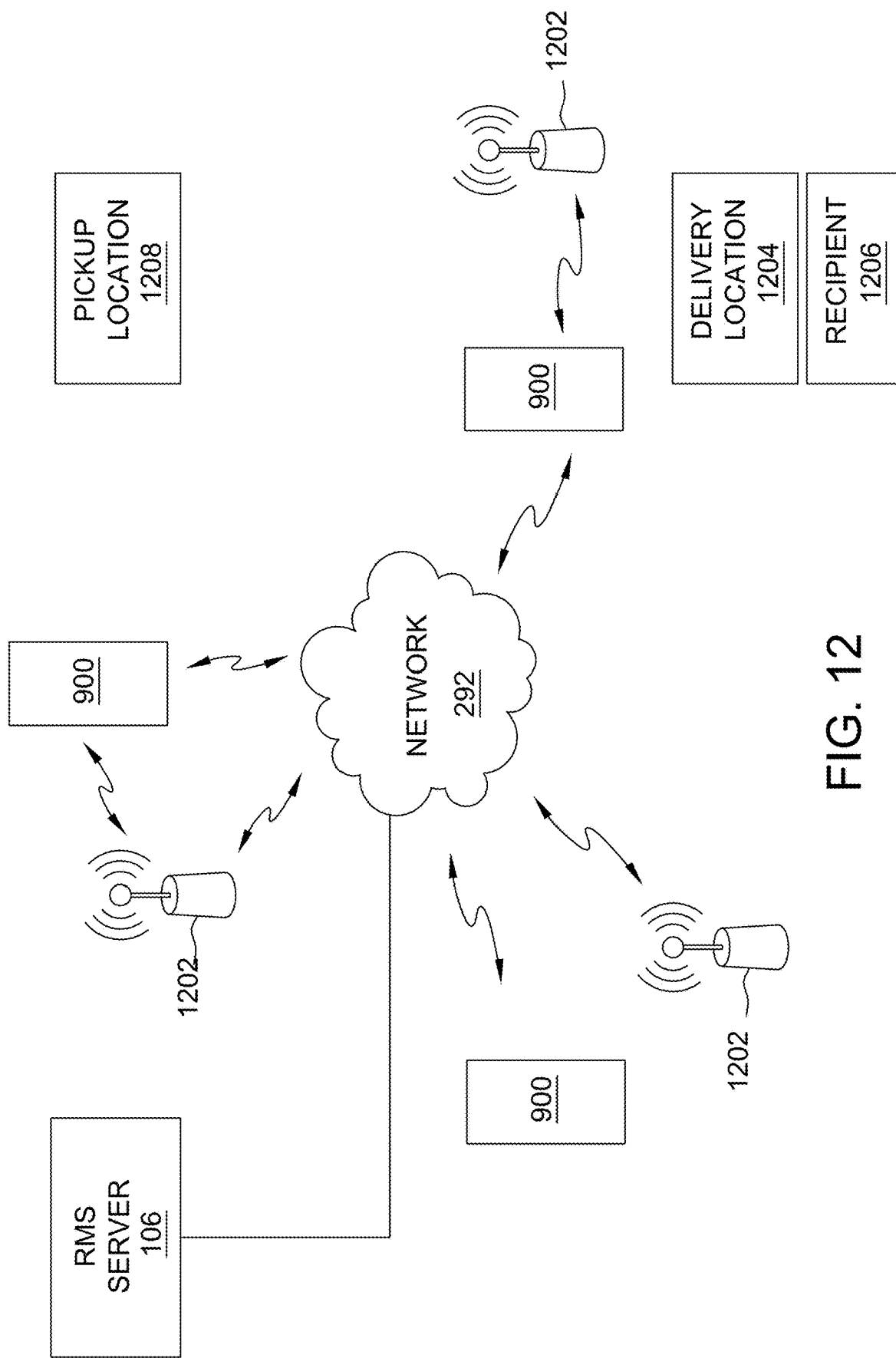
FIG. 12 is a block diagram illustrating an example embodiment of one or more robots navigating an operations venue, such as a gaming environment, to deliver one or more items.

FIG. 12 is a block diagram illustrating an example embodiment of one or more robots 900 navigating an operations venue, such as gaming environment 250, to deliver one or more items. As described herein, each robot 900 may be in network communication, such as via network interface device 326, with RMS server 106. Likewise, each robot 900 may be in wireless communication, such as via network interface device 326, with one or more wireless transmitters, such as one or more wireless beacons 1202, 258, 410, 412 of an indoor positioning system that spans or covers at least a portion of gaming environment 250. Wireless beacons 1202 may include, in one or more embodiments, any suitable wireless beacon, such as Google Eddystone beacons, Apple iBeacons, and the like.

During operation, RMS server 106 may receive, generate, and/or distribute one or more delivery requests (e.g., a request for items, services, and the like), such as via network 292, to one or more robots 900. A delivery request may include any of a variety of suitable information that enables robots 900 to fulfill a requested item delivery. For example, in at least some implementations, a delivery request may identify an item to be delivered, such as food and/or beverage contained within internal container system 906 of one or more robots 900, a delivery location 1204 (e.g., relative to one or more wireless transmitters or beacons 1202), and/or a recipient 1206 to whom the item should be delivered. For example, delivery location 1204 may include a position or location of an EGM 104A being played by recipient 1206, a location of a mobile communication device (e.g., smartphone) of recipient 1206, a location of a personal location device (e.g., an RFID tag) of recipient 1206, and the like.

In some embodiments, players or other users may initiate delivery requests in different ways, which may be received by RMS server 106. For example, RMS server 106 may receive a delivery request from a particular EGM 104 in the operations venue (e.g., identified by a unique device ID of the EGM 104). EGMs 104 may, for example, provide a virtual user interface (e.g., GUI) or mechanical button through which a player can summon robot 900 for item delivery. Accordingly, RMS server 106 may receive a request for item delivery from the "requesting EGM" and may assign a delivery request task (e.g., a task) to robot 900. In some embodiments, RMS server 106 may receive a request for item delivery from a table management device of a gaming table (e.g., initiated by a dealer, perhaps on behalf of a player at the gaming table 294, identified by a unique table ID). In some embodiments, the RMS server 106 may receive a delivery request from a personal location device of a player or a mobile device of a player (e.g., mobile gaming device 256, via player app on their smartphone). In some embodiments, an operator of the RMS server 106 may manually submit, from an RMS terminal, a delivery request for robot 900. In some embodiments, RMS server 106 or robot 900 may automatically initiate a delivery request (e.g., periodically, according to a particular schedule, at the start of an operational shift, according to a predefined schedule (e.g., as related to a loyalty tier of a player), based upon one or more timers, and the like).

In some embodiments, RMS server 106 may select a robot 900 from a list of robots 900 that contains, within a respective internal container system 906, the item requested by recipient 1206. Likewise, RMS server 106 may select a robot 900 that is also physically closest to pickup location 1208 and/or delivery location 1204.

As a result, in at least some embodiments, RMS server 106 may store a list or manifest of robots 900 currently operational within gaming environment 205 (e.g., robots 900 not currently stowed, such as for recharging or repair). The manifest may also include a variety of other detail, such as which items each currently operational robot 900 contains within a respective internal container system 906, a current position of each robot 900, and the like.

Further, although RMS server 106 may select or determine a robot 900 to fulfill a delivery request, in other embodiments, RMS server 106 may broadcast a delivery request to one or more robots 900, and a robot 900 closest to delivery location 1204, pickup location 1208, and/or a robot 900 that includes the requested item may respond to the delivery request as well as provide a message to RMS server 106 to indicate that the robot 900 has taken responsibility for the delivery request.

In response to receiving a delivery request, and if robot 900 already contains a requested item within internal container system 906, robot 900 may control its propulsion system to navigate to delivery location 1204. As described herein, robot 900 may store and/or otherwise access one or more maps, such as a static map and/or a thermal map, of gaming environment 250, which facilitates navigation by robot 900 within gaming environment 250. Specifically, in at least one embodiment, robot 900 may analyze the one or more maps to plot a course between a location of robot 900 (e.g., relative to one or more wireless beacons 1202) and delivery location 1204.

On the other hand, if robot 900 does not contain the item within internal container system 906 (e.g., if the item is a specialized item, such as a specialized beverage or an order from a kitchen), robot 900 may initially navigate to pickup location 1208, where robot 900 may receive the item, such as from a bartender, wait staff, another robot 900, and the like. One or more sensors, such as one or more pressure sensors, and the like, may be included to detect receipt of the one or more items. In addition, internal container system may be temperature controlled (e.g., refrigerated and/or heated) to preserve a desired temperature of the item, such as cold for a beverage, warm for a food item, and the like. Moreover, in at least some implementations, a robot 900 may be operable to receive and fulfill a plurality of delivery requests. For example, robot 900 may navigate to pickup location 1208 to obtain several items, following which robot 900 may plot a course between several delivery locations associated with each item, such as a shortest or otherwise optimal course between the several delivery locations.

When robot 900 arrives at delivery location 1204, robot 900 may receive one or more authentication credentials from recipient 1206, positioned or located near delivery location 1204. Authentication credentials may include any suitable identifying information of recipient 1206, such as one or more biometrics of recipient 1206, one or more images or photographs of recipient 1206, and the like. As described herein, robot 900 may acquire the authentication credentials from recipient 1206 using biometric scanners 358, camera devices 360, and the like. In addition, as previously described herein, methods of authentication can include player name and password or PIN, physical key and/or combination locks, scanning a personal identity card (e.g., driver's license), authentication based on biometric data, such as using facial recognition (e.g., through camera devices 360), using biometric scanners 358, or the like.

In response to authenticating recipient 1206, robot 900 may provide the item requested by recipient 1206 and contained within internal container system 906. For example, robot 900 may unlock lid 904 of internal container system 906 to provide access to the item contained therein. In some embodiments, internal container system 906 may include a plurality of receptacles, compartments, or independently accessible storage areas, each of which may include a respective lid 904. Likewise, in some embodiments, internal container system may include a rotating cassette, such as a "lazy Susan," which may be controlled to provide one of a plurality of items to recipient 1206. In addition, in at least some embodiments, when an item is removed from internal container system 906, robot 900 may flag or otherwise identify the location of the item following removal, such that a new item (of the same or a different type) can be refilled in the available location.

In these implementations, robot 900 may be capable of securely storing a plurality of items (e.g., beverages, food items, and the like) in individual compartments or containers for safety, cleanliness, and security. As robot 900 navigates a delivery route, robot 900 may provide access to each independently openable compartment or storage area when a respective recipient is authenticated, such that each recipient is only provided access to the recipient's respective item, keeping the other items stored by robot 900 secure and untampered.

Figure 13:
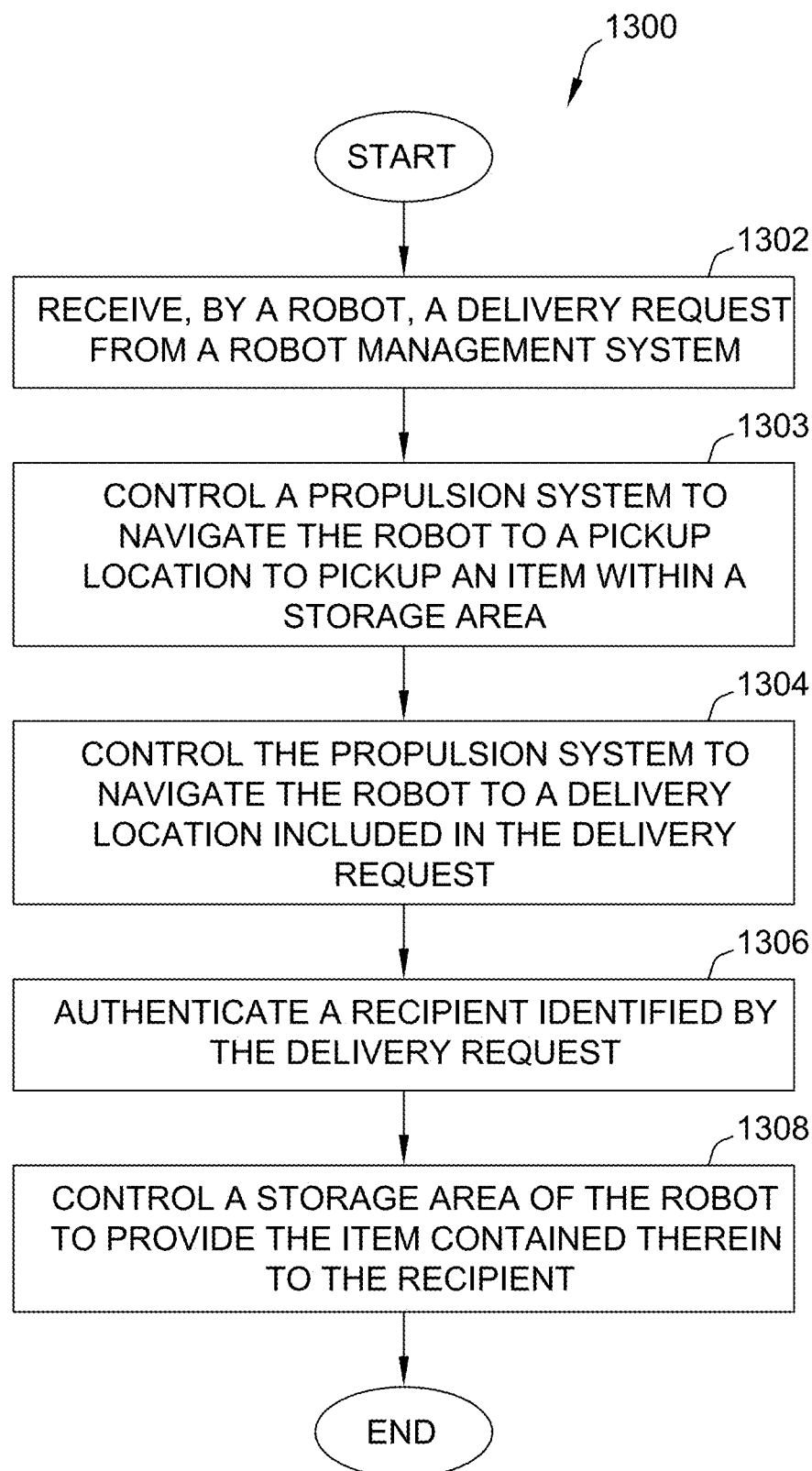
FIG. 13 is a flowchart illustrating an example process for delivering one or more items within an operations venue, such as a gaming environment, using the robots shown in FIG. 12.

FIG. 13 is a flowchart illustrating an example process 1300 for delivering one or more items within an operations venue, such as gaming environment 250. Accordingly, in at least some implementations, and as described in additional detail herein, robot 900 may receive, from RMS server 106, a delivery request (step 1302). The delivery request may include a variety of information, such as an item contained within internal container system 906, a pickup location 1208 for a delivery item, a delivery location 1204 relative to at least one wireless beacon 1202, and/or a recipient 1206.

In response to receiving the delivery request, one or more processors 320 of robot 900 may control a propulsion system (e.g., drivetrain assembly 308) of robot 900 to navigate to a pickup location 1208 of a delivery item and receive the delivery item (step 1303), e.g., when the delivery item is not already contained in internal container storage system 906, and then navigate to delivery location 1204 (step 1304). When robot 900 arrives at delivery location 1204, robot 900 may authenticate an identity of recipient 1206, such as by acquiring a biometric and/or photograph, as described herein (step 1306). In response to authenticating recipient 1206, robot 900 may provide the item requested to recipient 1206, such as by unlocking lid 904 of internal container storage system 906 and/or via any other suitable delivery mechanism (step 1308).

Example Service Robot with Contactless Payment

As described elsewhere herein, in some embodiments, robot 300 may be configured to transact with users via contactless payment. For example, the robot 300 may include a reader device 362 that accepts or facilitates contactless payment, such as an RFID or NFC receiver, positioned near a surface of the robot 300. In some embodiments, the reader device 362 may be identified by a visible symbol or lighting that identifies where the user is able to position a contactless payment device, such as mobile gaming device 256, for initiation of a contactless payment transaction.

As described herein the mobile gaming device 256 (or "mobile device") may be a smartphone that stores a "digital wallet" or "digital wallet app." More particularly, in some embodiments, the digital wallet may be installed on or otherwise facilitated by mobile gaming device 256. In some embodiments, the digital wallet may contain payment account information for various personal bank accounts and payment cards (e.g., debit cards, credit cards, player cards, casino accounts) of a player or user, from which the user may withdraw or deposit funds. The digital wallet may, in some embodiments, also contain loyalty card information for the user. In at least some embodiments, a player tracking system or other back-end system operated by the casino operator may maintain a financial account, such as a personal casino account, on behalf of the user and may allow the player to deposit funds into or withdraw funds from that personal casino account (e.g., as another source of funds).

In various embodiments, the robot 300 may provide lighting or display a symbol or other indicia indicating when the robot 300 has activated the reader device 362 to accept a contactless payment. The robot 300 may additionally or alternatively provide a change in lighting to indicate when the robot 300 has effectively communicated with the mobile gaming device 256 and completed acquiring the payment information or completed the contactless payment transaction. The robot 300 may thus allow users to complete payment transactions via contactless payment for the various goods and/or services described herein, such as, for example, purchasing food or beverage, purchasing show and other event tickets, purchasing lodging or parking accommodations (e.g., hotel charges, valet charges), tipping staff, and/or other goods and services offered by the venue.

In some embodiments, the robot 300 may provide various kiosk services and may allow contactless transactions for such services. For example, a player seated at a gaming device 104, a gaming table 294, or otherwise within the gaming venue, may interact with the robot 300 to acquire gaming credit. For example, the reader device 362 of the robot 300 may receive various forms of payment, such as payment cards, printed tickets, and the like, to facilitate the addition of gaming credit and/or other monetary value to a user's digital wallet.

Accordingly, in one example, the robot 300 may receive a payment card, such as a credit or debit card of the user (e.g., using reader device 362). In response to receiving the payment card, the robot 300 may communicate with the digital wallet management server 290 and/or a financial institution data center 270 (also referred to herein as a "funds transfer data center") to facilitate the transfer of funds from an account associated with the payment card (e.g., a bank or credit card account) to another account stored by the digital wallet, such as a casino account.

More particularly, in at least some embodiments, the robot 300 may receive an authorization request to add funds to a digital wallet of the user using a digital wallet app stored on a mobile device 256 of the user, such as when the user inserts a credit or other bank card in reader device 362 and/or interfaces with a GUI provided on display of the robot 300. The GUI may, for example, permit selection by the user of a monetary amount to be transferred from the user's credit or bank card to a casino account (or another account) in the user's digital wallet. In response to receiving the authorization request, the robot 300 may transmit an authorization request message to the funds transfer data center 270 associated with the user, where the authorization request message can be configured to request adding the funds to the digital wallet of the user. The robot 300 may receive an authorization response from the funds transfer data center 270, which may indicate that the transfer is complete or, on the other hand, that the transfer has been declined (e.g., for insufficient funds, etc.)

Accordingly, the robot 300 may communicate with mobile device 256 via a first network, such as any suitable NFC, WiFi, Bluetooth, and or any other suitable wireless network. Likewise, to process an authorization request, such as to add funds to a user's digital wallet, the robot 300 may communicate with one or more payment processor systems, such as the digital wallet management server 290 and/or the funds transfer data center 270, via a second network, such as any suitable payment processor network. In some embodiments, the second network may include any ISO 8583 and/or ISO 20022 payment network configured to receive and process messages that conform to one or both of these standards. These standards generally provide specifications for the format and content of messages related to electronic transactions made by cardholders using payment cards and messages transmitted between financial institutions.

In another example, the robot 300 may receive, using reader 362, a printed TITO ticket, which may be encoded with a monetary value, such as using a bar code, a quick response ("QR" code), and the like. In response to receiving the printed ticket, the robot 300 may communicate with the digital wallet management server 290 and/or a financial institution datacenter 270 to facilitate the transfer of funds from the printed TITO ticket to an account stored by the digital wallet, such as the casino account. In addition, once funds are transferred from the printed ticket into a user's digital wallet, the digital wallet management server 290 and/or another backend system may update an electronic record of the printed ticket to indicate that the ticket has been transferred to a user's digital wallet (e.g., to prevent subsequent re-use of the ticket).

In yet another example, the robot 300 may receive, using reader 362, a monetary currency, such as a U.S. bank note. In response to receiving the monetary currency, the robot 300 may communicate with the digital wallet management server 290 and/or a financial institution datacenter 270 to facilitate addition of funds in the amount of the monetary currency to an account stored by the digital wallet, such as the casino account. The received currency may be stored by the reader 362, such as in a hopper or other storage area. In at least one embodiment, the robot 300 may facilitate an electronic transfer of cryptocurrency, such as Bitcoin, from a cryptocurrency account of a user to a digital wallet of the user.

In another example, the robot 300 may also receive one or more gaming chips from a player or user. To facilitate receipt of gaming chips, the robot 300 may include a chip counter and/or a chip receptacle or storage area. As the user inputs gaming chips, the robot 300 may count the value of each chip input by the user, as well as, in at least some embodiments, perform validation or verification of each gaming chip to ensure that the chips are not fraudulent. The aggregate value of the chips input by the user may be added to the user's digital wallet, and the chips may be returned to the casino exchange point (e.g., the casino cage).

As described elsewhere herein, in some embodiments, robot 300 may also transfer monetary value from a digital wallet of the user to one or more other types of currency. For example, the robot 300 may receive a contactless payment from a user, and in response the robot 300 may print and dispense a TITO ticket and/or paper currency equal to the value of the contactless payment. The robot 300 may also facilitate deduction of these funds from the digital wallet of the user.

In addition to facilitating the transfer of funds into and out of a digital wallet, robot 300 may also permit contactless payment for goods and services. For example, robot 300 may function, in some ways, as a contactless payment point of sale ("POS") terminal. For instance, in at least some implementations, robot 300 may, as described herein, store one or more goods, such as food and beverage, within an internal storage area.

A user or player who wishes to purchase any of the goods contained within the robot 300 or services offered for sale by the robot 300 may initiate a contactless payment transaction between the reader 362 and the mobile gaming device 256 of the user. Specifically, the user may place the mobile gaming device 256 proximate reader 362 to establish a wireless connection between the two devices (e.g., an NFC or Bluetooth connection). Once the connection is established, a contactless payment transaction may take place between the robot 300 and the mobile gaming device 256, where it will be appreciated, funds are deducted from the digital wallet of the user and transferred as payment in exchange for the purchased goods or services. In addition to purchasing goods (e.g., food and beverage), when a user purchases services, such as show tickets and the like, the robot 300 may print and dispense the show tickets and/or another form of redeemable voucher, which the user may exchange for the services purchased from the robot 300.

In addition to the features described herein, in at least some embodiments, one or more wireless beacons having rotating beacon IDs may be included in the systems and methods described herein, such as to improve communication security between mobile gaming devices 256 of casino patrons (e.g., players) and various casino devices such as electronic gaming devices 104, smart tables 294, various kiosks, including robots 300 arranged as kiosks, and the like. For example, in at least one embodiment, wireless beacons with changeable (e.g., "rotating") beacon IDs may be installed gaming devices 104 and/or robots 300.

A player may use their mobile gaming device 256 (e.g., mobile phone) to connect to a particular gaming device 104 or robot 300 and its associated beacon ID to facilitate various functionality between the gaming device 104 and/or robot 300 and the player's mobile gaming device 256 during a gaming session. During connection setup, the beacon of the gaming device 104 and/or robot 300 requests a new beacon ID from a supporting backend system, such as a casino management system 114. The casino management system 114 generates a new, unique beacon ID and sends the beacon ID to the beacon of the gaming device 104 and/or robot 300.

The beacon changes its beacon ID (e.g., "rotates") to the new beacon ID and uses that ID to pair with the player's mobile gaming device 256. The mobile gaming device 256 provides a device ID and player authentication credentials to the casino management system 114, which may authenticate one or both the mobile gaming device 256 and the player. Upon successful authentication, the player and their mobile gaming device 256 are successfully paired with the gaming device 104 and/or robot 300 and the various functionalities provided by the gaming device 104 and/or robot 300 can be allowed. The configurable, non-static nature of the IDs for the beacons of the casino devices enhances security from certain types of hacking by introducing dynamic ID generation and use for one-time pairing. During the next pairing attempt, the gaming device 104 and/or robot 300 will receive a new, different ID, and thus will not advertise the same ID through more than one pairing. These and other features are described in additional detail by International Published Patent Application No. WO 2020/072362, entitled "System and Method for Changing Beacon Identifiers for Secure Mobile Communications," which is incorporated by reference herein in its entirety.

As described herein, robot 300 may also include a propulsion system, such as drivetrain assembly 308, a wireless interface, such as one or more network interface devices 326, one or more memory devices 322-324, and one or more processors 320 (as shown with reference to FIG. 3B). Robot 300 may, in addition, include a variety of other components, as shown in FIGS. 3A and 3B, such as one or more biometric scanners 358, camera devices 360, and the like.

Figure 14:
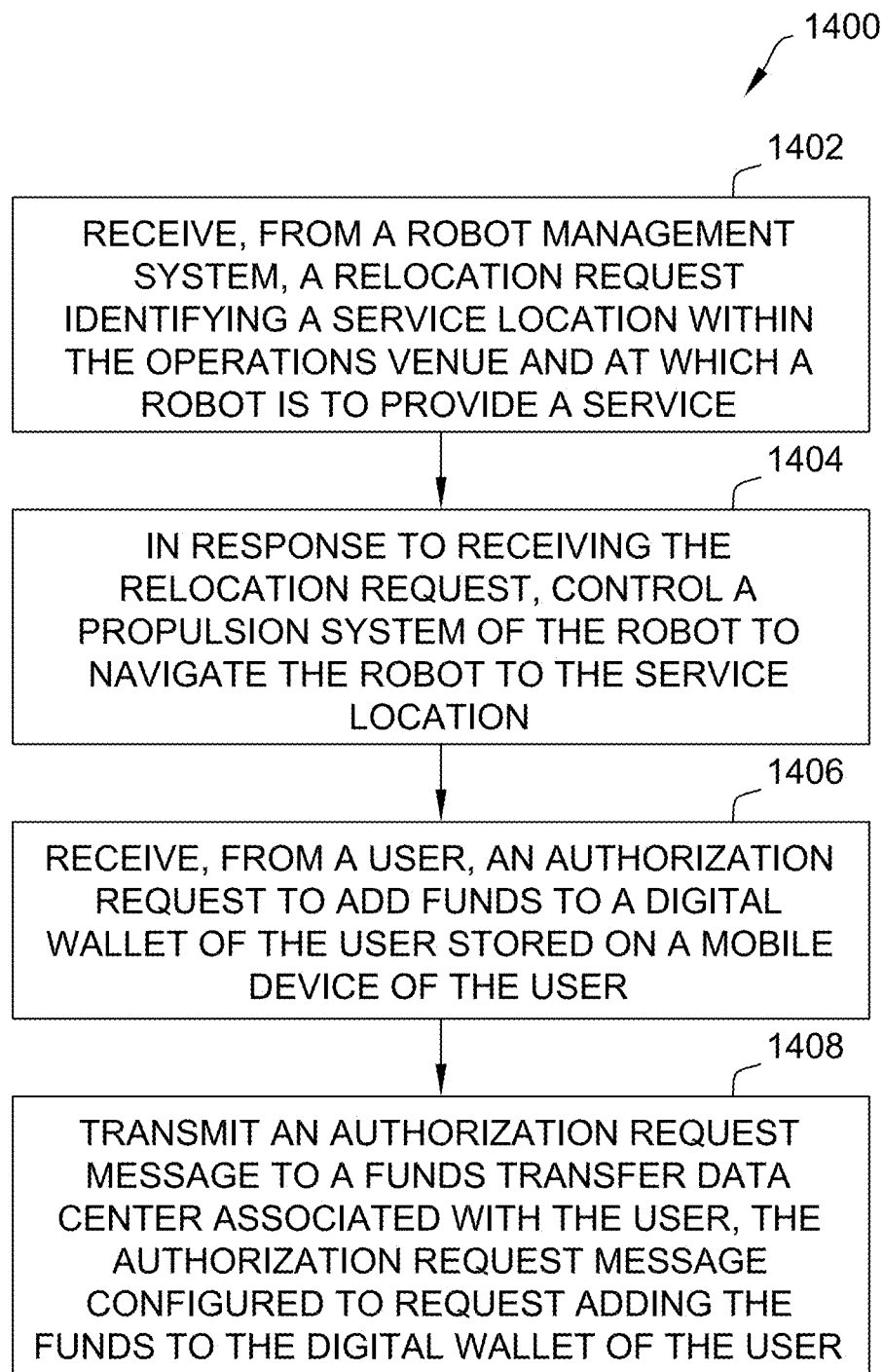
FIG. 14 is a flowchart illustrating an example process for adding funds to a digital wallet using a robot.

Accordingly, during operation, and with reference to FIG. 14, the robot 300 may receive a relocation request, such as from the robot management system 106 (step 1402). The relocation request may identify a service location, such as a location of a gaming device 104, a smart table 294, a mobile gaming device 256 of the user, and/or any other service location to which the robot 300 may be summoned for the purpose of facilitating a contactless payment transaction. In response to receiving the service request, and as described herein, the robot 300 may control its propulsion system (e.g., drivetrain assembly 308) to navigate to the service location, which may be anywhere within the casino as well as outside the casino, in some cases (step 1404).

Moreover, when the robot 300 arrives at the service location, the player or user that initiated the service request may initiate a wireless connection between the user's mobile gaming device 256 and the robot 300. For example, as described herein, the user may bring the mobile gaming device 256 proximate reader 362 to initiate an NFC connection. Likewise, at greater distances, a Bluetooth or WiFi connection may be established.

Once the wireless (or contactless) connection between the mobile gaming device 256 and the robot 300 is established, the robot 300 may receive, via the wireless connection, any of a variety of requests, such as an authorization request to add funds to a digital wallet of the user (step 1406). In various embodiments, as described herein, funds may be added or transferred from a credit account, a cryptocurrency account, and/or bank account of the user, as well as in response to physical receipt of a TITO ticket, monetary currency (e.g., U.S. bank notes), gaming chips, and the like.

In the example embodiment, the robot 300 (or a processor 320 thereof) may transmit, such as wirelessly via the network 292, an authorization request message in response to receiving the authorization request from the user. The authorization request message may, for example, be transmitted to the digital wallet management server 290 and/or funds transfer data center 270, which may, in turn, add and/or transfer funds to and/or from the digital wallet of the user (step 1408). In addition to facilitating the transfer of funds to and from the digital wallet, as described above, robot 300 may also receive contactless payments for various goods and services, such as goods stored within the robot 300 itself, other goods offered for sale within the casino, and/or services and events offered by the casino, such as tickets to shows and other attractions, and the like. These transactions may also be provided to the digital wallet management server 290 and/or funds transfer data center 270 for processing. Accordingly, robot 300 may facilitate a variety of contactless payment features.

Example Security Services Robot

As described elsewhere herein, one or more robots, such as robot 300 may be configured to perform in a drop team role. The drop team role may involve the robot 300 performing service operations associated with the casino venue nightly drop process, including, for example, exchanging and/or collecting a variety of "value instruments" collected by a gaming device, such as the EGM 104, a gaming table, and/or any other gaming device. In various embodiments, the term "value instruments" may include, but is not limited to, paper currency, gaming chips, (which may be contained in portable gaming chip "racks") and/or paper tickets (which may be stored within different portions of an EGM, such as currency hoppers, cash boxes, bill stackers, ticket cans, the like). In addition, although the drop team role is primarily described below in reference to an EGM 104, as described herein, robot 1500 may implement or perform a drop team role, including collection of currency and other items, in association with any suitable device, player, gaming table and the like within a casino.

In some embodiments, the drop team role may also include recording the gaming device game data, e.g., EGM 104 game play meters, and/or other coin-in and/or credit-in data. In one example, robot 300 may be configured to arrive at a gaming device, such as EGM 104, that is being serviced by a technician, or is scheduled to be serviced by the technician, to facilitate removal and secure storage of paper currency, paper tickets, and other items collected from the gaming device by the technician. In another example, robot 300 may securely dock with the EGM 104 cabinet, open the secure EGM 104 door to access the bill/ticket validator 124, and/or exchange the existing bill/ticket validator can with an empty can.

Figures 15A, 15B:
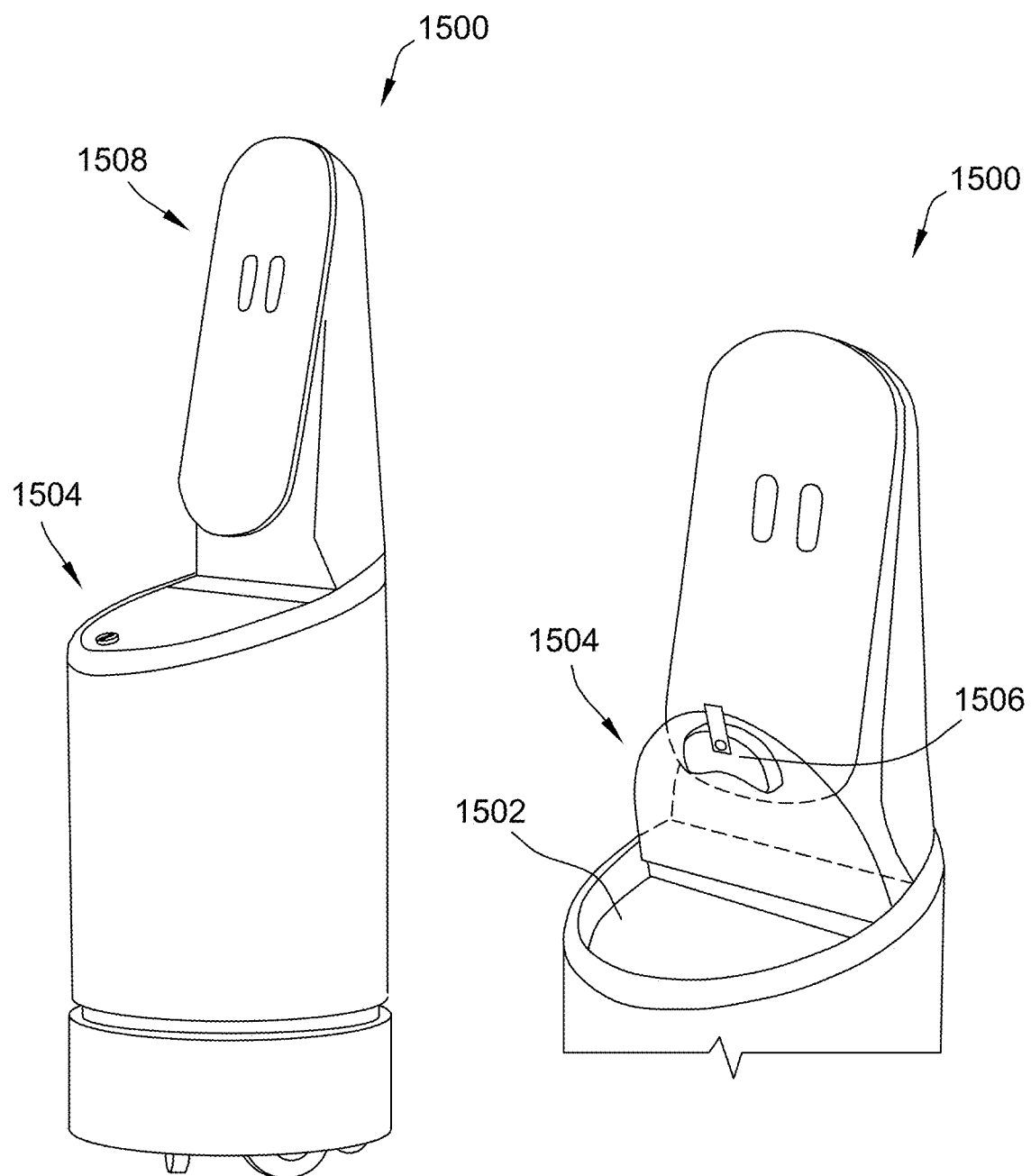
FIGS. 15A and 15B illustrate an example robot that performs drop box and other secure storage and security functions.

FIGS. 15A and 15B illustrate examples of a robot 1500 that is configured for drop box and/or security services. Accordingly, as shown, in at least one example embodiment, robot 1500 may include a storage area, such as secure storage area 1502, which may be secured by lid 1504 and arranged to contain one or more items, such as one or more value instruments, as described herein (e.g., paper currency, paper tickets, gaming chips, metal coins, gift cards, player tracking cards, and/or any other item and/or value instrument). In the example embodiment, secure storage area 1502 also includes at least one lock 1506, which may be used to prevent unauthorized access to secure storage area 1502. In addition, in at least some embodiments, robot 1500 may include an input device 1508, such as one or more buttons and/or a touchscreen display (e.g., a capacitive touchscreen display) capable of receiving user input. In at least one embodiment, robot 1500 may also include one or more internal sensors (not shown), such as a pressure sensor, which may be used to detect opening of lid 1504, placement of one or more value instruments within secure storage area 1502, tampering with secure storage area 1502, and the like.

In addition to secure storage area 1502, robot 1500 may include, as described herein, a propulsion system, such as drivetrain assembly 308, a wireless interface, such as one or more network interface devices 326, one or more memory devices 322-324, and one or more processors 320 (as shown with reference to FIG. 3B). Robot 1500 may, in addition, include a variety of other components, as shown in FIGS. 3A-3C, such as one or more biometric scanners 358, camera devices 360, and the like.

Accordingly, in at least some implementations, processor 320 of robot 1500 may receive, via input device 1508, an input from a requestor, such as a technician, a player, a "pit boss" or dealer at a gaming table, or another user who wishes to deposit gaming chips or other currency within robot 1500. In some embodiments, the input may, for example, be provided by the requestor to unlock secure storage area 1502. For example, the requestor may interact with a graphical user interface of the input device 1508 to select a control option, such as "lock", "unlock", "open" or "close." In response to receiving the requestor selection, processor 320 may control secure storage area 1502 and/or lock 1506 thereof to perform the associated action (e.g., to lock and/or unlock lid 1504 of secure storage area 1502). In at least some embodiments, processor 320 may require that the requestor complete an authentication process prior to unlocking secure storage area 1502. For example, the requestor may be required to provide a biometric, such as a fingerprint or facial recognition image, to biometric scanners 358 or to provide an identification card, e.g., to be scanned by a camera device 360 or card reader 362. As described herein, methods of authentication can include player name and password, physical key and/or combination locks, scanning a personal identity card (e.g., driver's license), authentication based on biometric data, such as using facial recognition (e.g., through camera devices 360), using biometric scanners 358, or the like.

As a result, in response to receiving an unlock and/or open command from the requestor, lid 1504 may be unlocked and opened or raised, as shown, permitting access to secure storage area 1502. The requestor may, in addition, manually unlock a cabinet of EGM 104 to gain access to one or more items stored therein, such as one or more value instruments that the EGM 104 has collected over a period of time (e.g., within twenty-four hours). The requestor may thus remove the value instruments stored within EGM 104, and deposit the removed value instruments into secure storage area 1502 of robot 1500, where the value instruments may be contained or housed for transport to a delivery location or collection area, such as a casino cage.

During deposit of value instruments within robot 1500, one or more internal sensors of robot 1500 may detect placement of the value instruments within secure storage area 1502, such as by sensing a pressure change, e.g., a weight of the value instruments, by one or more pressure sensors. In some embodiments, a camera device 360 may detect transfer of the value instruments from EGM 104 to secure storage area 1502. In some embodiments, one or more indicia (e.g., weight, volume, etc.) may be stored within memory devices 322-324 to memorialize or otherwise record an initial quantity of the value instrument(s) deposited within robot 1500. Camera device 360 may also be controlled to monitor the requestor during transfer of value instruments from EGM 104 into secure storage area 1502, such as to ensure that no value instruments are lost, misplaced, or stolen.

Following transfer of all or a portion of the one or more value instruments from EGM 104 to secure storage area 1502, the requestor may again select an option from the input device 1508, such as an option to "lock" and/or "close" the secure storage area 1502. In response to selection of such an option, processor 320 may control secure storage area 1502 and/or lock 1506 thereof to perform the associated action (e.g., to close and lock lid 1504 of secure storage area 1502). Thus, the requestor may interact with robot 1500 to transfer value instruments, such as paper currency, paper tickets, (e.g., as contained in a removable bill stacker) and the like, from a hopper or other storage area of EGM 104, or any other device or location, into secure storage area 1502 of robot 1500. In some embodiments, robot 1500 may provide a receipt to the requestor. For example, robot 1500 may display an encoded image, such as a quick response ("QR") code, which contains transaction details, such as time and/or date-stamp, amount deposited, identifying information of the requestor, and the like.

In addition to these features, in at least some embodiments, processor 320 may provide, such as using network interface devices 326 and via a wireless communications network within the venue 402, one or more messages to a server system, such as any of server systems 106-114 and/or 290. The one or more messages may include, for example, data indicating that robot 1500 has received the one or more value instruments, data indicating that secure storage area 1502 has been locked, the information related to weight and/or quantity, as described above, and/or any other suitable data intended, for example, to ensure the security of the one or more value instruments during transport by robot 1500 to the delivery location (e.g., the casino cage).

In various embodiments, processor 320 may receive, such as from RMS server 106, a request for drop box services, which may include a pickup location and/or requestor information. The pickup location may specify a location to which robot 1500 should navigate for pickup of value instruments (e.g., an EGM 104, gaming table or a player who wishes to deposit chips). In response, robot 1500 may control its propulsion system (e.g., drivetrain assembly 308) to navigate robot 1500 to the pickup location, and/or to unlock secure storage area 1502, as described herein. In various embodiments, and as described elsewhere herein, the requestor (e.g., a player, a technician, or another user) may provide a request for drop box services to robot 1500 using a handheld communication device (e.g., a smartphone), an EGM 104 interface, and/or any other communication system that can relay the request to robot 1500.

Likewise, in at least some embodiments, processor 320 may receive, such as from RMS server 106, a deposit location, which may specify, for example, a location to which robot 1500 should navigate for depositing of value instruments (e.g., a casino cage). In response, robot 1500 may control its propulsion system (e.g., drivetrain assembly 308) to navigate robot 1500 to the deposit location, and/or to unlock secure storage area 1502, as described herein, on arrival at the deposit location.

Moreover, in some embodiments, processor 320 may receive, such as from RMS server 106, a monitoring location, which may specify, for example, a location to which robot 1500 should navigate for performing monitoring, surveillance, and/or other security related functions. In response, robot 1500 may control its propulsion system (e.g., drivetrain assembly 308) to navigate robot 1500 to the monitoring location. Robot 1500 may also, upon arrival at the monitoring location, control camera devices 360 to acquire one or more images of monitoring location.

In some embodiments, robot 1500 may also, as described herein, escort a player and/or another user between locations, such as to ensure the safety and/or security of the user. For example, in at least one implementation processor 320 may receive, via input device 1508, a request from the user to be escorted. In response, the processor 320 may control the propulsion system of robot 1500 to cause robot 1500 to escort the user, such as by following behind the user until the user instructs robot 1500 that the user has arrived at a desired destination (e.g., the user's vehicle in a casino parking garage, the user's hotel room, etc.)

Moreover, to ensure the safety and security of the user, processor 320 may control camera device 360 to monitor the user (e.g., by taking photos or video of the user) during transit to ensure that the user remains physically safe as well as to function as a deterrent to potentially hazardous individuals, such as within a parking garage, etc. Further, robot 1500 may detect a variety of other health related issues, such as a user who trips and falls or is otherwise incapacitated, and the like.

Figure 16:
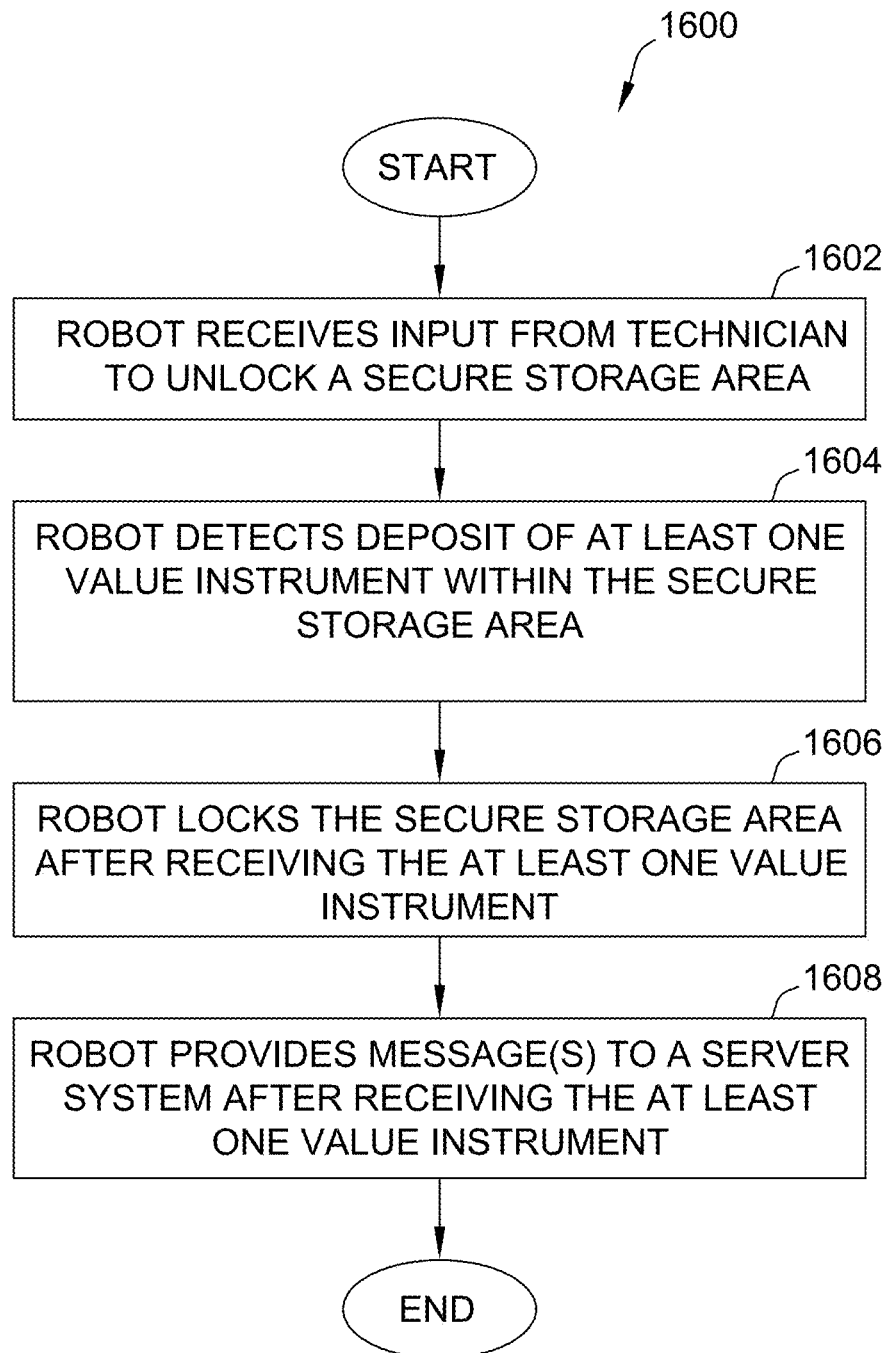
FIG. 16 is a flowchart illustrating an example process for performing drop box and/or secure storage and security functions, such as using the robots shown in FIGS. 15A and 15B.

FIG. 16 is a flowchart illustrating an example process 1600 for performing drop box and/or security services, as described herein. Accordingly, in the example embodiment, robot 1500 may receive an input from a requestor, such as an electronic gaming device technician, to unlock secure storage area 1502 (step 1602). Robot 1500 may, in addition, detect deposit of at least one value instrument within secure storage area 1502, such as a value instrument transferred by the requestor/technician from an EGM 104 (step 1604). Robot 1500 may also lock secure storage area 1502 following completion of the transfer of one or more value instruments into secure storage area 1502 and/or an instruction provided by the requestor/technician to lock secure storage area 1502 (step 1606). In at least some embodiments, robot 1500 may also provide, such as via a wireless network, one or more messages at least one server system (e.g., server systems 106-114 and/or 290) indicating that robot 1500 has received the at least one value instrument and/or that robot 1500 has securely stored the at least one value instrument (step 1608). Other data may be included as well, such as a timestamp indicating receipt, data related to an aggregate value or weight of the one or more value instruments, and/or any other suitable data or information.

Example Service Technician Robot

As described elsewhere herein, in some embodiments, robot 300 may be configured to perform in a service technician or diagnostic role. The service technician and/or diagnostic role may involve the robot 300 performing service operations and/or device inspections of any of a variety of devices, electronics, and/or property within the venue 402. In addition, in the example embodiment, and as described herein, robot 300 may also be configured to collect data from devices, electronics, and/or property within the venue 402.

In both the service technician or diagnostic role as well as during data acquisition, operations may be performed on devices, such as EGMs 104, as well as other electronic gaming devices (EGDs or simply gaming devices) and electronics, such as kiosks, chairs, intelligent or electronic chairs, benches, intelligent or electronic benches, pedestals, podiums, and/or any other device or property that robot 300 can receive data from, interface with, visually observe, and the like. Accordingly, although EGMs 104 are primarily described below in association with the service technician or diagnostic role, in various embodiments, robot 300 may perform these and other services in association with other electronic gaming devices, such as table games (e.g., smart or electronic table games), as well as any other electronic device within a casino.

In addition, as described herein, robot 300 may include a propulsion system, such as drivetrain assembly 308, a wireless interface, such as one or more network interface devices 326, one or more memory devices 322-324, and one or more processors 320 (as shown with reference to FIG. 3B). Robot 300 may, in addition, include a variety of other components, as shown in FIGS. 3A-3C, such as one or more biometric scanners 358, camera devices 360, and the like.

Accordingly, during the performance of data collection services, robot 300 may be configured to receive and record any of a variety of data, such as diagnostic data, gameplay data, and the like, from an EGM 104. In an example implementation, robot 300 is in wireless communication with an EGM 104 and receives data via the wireless interface (e.g., such as one of network interface devices 326). In various embodiments, robot 300 may initiate communications with EGM 104 and communicate with EGM 104 via a wireless protocol, such as, but not limited to, BLUETOOTH, infrared, near field communication (NFC), ultra-wide band, narrow band internet-of-things (IOT), WiFi, cellular and/or ZIGBEE. In some embodiments, robot 300 may also communicate with EGM 104, such as by connecting to a wired connection port that facilitates wired or hardwired connection with EGM 104.

In an example implementation, the wireless interface is a secure wireless interface with the game play data being encrypted using, e.g., Triple DES, RSA, Blowfish, Twofish, AES, and/or another suitable encryption protocol by the EGM 104 prior to transfer to robot 300. In some implementations, the wireless interface is a unidirectional interface configured to transmit data from the EGM 104 to be received by robot 300. In some implementations, the wireless protocol is bidirectional allowing both the EGM 104 and robot 300 to transmit and receive data. In addition, in at least some embodiments, robot 300 may scan encoded data that is displayed by an EGM 104, such as a quick response (QR) code, a bar code, and/or another form of encoded data to receive gameplay data, diagnostic data, and/or other machine data. In some cases, a series of encoded images may be displayed for image capture by robot 300, which may facilitate providing any volume of data to robot 300, such as, for example, where each encoded image includes a block or subset of a larger dataset.

Moreover, in some implementations, robot 300 receives and records data from the EGM 104 as robot 300 is proximate or passes by EGM 104. Similarly, in some implementations, robot 300 records data in real-time from the EGM 104, such as during play of EGM 104 by a player and/or otherwise when robot 300 is proximate EGM 104.

In some example implementations, robot 300 also stores the received data in a memory device 322, 324 for later upload to a server (e.g., the robot management system server 106). In some implementations, robot 300 is in network communication with RMS server 106, and actively uploads the data at the time it is received from the EGM 104. To this end, robot 300 may wirelessly communicate with RMS server 106, such as via any suitable wireless communications protocol. In various embodiments, robot 300 may communicate with RMS server 106 a wireless protocol, such as, but not limited to, BLUETOOTH, infrared, near field communication (NFC), ultra-wide band, narrow band internet-of-things (TOT), WiFi, cellular and/or ZIGBEE. In some embodiments, robot 300 may also communicate with RMS 106, such as by connecting to a docking station and/or another wired connection port that facilitates wired connection (e.g., via Ethernet) with RMS server 106. As described herein, data may be encrypted by robot 300 prior to transfer to RMS server 106. In addition, it should be understood that RMS server 106 may coordinate with another backend system, such as any of servers 106-114 (e.g., casino management system server 114) to manage robot 300 in any of the various robot functions and scenarios described elsewhere herein, such as for example, determining that the EGM 104 is actively in play by querying the casino management system server 114 to determine whether, for example, the EGM 104 has deposited credits and/or has recently played a game round.

In at least one implementation, robot 300 may also use real-time game play data to create a real-time heat map indicating where patrons are actively playing EGMs 104 in the casino and the characteristics of their play, e.g., coin-in, rate of play, coin-out, etc.

In the service technician or diagnostic role, robot 300 may be configured to perform device inspections of EGMs 104. In some embodiments, the RMS server 106 or other system server may periodically (e.g., weekly) schedule device inspections of EGMs 104 within the venue 402. Similarly, in some embodiments, robot 300 may automatically perform a device inspection of an EGM 104, such as when an item delivery is performed and/or if a previous device inspection time for an EGM 104 exceeds a pre-determined inspection threshold. In some embodiments, players or support staff can request a device inspection as well.

To initiate a device inspection, robot 300 may move (e.g., by controlling its propulsion system or drivetrain assembly 308), to the location of the EGM 104 to begin an inspection process. In some embodiments, the RMS server 106 provides the EGM 104 location to the assigned robot 300 as a part of the request assignment, where in other embodiments, robot 300 receives a device identifier for the target EGM 104 and locates the EGM 104 automatically (e.g., via static map, via a location request to the RMS database 414, via manual search).

Once at or near the target device location, robot 300 may begin an inspection process. In some embodiments, robot 300 may not be able to complete the inspection process if the target device is occupied. As such, the robot 300 may initially scan the area in front of the target device and determine whether the device is occupied (e.g., whether a player is standing or sitting in front of the device). If the target device is occupied, robot 300 may delay or cancel the inspection process and may transmit a message to the RMS server 106 indicating a delay on the inspection request. If the target device is unoccupied, or if robot 300 is configured to perform the inspection process regardless of current device use, robot 300 continues the inspection process.

The inspection process may include one or more inspection tasks. In some embodiments, robot 300 may capture an image of the target device and compare the captured image to a baseline image to determine, for example, whether current brightness of the target device is within acceptable range, whether the device is powered on, whether edge lighting is fully functional, whether there is any physical damage to the cabinet, button deck, displays, chair, reels, or other visible device components. In some embodiments, robot 300 may implement a suitable machine learning algorithm, such as an algorithm that enables robot 300 to distinguish between portions of EGM 104 and debris surrounding EGM 104, and or between functional or undamaged portions of EGM 104 and damaged or non-functioning portions of EGM 104. Likewise, robot 300 may use the algorithm to recognize human occupants or players, as well as any of a variety of other objects, conditions, and the like.

In some embodiments, robot 300 may establish a wireless connection with the device (e.g., as described herein). Once connected to the target device, robot 300 may initiate diagnostic routines and may capture digital images or video of the target device or particularly of the output occurring on the display (e.g., evaluating the graphical output for error codes, alerts, or the like). After the inspection process is complete, the robot 300 may transmit an inspection completion message to the RMS server 106 or RMS database 414 for tracking the completion of the inspection and optionally any results of such inspection. In addition, in some embodiments, robot 300 may provide an alert or other notification, such as to RMS server 106, indicating that EGM 104 requires maintenance or is otherwise damaged or needs cleaning. In some embodiments, such as if robot 300 includes a waste receptacle or other secure storage area, robot 300 may remove debris. Likewise, in some embodiments, robot 300 may be capable of performing one or more repairs to EGM 104, such as replacing damaged or defective parts, uploading new or updated firmware or software, and the like.

Figure 17:
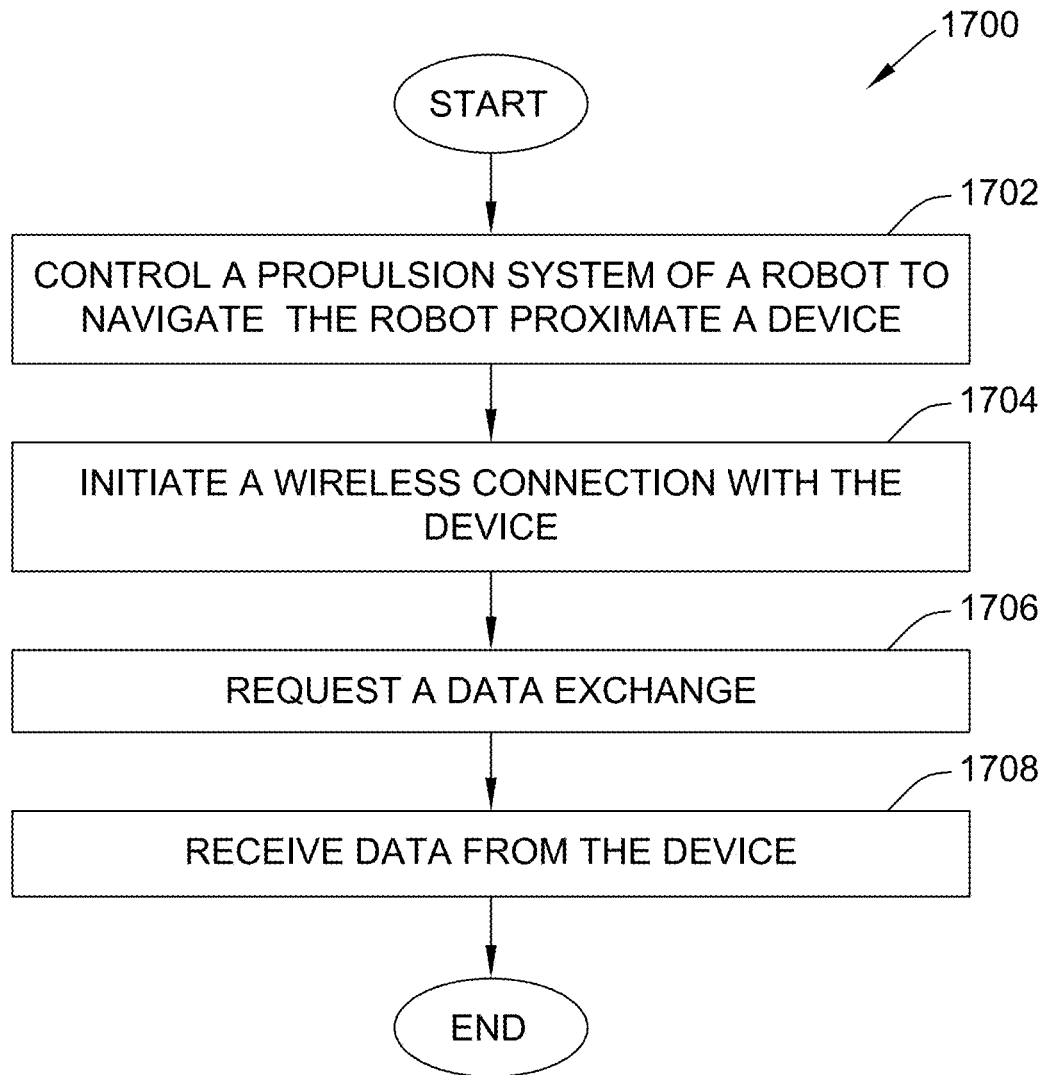
FIG. 17 is flowchart illustrating an example process for controlling a robot to perform data collection and diagnostics functions.

FIG. 17 is a flowchart illustrating an example process 1700 for controlling a robot to perform data collection and/or diagnostics, as described herein. In the example embodiment, a processor 320 of robot 300 may control a propulsion system of robot 300 to navigate robot 300 proximate an EGM 104 (e.g., within a wireless and/or image capture range of an EGM 104) (step 1702). Processor 320 may, in addition, initiate a wireless connection with the EGM 104 (step 1704), such as using any of the wireless protocols described herein. Processor 320 may also request a data exchange with the EGM 104 (step 1706). In response, processor 320 may receive data from EGM 104, such as diagnostic or gameplay data, as described herein (step 1708). In at least one embodiment, robot 300 may communicate with EGM 104 (or another suitable device) using a first wireless protocol, such as BLUETOOTH and/or any other wireless protocol, as described herein. In some implementations, processor 320 may also store the data received from EGM 104 to a memory device 322-324 for upload at a later time to RMS server 106. In addition, processor 320 may provide the data stored from EGM 104 to RMS server 106 (or another suitable server), such as during regular intervals, substantially in real-time, when robot 300 docks or completes a wired connection with RMS server 106, and the like. During wireless upload of the data, robot 300 may use any suitable wireless protocol, such as WiFi, as described herein.

Example Celebration Services Robot

As described elsewhere herein, in some embodiments, robot 300 is configured to provide celebration services. For example, one or more robots 300 celebrate casino gaming award related events (e.g., jackpot awards, tournament winners, bingo winners, etc.) and/or patron loyalty award related events (e.g., scatter awards, hot-seat awards, random bonusing awards for carded and uncarded patrons, etc.) by displaying a light-show (e.g., on any number of LEDs coupled to robot 300), playing music, displaying a congratulations message on a display, "dancing" and spinning around, and/or other fun celebratory actions.

In some embodiments, multiple active robots 300 are operational in a venue and, upon the occurrence of a patron hitting a jackpot award at an EGM 200, begin a celebration display with all or a portion of robots 300 traveling to the vicinity of the EGM 200 and, when they're all in a predetermined proximity to EGM 200, to each other, and/or in another predefined area, begin spinning, dancing, displaying lights from lasers (e.g., as a laser show), causing fog or smoke to be emitted (e.g., from a fog or smoke machine coupled to robot 300), displaying flashing lights, playing music, announcing congratulation messages (e.g., "woo-hoo", "award winner", big winner", "congratulations", etc.) and displaying congratulations screens on each of the robots 300 (e.g., in some embodiments specific to the jackpot/award won and/or the game the jackpot/award was presented in). In some embodiments, one or more robots 300 may perform the celebratory actions described herein without traveling to a particular location (e.g., the vicinity of EGM 200 as described above). For example, one or more robots 300 may celebrate in their current location as a way to communicate to players in other areas of the casino or venue (e.g., not just at the location of the jackpot/award, etc.) that a particular event (e.g., award of a jackpot) has occurred.

In some embodiments, the robots participating in the celebration all operate in synchronization, performing a predetermined choreographed dance routine (e.g., line dancing). In some embodiments, the celebration follows the theme of the EGM game awarding the jackpot, e.g., a buffalo stampede themed celebration, e.g., displaying and/or mimicking running buffalos and announcing "buffalo!", for a jackpot award hit on an Aristocrat "Buffalo" themed game.

In some embodiments, a celebration performed by one or more robots 300 may be performed in response to a generated service request based upon certain trigger conditions. For example, a service request for a celebration may be triggered based on a game event (e.g., occurrence of a jackpot win, feature trigger, etc.) and/or based upon a scheduled event (e.g., the beginning of a tournament, etc.). Such celebration service requests may include dispatching one or more robots 300 to a location of the patron (e.g., the EGM where a jackpot was presented) to provide any of the various celebration services described herein. In some embodiments, robots 300 may be configured to provide hand-pay services, as described herein, for events that are celebrated by robots 300 (and/or any other event at a casino).

In some embodiments, a request may be generated and/or a celebration may be triggered in response to a server (e.g., loyalty account server 110) indicating that a patron has a birthday on that particular day and/or a certain threshold has been reached in the patron loyalty account (e.g., a threshold number of loyalty points reached). For example, one of the servers and/or robot 300 described herein may determine the identity of at least one patron at a casino. Loyalty account server 110 may then communicate that at least one of the patrons has a birthday. Accordingly, robot management system server 106 may control at least one robot 300 to perform a celebration (e.g., "singing" (outputting audio) a happy birthday song and dancing) for that patron (e.g., wherein the location of the patron may be determined by any of the servers described herein and/or robot 300 (e.g., via facial recognition)).

In some embodiments, a patron may be able to customize (e.g., via mobile gaming device 256 and/or EGM in communication with robot 300 and/or server 106) at least a portion of a celebration performed by robot 300. For example, a player who has won a jackpot may not want attention attracted to them and/or the EGM where the jackpot was presented (e.g., for security and/or privacy purposes). Accordingly, in some embodiments, a player may be presented with an option for a celebration to be performed (e.g., at device 256 and/or an EGM) by robots 300 before the celebration occurs. In some embodiments, a player may be able to customize portions of the celebration (e.g., how much information (jackpot win amount, player name, etc.) is displayed by robots 300). In some embodiments, a player may request (e.g., via device 256, an EGM, and/or robot 300) a celebration be performed by at least one robot 300. For example, a player may receive a message at device 256 (e.g., from any of the servers described herein) asking if the player would like a celebration to be performed (e.g., for a birthday, jackpot win, etc.). Further, a player may transmit a request to server 106 that a celebration be performed (e.g., for a relative's birthday, an anniversary, etc.). Server 106 may be configured to authenticate the request (e.g., via inputs from casino personnel and/or verifying information (e.g., a birthday) at server 110) and cause at least one robot 300 to perform the requested celebration. Further customizations for celebrations (e.g., how long the celebration will last, where the celebration will occur, different light/sound/video configurations) may be inputted to server 106 by patrons and/or casino personnel and implemented by robots 300.

In some embodiments, celebrations performed by one or more robots 300 may be scheduled for a specific time and/or at predetermined intervals. For example, one or more robots 300 may be controlled to perform a specific celebration at a certain time each day (e.g., wherein the celebration is themed for a specific venue, game, etc.). In some embodiments robots 300 are configured to perform scheduled celebrations in order to advertise different events. For example, robots 300 may perform a celebration and display an advertisement/promotion to attract patron attention to the advertisement. As an example, one or more robots 300 may advertise an upcoming concert by dancing and playing a song that will be performed at the upcoming concert. Further, robots 300 may be configured to sell tickets for an upcoming advertised event so that a patron who sees the celebration (advertisement) can purchase a ticket for the advertised event (and/or any other event) directly at robot 300.

In some embodiments, robots 300 may perform celebrations in response to real-time events (e.g., including gaming events, but also other live events such as sporting events). For example, if a major sporting event is occurring on a particular day, robots 300 may be configured to perform celebrations in response to certain events occurring in the sporting event (e.g., a score change, the beginning/ending of a game). Robots 300, in the various embodiments described herein, may display messages relating to the specific celebration (e.g., in sporting event embodiments, 'Team X goal scored," "Start of second half, place bets now," "Game starting soon, place bets now," etc.). Further, robots 300 may be configured to accept inputs and place wagers regarding advertised events (e.g., sporting events).

As an example, one or more robots 300 are configured to monitor bingo game play (the bingo ball call) and, if a patron's bingo card wins a bingo or other award the robot 300 alerts the patron and, in some examples, announces "bingo", and does a celebration performance, e.g., a robot "dance", plays a song, etc. As another example, one or more robots 300 are configured to monitor keno game play (the keno ball call or keno board) and if a patron's ticket wins an award the one or more robots 300 alerts the patron and, in some examples, announces "keno winner" and does a celebration performance, e.g., a robot "dance", plays a song, etc.

As yet another example, one or more robots 300 are notified (e.g., by robot management system server 106), that a jackpot (e.g., a progressive jackpot) is above a threshold amount (e.g., $10,000, $100,000, $1,000,000, etc.) and in reaction to the notification robot 300 may announce, e.g., "Aristocrat Dragon Link Grand Progressive is now above $50,000" in an exciting manner and, e.g., display flashing lights, dance, spin and run around, display exciting video, etc. In some embodiments, a robot 300 in a first area of the casino venue is notified (e.g., by robot management system server 106) that a jackpot has just been awarded in a second area of the casino venue and, in response to the notification, the robot may announce and celebrate the jackpot (e.g., "an Aristocrat Dragon Link Grand progressive of $50,901 has just been awarded near the Show Room") in an exciting manner (e.g., display flashing lights, dance, spin and run around, display exciting video, etc.).

In some implementations, a robot 300 is configured to provide photo/video services at the scene of a celebration. For example, robot 300, using camera device 360, presents a video display of one or more patrons near/at the celebration on a display device 350 and, in response to receiving an input from a patron (e.g., via user I/O device 514) captures a photograph/video of one or more patron celebrating. Further, robot 300 may upload the photograph/video to a server (e.g., robot management system server 106) and, in some embodiments, prints a ticket, using ticket printer 364, to provide to a patron including a link to the photograph on the server. In some embodiment, robot 300 may display a QR code (e.g., on display 312) in addition to and/or in place of printing a ticket. The patron can then access the link (e.g., based upon scanning the QR code and/or accessing the link on the ticket, as examples) to retrieve a copy of the photograph/video.

In some embodiments, robot 300 enables the patron to provide identifying information (e.g., via reading the patron's loyalty card, or other ID, using card reader 362A). Further to this example, the robot then uploads the patron information to the server (e.g., robot management system server 106) and the server associates the photograph/video with the patron's information. In some instances, loyalty system server 110 is in communication with the robot management system server 106 and, upon the patron accessing their patron loyalty account, enables the patron to access and/or retrieve the photograph/video via the loyalty account server 110.

In some embodiments, robot 300 enables the patron to provide their social media site account information (e.g., their Facebook® account information, etc.) and have the photograph/video uploaded directly (e.g., via robot management system server 106) to the patron's social media site. In some embodiments, robot 300 is configured to enable the patron to take their photograph with an EGM 200 game screen displaying a winning outcome (e.g., a jackpot award). In some embodiments, robot 300 is configured to enable a patron to take their photograph with another person or another robot. In some embodiments, robot 300 is configured to overlay a photograph/video with, as examples, a border, image, animation and/or watermark (e.g., including casino venue branding information or other artwork). In other words, a photograph taken by robot 300 at an Aristocrat EGM 200 may be overlaid, by robot 300, with an Aristocrat logo, border, etc.

In some embodiments, robot 300 is configured with photographic facial detection, auto-frame, and/or auto-lighting capabilities. In some embodiments, robot 300 is configured with facial recognition software enabling the robot to detect and properly center a patron's face when taking a photograph/video (e.g., at/during a celebration), detect whether a patron is smiling, their eyes are open, etc. In some embodiments, robot 300 is configured with light emitting devices, e.g., surrounding a display device 312 in order to take/generate higher-quality photos/videos. Further, robot 300 may be configured to detect the lighting of the patron's face and, using the light emitting devices, automatically correct the lighting brightness and color (e.g., by adjusting the light output of the light emitting devices) when taking a photograph/video of the patron. In some examples, the light emitting devices are tri-color LEDs.

In some embodiments, robots 300 may display certain persona interactions based on a current celebration activity or task currently being performed by robot 300. For example, upon activation (e.g., by receiving a remote celebration task), robot 300 may display a moving face, facial expressions, or animations while robot 300 is moving to a destination (e.g., bobbing back and forth, searching eye movements, perspiring, or the like). Robot 300 may display facial expressions and lip movements while interacting with other robots and/or players at a celebration scene (e.g., emulating articulation of audible interactions such as lip-syncing to songs). Such persona animations allow nearby players to understand what robot 300 are currently doing, as well as comforting and easing human interaction with robot 300.

Figure 18:
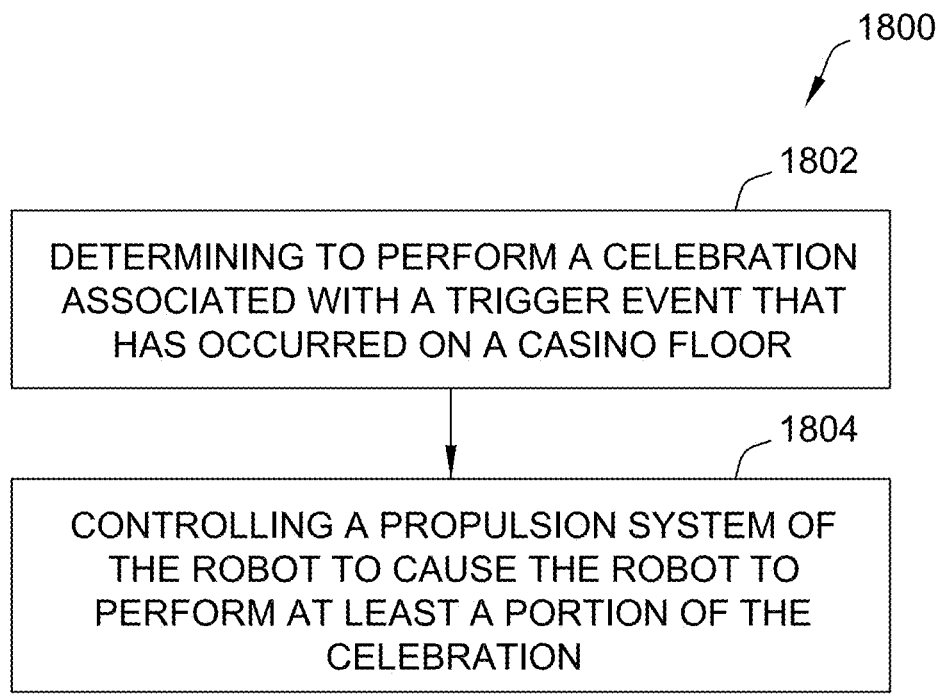
FIG. 18 is a flowchart illustrating an example process for controlling a robot to provide celebrations services, as described herein.

FIG. 18 is a flowchart illustrating an example method 1800 for controlling a robot (e.g., to perform a celebration within an operations venue, such as gaming environment 250). In some embodiments, and as described in additional detail herein, method 1800 includes determining 1802 based upon a communication received at a wireless interface of a robot (e.g., robot 900), to perform a celebration associated with a trigger event that has occurred on a casino floor and, in response to determining to perform the celebration, controlling 1804 a propulsion system of the robot to cause the robot to perform at least a portion of the celebration.

In some embodiments, method 1800 includes receiving, from a robot management system (RMS) (e.g., RMS server 106) and via the wireless interface, a celebration request, wherein the celebration request identifies the trigger event associated with the celebration and the celebration for the robot to perform. In some embodiments, method 1800 includes monitoring, via the wireless interface, play of a game, determining, based upon the monitoring via the wireless interface including the communication received at the wireless interface, the trigger event has occurred, and determining, based upon determining that the trigger event that has occurred, the celebration for the robot to perform. In some embodiments, method 1800 includes determining a celebration location where the robot will perform the celebration and controlling the propulsion system to navigate the robot to the celebration location. In some embodiments, method 1800 includes controlling the propulsion system to cause the robot to perform at least the portion of the celebration wherein the portion of the celebration comprises the robot dancing by the propulsion system moving the robot in a predetermined manner. In some embodiments, method 1800 includes capturing, by a camera device (e.g., camera device 360) of the robot while the robot is performing the celebration, at least one of a picture and a video and providing, at a display device of the robot, a link to a copy of the at least one of the picture and the video.

Example Selfie/Photography Services Robot

As described elsewhere herein, robot 300 is configured to provide "selfie" services. For example, patrons of a casino may desire to have their picture taken (e.g., individually or in a group) but may not want to hand their phone and/or camera off to a stranger in order for their picture to be taken. Further, a patron may desire a higher-quality picture be taken (e.g., as a souvenir, for social media purposes, etc.) than their camera and/or phone typically takes. Accordingly, robot 300 is configured to take high quality photos (e.g., by including high-quality camera(s) on robot 300, other devices on robot 300 to facilitate high-quality picture taking (e.g., a ring light), and/or configuring robot 300 to perform image processing (e.g., to adjust brightness, remove red-eye, etc.)) of patrons and provide access of the photos to authorized patrons (e.g., patrons presenting credentials that are authenticated by robot 300 and/or a server as described herein).

In an example, robot 300, using camera device 360, presents a video display (e.g., a live feed) of a patron on display device 350 and, receiving an input from a patron (e.g., via a user I/O device 514 and/or at a desired time selected by the patron (e.g., on a timer)), captures a photograph (e.g., and/or video—photographs/pictures, as used herein, may also include videos, or a motion photo (e.g., iPhone Live Photo) recording a video for a period of time (e.g., 1.5 seconds) before and after a photo is taken) of the patron (e.g., and other patrons if desired). Further to this example, robot 300 uploads the photograph to a server (e.g., robot management system server 106) and, in some embodiments, prints a ticket, using ticket printer 364, to provide to the patron including a link to the photograph on the server. In some embodiments, robot 300 is configured to print a copy of the photograph itself (e.g., via ticket printer 364 and/or another printing device coupled to robot 300). In some embodiments, robot 300 may display a QR code (e.g., on display 312) in addition to and/or in place of printing a ticket. The patron can then access the link (e.g., based upon scanning the QR code and/or using the ticket, as examples) to retrieve a copy of the photograph. In some embodiments, robot 300 may provide a patron access to a photograph via NFC, Bluetooth, Wi-Fi, cellular, etc. wireless techniques as described herein.

In some embodiments, robot 300 enables the patron to provide their identifying information (e.g., via reading the patrons loyalty card, or other ID, using card reader 362A). Further to this example, robot 300 then uploads the patron information to the server (e.g., robot management system server 106) and the server associates the photograph with the patron's information. In some instances, loyalty system server 110 is in communication with robot management system server 106 and, upon the patron accessing their patron loyalty account, enables the patron to access and/or retrieve the photograph (e.g., and/or other photographs/videos) via loyalty account server 110.

In some embodiments, robot 300 enables the patron to provide their social media site account information (e.g., their Facebook® account information, etc.) and have the photograph uploaded directly (e.g., via the robot management system server 106) to the patron's social media site. In some embodiments, robot 300 may upload a copy of the photograph to a server that controls a copy of the photograph to be displayed at a photo station (e.g., on the casino floor). For example, similar to how some amusement park rides have cameras that take pictures of patrons during the ride, and allow patrons to view and/or purchase copies of the pictures after the ride is over, robot 300 is configured to implement a similar system on a casino floor. In other words, robot 300 may upload pictures to a separate location in the casino where a patron can view/print their picture(s) and decide whether to purchase copies and/or electronic access to the picture(s).

In some embodiments, robot 300 is configured to enable the patron to take their photograph with an EGM 200 game screen displaying a winning outcome (e.g., a jackpot award). In some embodiments, robot 300 is configured to enable a patron to take their photograph with another person or another robot. As an example, a server (e.g., robot management server 106) notifies robot 300 that a celebrity is in the proximity of a VIP patron and robot 300 then guides the patron to the celebrity to have their photographs taken. In some embodiments, robot 300 is configured to overlay a photograph with, as examples, casino venue branding information and/or other artwork (e.g., a photograph taken at an Aristocrat EGM 200 is overlaid with an Aristocrat logo, etc.).

In some embodiments, robot 300 is configured with photographic facial detection, auto-frame, and/or auto-lighting capabilities. In an example, a robot 300 is configured with facial recognition software enabling the robot to detect and properly center a patron's face when taking a photograph, on a group of patrons when taking a photograph (e.g., so that a picture of, as an example, 5 patrons is centered on the entire group (e.g., with equal open spaces on either side), not just one particular patron), detect whether a patron is smiling, their eyes are open, etc. In an example, a robot 300 is configured with light emitting devices (e.g., a ring light surrounding a display device 312). Further to this example, robot 300 is configured to detect the lighting of the patron's face and, using the light emitting devices, automatically correct the lighting brightness and color (e.g., by adjusting the light output of the light emitting devices) when taking a photograph of the patron. For example, if robot 300 determines that a face of a patron is showing up as too dark, robot 300 may increase the light provided by the light emitting devices (e.g., and decreasing the light provided by the light emitting devices if a face of a patron is showing up as too light). In some examples, the light emitting devices are tri-color LEDs, allowing the robot to adjust the lighting hue (e.g., from a warm white to a cool white light, add color effects, etc.).

In some embodiments, a patron may be able to customize (e.g., via mobile gaming device 256 and/or EGM in communication with robot 300 and/or server 106) at least a portion of a picture taken by robot 300. For example, after taking a picture, robot 300 may display a copy of the picture (e.g., on display 312). A patron may interact with display 312 (e.g., display 312 is a touchscreen device) in order to modify the picture. For example, a patron may adjust the picture according to different image processing techniques (e.g., applying one or more filters (e.g., to the entire picture or to just a portion the picture, such as one or more faces of a patron), adjusting color/brightness, adding other images (e.g., stickers, animations, etc.), adding borders, adding one or more backgrounds to the photo, etc.). Robot 300 then saves the edited copy of the picture and may provide the patron (e.g., via the techniques described herein) access to the edited copy of the picture, as well as the original copy of the picture. In some embodiments, robot 300 is configured to automatically apply image processing features to photographs (e.g., to generate higher-quality photographs).

In some embodiments, robot 300 may be summoned to take a picture (e.g., in response to an input at an EGM and/or mobile device of a player and communicated to server 106). In some embodiments, robot 300 is configured to roam the venue/casino floor and take pictures at predetermined intervals (e.g., periods of time, upon detection of a certain number of faces (e.g., a large group), etc.). In some embodiments, robot 300 is configured to use facial recognition techniques to recognize certain patrons (e.g., celebrities, VIPs, etc.) and take pictures of the certain patrons. In some embodiments, upon recognition of a patron, robot 300 is configured to communicate with server 106 to determine patron preferences (e.g., whether the patron would like pictures taken of them or not) and then take pictures of the patron if the patron preference is set such that they would like pictures of them taken.

Figure 19:
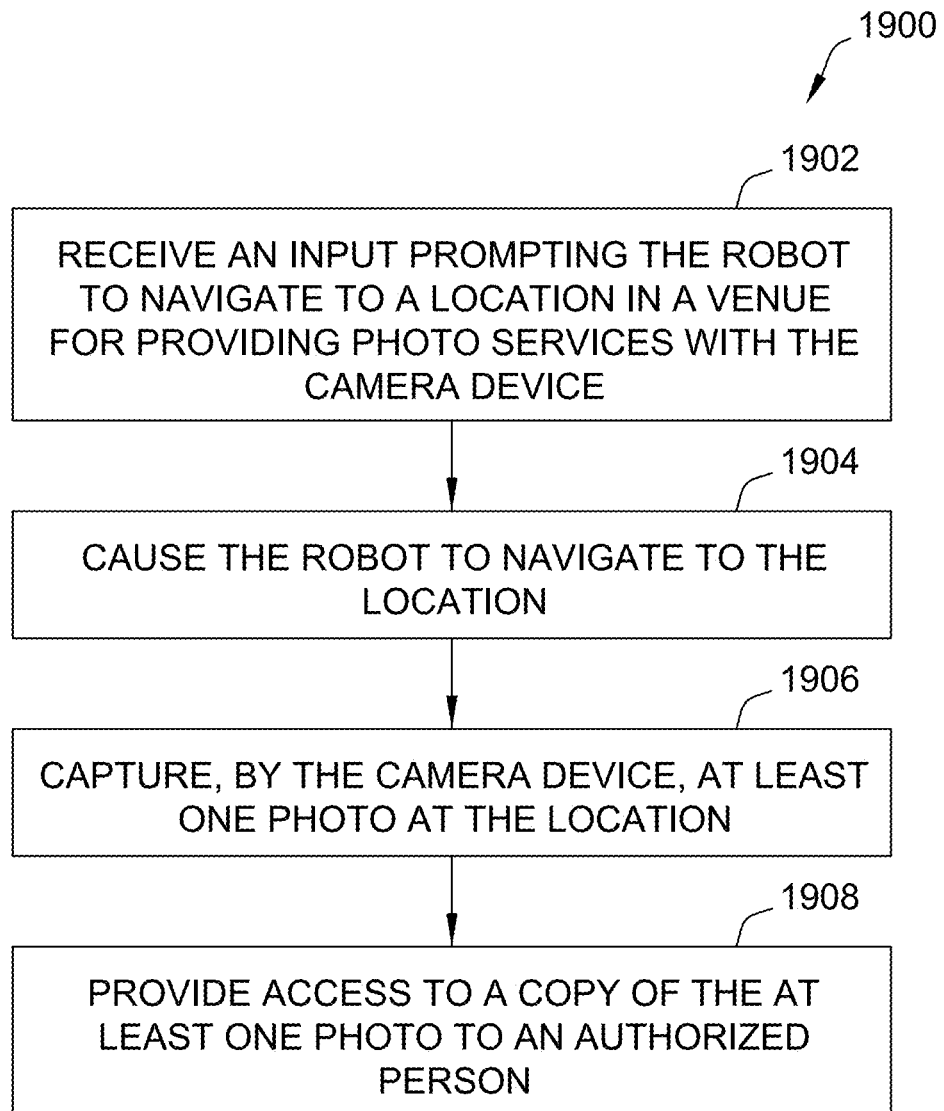
FIG. 19 is a flowchart illustrating an example process for controlling a robot to provide selfie/photography services, as described herein.

FIG. 19 is a flowchart illustrating an example method 1900 for controlling a robot (e.g., to perform selfie services within an operations venue, such as gaming environment 250). In some embodiments, and as described in additional detail herein, method 1900 includes receiving 1902 an input prompting the robot (e.g., robot 300) to navigate to a location in a venue for providing photo services with a camera device (e.g., device 360) of the robot, causing 1904 the robot to navigate to the location, capturing 1906, by the camera device, at least one photo at the location, and providing 1908 access to a copy of the at least one photo to an authorized person.

In some embodiments, method 1900 includes uploading the copy of the at least one photo to a server (e.g., server 106, 110, etc.) and at least one of i) printing, via a printer of the robot, a ticket including a link to the copy of the at least one photo on the server, ii) causing display, on a display device (e.g., device 312) of the robot, of a QR code including a link to the copy of the at least one photo on the server, and iii) printing, via the printer of the robot, the copy of the at least one photo. In some embodiments, method 1900 includes causing display, on a display device of the robot, of a live feed from the camera device and receiving, at the display device, an input indicating that the robot should capture the at least one photo.

In some embodiments, method 1900 includes causing display, on a display device of the robot, of the copy of the at least one photo, receiving, by at least one of a wireless interface of the robot and the display device of the robot, an input from the authorized person and associated with a modification of the copy of the at least one photo, and configuring the copy of the at least one photo with the modification, wherein the modification includes at least one of i) adding a border to the copy of the at least one photo, ii) adjusting a brightness of the copy of the at least one photo, iii) adjusting a color of the copy of the at least one photo, iv) adding a filter to the copy of the at least one photo, and v) adding an image to the copy of the at least one photo.

In some embodiments, method 1900 includes receiving an input indicating that the robot should take the at least one photo, determining a location of the authorized person, centering a live feed from the camera device on at least the authorized person, and capturing, by the camera device, the at least one photo once the live feed is centered on at least the authorized person.

In some embodiments, method 1900 includes receiving an input indicating that the robot should take the at least one photo, wherein the input comprises an amount of time to wait before capturing the at least one photo and after waiting the amount of time, capturing the at least one photo. In some embodiments, method 1900 includes detecting, from a live feed from the camera device, a face of at least one person, determining, based upon an analysis of the face in the live feed, to change lighting provided by the at least one lighting device, and modifying the lighting provided by the at least one lighting device.

Example Service Room

Figure 20:
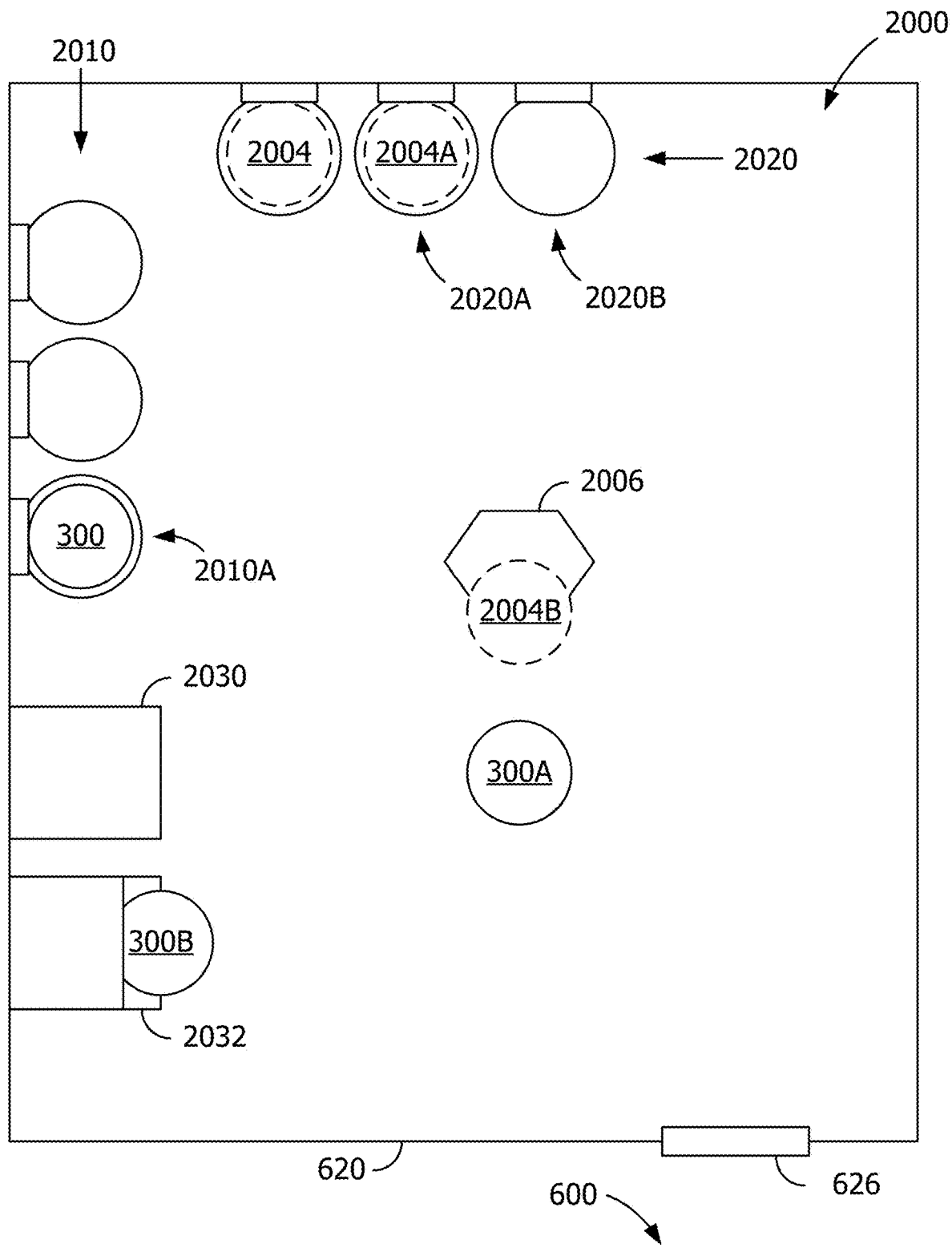
FIG. 20 is an overhead diagram of an example service room that may be used by the RMS to support the fleet of robots, or by individual robots (e.g., for purely autonomous operations).

FIG. 20 is an overhead diagram of an example service room 2000 that may be used by the RMS 400 to support the fleet of robots 300, or by individual robots 300 (e.g., for purely autonomous operations). This service room 2000 may be referred to herein as a "robot locker room" or "robot garage." The service room 2000 is a room or area within the venue 600 that is designated for certain maintenance and storage tasks associated with the fleet of robots 300. In the example embodiment, the service room 2000 includes a service access door 626 that acts as the primary path of ingress and egress for the robots 300 when moving between the service room 2000 and the other areas of the venue 600 within which the robots 300 provide services. In some embodiments, the access door 626 may be an opening in the wall 620 through which robots 300 can move. In other embodiments, the access door 626 may be electronically controlled and may be networked with the RMS 400 or the robots 300 to allow the access door 626 to be remotely opened or closed upon instruction. For example, when a robot 300 is about to enter or exit the service room 2000, the robot 300 or the RMS server 106 may transmit a door open command to the door 626. After the robot 300 moves through, the requesting device may transmit a door close command to the door 626 or the door 626 may close automatically (e.g., after a predetermined time interval, after sensor detection of the robot 300 moving through the door 626).

The service room 2000 includes various components and bays that may be used for various maintenance and support tasks. In the example embodiment, the service room 2000 includes multiple docking stations 2010 onto which robots 300 can move and which can be used to recharge the robots 300. For example, when particular robots 300 of the fleet are out of service or need to recharge, the robot 300 may move into the service room before going idle or powering off. Likewise, when first being deployed into service, the robots 300 may move out of the service room 2000, through the access door 626, and out into their configured zone of operation (e.g., out into venue 600). Docking stations 2010 may include recharging ports that automatically connect the robot 300 to a power source (e.g., wall power) when the robot 300 moves onto and docks with the docking station 2010. An example docking station 2010A is shown in FIG. 20 with docked robot 300 occupying the station 2010. In some embodiments, each robot 300 in the fleet has a designated docking station 2010 within the service room.

Some robots 300 may support reconfigurable body modules, allowing one body module to be removed and replaced with another module in its place. Such robots are referred to herein as "modular robots." In one example embodiment, modular robots each include a common head unit, a common base unit, and one body module. The head unit includes processing and interaction components common to many of the service roles described herein, such as display/touch-screen devices 250, 253, speakers 354, microphones 356, network interface device 326, and camera device(s) 360. The base unit includes mobility and sensory components that enable movement and navigation tasks, such as drive-train assembly 308, positioning sensors 390, proximity sensors 380, impact sensors 368, and the like. Each modular robot also accepts a single body module 2004 that can be detached from a frame of the robot, removed from the robot, and replaced with another body module. Body modules 2004 for modular robots may be configured with hardware specific for a particular service role, such as any of the service roles described herein. For example, one body module 2004 may include hardware for a kiosk robot (e.g., having card/ticket readers 362, card/ticket printers 364), where another body module 2004 may include hardware for a drink delivery robot (e.g., having an internal inventory area), both of which are described in greater detail above. Body modules 2004 are illustrated in FIG. 20 in broken line for purposes of illustration.

Such modular robots 300 may manually or automatically be reconfigured with different body modules 2004 (e.g., during daily operation, during the operational life of the robot 300). For example, in some embodiments, the service room 2000 may include one or more module storage stations 2020. A modular storage station 2020 is a docking station that is configured to be able to store a single body module 2004. In the example embodiment shown in FIG. 20, the service room 2000 includes a first module storage station 2020A that stores a drink delivery body module 2004A a second module storage station 2020B that is empty (e.g., currently stores no body module 2004). During operation, a modular robot 300 may be currently operating as in a kiosk service role (e.g., housing a kiosk body module) and the RMS server 106 may assign a reconfiguration task to that modular robot 300, tasking the robot 300 to convert from a kiosk service role to a drink delivery service role. Accordingly, that modular robot 300 may move to and dock with the empty module storage station 2020B in the service room 2000 and disconnect the kiosk body module into that first module storage station 2020B. The modular robot may then undock with that storage station 2020B and move over to and dock with the storage station 2020A that has the drink delivery body module 2004A. Upon docking with the storage station 2020A, the robot 300 may connect to the drink delivery body module 2004A and then undock from that storage station 2020A. Such an operation effectively reconfigures the modular robot from a kiosk robot to a drink delivery robot through use of the module storage stations.

In some embodiments, the RMS 400 may include a support robot 2006 that may be used to remove and replace body modules 2004 from modular robots 300. The support robot 2006 includes a carrier for holding and transporting a body module 2004, and for removing and adding body modules 2004 to modular robots 300. During a robot reconfiguration task, a modular robot 300A may move into the service room 2000 and signal to the RMS 400 that the robot 300A is ready for modular replacement (e.g., via coordination through RMS server 106, via direct communications with the support robot 2006). The support robot 2006 may move to and connect with a body module 2004B currently being used by the robot 300A, thereby disconnecting the body module 2004B. FIG. 20 illustrates the removal of the body module 2004B from the robot 300A. After removal, the support robot 2006 may deposit the body module 2004B into storage (e.g., into an empty storage station 2020B or the like). The support robot 2006 may then move to and acquire another body module 2004 from storage (e.g., from another storage station 2020), take that body module 2004 from the storage to the robot 300A and mount that body module 2004 onto the robot 300A, thereby completing the reconfiguration task.

In some embodiments, the service room 2000 includes a cleaning station 2030 that may be used to clean robots 300 of the fleet. The cleaning station 2030 may be an enclosed or partially enclosed cabinet or closet into which a robot 300 may drive. The cleaning station 2030 may be configured to perform cleaning operations on a robot 300, such as disinfection through application of ultraviolet light, germicidal radiation, germicidal sprays or gasses, or the like. Upon initiation of a cleaning operation, the cleaning station 2030 may initiate application of the disinfectant for a predetermined period of time, thereby disinfecting surfaces of the robot 300. The cleaning station 2030 may be network connected to the RMS server 106, which may manage and task such disinfecting operations for the fleet of robots 300. In some embodiments, the robots 300 may communicate directly with the cleaning station 2030 when tasked with disinfection operations. In some embodiments, the RMS 400 may automatically initiate disinfection tasks for robots 300 (e.g., after a predetermined operational time, after a predetermined number of patron interactions).

In some embodiments, the service room 2000 includes a restocking station 2032 that may be used to automatically restock robots 300. For example, the restocking station 2032 may be configured to store vending products that are offered by vendor robots operated by the RMS 400. When a particular vendor robot 300B is tasked to resupply inventory, that vendor robot 300B may move onto or otherwise dock with the restocking station 2032. Upon docking, the restocking station 2032 may initiate transfer of particular vending products to the robot 300B (e.g., based on items previously sold by the robot 300B, based on a current inventory level of products held by the robot 300B). After restocking, the robot 300B may undock from the restocking station 2032 and return to service. In some embodiments, the restocking station 2032 may be configured to remove vending products from the vendor robot 300B. For example, when the robot 300B goes out of service or is configured to reconfigure with a different body module 2004, the robot 300B may first dock with and unload inventory to the restocking station 2032 before the robot 300B is reconfigured with a new body module 2004.

Example Multi-Role Robot

Robot service features described herein may be provided in any combination of services and supporting hardware. For example, in one example embodiment, the robot 300 may be configured as both a kiosk robot and as a drink delivery robot. In such multi-role robot embodiments, the robot 300 may process any subset of tasks associated with the assigned roles, and thus the RMS 400 may be configured to assign any supported task types to that multi-role robot. In some embodiments, the robot 300 may include multiple display devices 350 (and touchscreen devices 352) and may designate some provided services to one display device 350 and other provided services to the other display device 350. Further, other hardware associated with those segregated service roles may be installed and oriented based on those service roles. For example, a kiosk/item delivery robot may provide a first display 350 assigned to item delivery and facing an internal container system 906 that may be used for item delivery tasks, or for displaying digital content (e.g., advertisements). Further, the kiosk/item delivery robot may provide a second display 350 assigned to kiosk tasks and facing an opposite direction from the first display 350, and may provide additional kiosk supporting hardware oriented to the second display 350, such as readers 362 and printers 364. When performing a particular task, the robot 300 may accordingly orient itself such that the display 350 assigned to that particular task type faces the patron being addressed (e.g., facing a drink recipient with the first display 350 when delivering a drink, facing a kiosk patron with the second display 350 when servicing a kiosk request). Such a multi-role robot may intermix performance of disparate tasks. For example, the RMS 400 may receive a request for a kiosk robot and may assign that task to a multi-role robot that is currently working a drink delivery tasks. The multi-role robot may, for example, divert to respond to the kiosk task while performing a drink delivery (e.g., while moving to deliver a drink from a bar to another patron). The RMS 400 or the robot 300 may, for example, evaluate the request location of the kiosk task relative to a projected travel path of the robot 300, a current location of the robot 300 relative to the kiosk request, or a minimum distance between the projected travel path of the robot 300 and the request location (e.g., to minimize movement of the robot 300 by efficiently fielding tasks when they are close to the request locations). In some embodiments, a multi-role robot may perform multiple services simultaneously (e.g., perform a kiosk task for a first patron while stopped and while completing a drink delivery task for a second patron at the same location).

A computer, controller, or server, such as those described herein, includes at least one processor or processing unit and a system memory. The computer, controller, or server typically has at least some form of computer readable non-transitory media. As used herein, the terms "processor" and "computer" and related terms, e.g., "processing device", "computing device", and "controller" are not limited to just those integrated circuits referred to in the art as a computer, but broadly refers to a microcontroller, a microcomputer, a programmable logic controller (PLC), an application specific integrated circuit, and other programmable circuits "configured to" carry out programmable instructions, and these terms are used interchangeably herein. In the embodiments described herein, memory may include, but is not limited to, a computer-readable medium or computer storage media, volatile and nonvolatile media, removable and non-removable media implemented in any method or technology for storage of information such as computer readable instructions, data structures, program modules, or other data. Such memory includes a random access memory (RAM), computer storage media, communication media, and a computer-readable non-volatile medium, such as flash memory. Alternatively, a floppy disk, a compact disc-read only memory (CD-ROM), a magneto-optical disk (MOD), and/or a digital versatile disc (DVD) may also be used. Also, in the embodiments described herein, additional input channels may be, but are not limited to, computer peripherals associated with an operator interface such as a mouse and a keyboard. Alternatively, other computer peripherals may also be used that may include, for example, but not be limited to, a scanner. Furthermore, in the exemplary embodiment, additional output channels may include, but not be limited to, an operator interface monitor.

As indicated above, the process may be embodied in computer software. The computer software could be supplied in a number of ways, for example on a tangible, non-transitory, computer readable storage medium, such as on any nonvolatile memory device (e.g. an EEPROM). Further, different parts of the computer software can be executed by different devices, such as, for example, in a client-server relationship. Persons skilled in the art will appreciate that computer software provides a series of instructions executable by the processor.

While the invention has been described with respect to the figures, it will be appreciated that many modifications and changes may be made by those skilled in the art without departing from the spirit of the invention. Any variation and derivation from the above description and figures are included in the scope of the present invention as defined by the claims.

What is claimed is:

1. A robot management system (RMS) comprising:
 a plurality of service robots deployed within an operations venue that includes a plurality of gaming devices;
 a computing device including a display device presenting a graphical user interface (GUI) to an operator; and
 a robot management system server (RMS server) configured in networked communication with the plurality of service robots, the RMS server includes at least one processor and at least one memory device storing instructions, which when executed by the at least one processor, cause the at least one processor to:
  identify location data for the plurality of service robots;
  create an interactive overlay map of the operations venue, the interactive overlay map includes at least a static map of the operations venue that includes the plurality of gaming devices at static, predefined locations, the interactive overlay map further includes overlay data showing the location data of the plurality of service robots over the static map, the interactive overlay map further includes an interactive icon for each service robot of the plurality of service robots;
cause to be displayed, via the GUI, the overlay map;
receive a first input indicating a selection of a first interactive icon associated with a first service robot;
display current status information associated with the first service robot;
receive, from a first service robot of the plurality of service robots, patron location information that includes a current location of a first patron within the operations venue and an identity of the first patron determined by the first service robot;
display an interactive icon associated with the current location of the first patron on the interactive overlay map; and
in response to selection of the interactive icon, cause display of electronic gaming loyalty data associated with the first patron.

2. The robot management system of claim 1, wherein the instructions further cause the at least one processor to display a current task list associated with the first service robot, the current task list identifying one or more tasks currently assigned to be performed by the first service robot.

3. The robot management system of claim 1, wherein the instructions further cause the at least one processor to:
receive a second input via the GUI indicating a request for turnover of the first service robot to manual control by the operator; and
provide a control interface in the GUI that allows the operator to manually control movement actions of the first service robot through the GUI.

4. The robot management system of claim 1, wherein the instructions further cause the at least one processor to:
receive a second input via the GUI indicating initiation of video conferencing between the computing device and the first service robot; and
initiate a live video conference between the first service robot and the computing device over a wireless network, the live video conference includes (a) video data and audio data of a patron captured by a digital camera device and a microphone device of the first service robot and displayed to the operator via the computing device and (b) video data and audio data of the operator captured by the computing device and displayed to the patron via a display device and a speaker of the first service robot.

5. The robot management system of claim 1, wherein the instructions further cause the at least one processor to:
create a heat map overlay based on historical sensor data collected by the plurality of service robots, the historical sensor data including object location data captured from the operations venue as the plurality of service robots operate within the operations venue, the object location data indicating the presence of static or animate objects sensed within the operations venue, wherein the object location data is aggregated over time based on location to provide an indication of how often objects have historically been detected at any given location; and
display the heat map on the interactive overlay map.

6. The robot management system of claim 1, wherein the first service robot includes one or more of a digital camera device and a microphone device, wherein the first service robot determines the identity of the first patron based at least in part on one or more of (i) facial recognition using the digital camera device and (ii) voice recognition of using the microphone device.

7. The robot management system of claim 1, wherein the first service robot determines the identity of the first patron based at least in part on an authenticated interaction with the first patron.

8. The robot management system of claim 1, wherein the first service robot determines the identity of the first patron based at least in part on data received from a gaming device source.

9. A method of managing a plurality of service robots deployed within an operations venue that includes a plurality of gaming devices, the method comprising:
identifying location data for the plurality of service robots;
creating an interactive overlay map of an operations venue, the interactive overlay map includes at least a static map of the operations venue that includes the plurality of gaming devices at static, predefined locations, the interactive overlay map further includes overlay data showing the location data of the plurality of service robots over the static map, the interactive overlay map further includes an interactive icon for each service robot of the plurality of service robots;
causing the interactive overlay map to be displayed to an operator via a graphical user interface (GUI) on a computing device including a display device;
receiving a first input indicating a selection of a first interactive icon associated with a first service robot;
displaying current status information associated with the first service robot;
receiving, from a first service robot of the plurality of service robots, patron location information that includes a current location of a first patron within the operations venue and an identity of the first patron determined by the first service robot;
displaying an interactive icon associated with the current location of the first patron on the interactive overlay map; and
in response to selection of the interactive icon, causing display of electronic gaming loyalty data associated with the first patron.

10. The method of claim 9 further comprising displaying a current task list associated with the first service robot, the current task list identifying one or more tasks currently assigned to be performed by the first service robot.

11. The method of claim 9, further comprising:
receiving a second input via the GUI indicating a request for turnover of the first service robot to manual control by the operator; and
providing a control interface in the GUI that allows the operator to manually control movement actions of the first service robot through the GUI.

12. The method of claim 9, further comprising:
receiving a second input via the GUI indicating initiation of video conferencing between the computing device and the first service robot; and
initiating a live video conference between the first service robot and the computing device over a wireless network, the live video conference includes (a) video data and audio data of a patron captured by a digital camera device and a microphone device of the first service robot and displayed to the operator via the computing device and (b) video data and audio data of the operator captured by the computing device and displayed to the patron via a display device and a speaker of the first service robot.

13. The method of claim 9, further comprising:

creating a heat map overlay based on historical sensor data collected by the plurality of service robots, the historical sensor data including object location data captured from the operations venue as the plurality of service robots operate within the operations venue, the object location data indicating the presence of static or animate objects sensed within the operations venue, wherein the object location data is aggregated over time based on location to provide an indication of how often objects have historically been detected at any given location; and displaying the heat map on the interactive overlay map.

14. The method of claim 9, wherein the first service robot includes one or more of a digital camera device and a microphone device, wherein the first service robot determines the identity of the first patron based at least in part on one or more of (i) facial recognition using the digital camera device and (ii) voice recognition of using the microphone device.

15. The method of claim 9, wherein the first service robot determines the identity of the first patron based at least in part on an authenticated interaction with the first patron.

16. A non-transitory computer-readable medium including instructions that, when executed by at least one processor, cause the at least one processor to:

identify location data for a plurality of service robots deployed within an operations venue;

create an interactive overlay map of the operations venue, the interactive overlay map includes at least a static map of the operations venue that includes the plurality of gaming devices at static, predefined locations, the interactive overlay map further includes overlay data showing the location data of the plurality of service robots over the static map, the interactive overlay map further includes an interactive icon for each service robot of the plurality of service robots;

cause the interactive overlay map to be displayed to an operator via a graphical user interface (GUI) on a computing device including a display device;

receive a first input indicating a selection of a first interactive icon associated with a first service robot;

display current status information associated with the first service robot;

receive, from a first service robot of the plurality of service robots, patron location information that includes a current location of a first patron within the operations venue and an identity of the first patron determined by the first service robot;

display an interactive icon associated with the current location of the first patron on the interactive overlay map; and in response to selection of the interactive icon, cause display of electronic gaming loyalty data associated with the first patron.

17. The non-transitory computer-readable medium of claim 16, wherein the instructions further cause the at least one processor to display a current task list associated with the first service robot, the current task list identifying one or more tasks currently assigned to be performed by the first service robot.

18. The non-transitory computer-readable medium of claim 16, wherein the instructions further cause the at least one processor to:

receive a second input via the GUI indicating a request for turnover of the first service robot to manual control by the operator; and provide a control interface in the GUI that allows the operator to manually control movement actions of the first service robot through the GUI.

19. The non-transitory computer-readable medium of claim 16, wherein the instructions further cause the at least one processor to:

receive a second input via the GUI indicating initiation of video conferencing between the computing device and the first service robot; and initiate a live video conference between the first service robot and the computing device over a wireless network, the live video conference includes (a) video data and audio data of a patron captured by a digital camera device and a microphone device of the first service robot and displayed to the operator via the computing device and (b) video data and audio data of the operator captured by the computing device and displayed to the patron via a display device and a speaker of the first service robot.

20. The non-transitory computer-readable medium of claim 16, wherein the first service robot includes one or more of a digital camera device and a microphone device, wherein the first service robot determines the identity of the first patron based at least in part on one or more of (i) facial recognition using the digital camera device and (ii) voice recognition of using the microphone device.

\* \* \* \* \*